United States Patent [19]

Tzikas et al.

[11] Patent Number: 4,786,721
[45] Date of Patent: Nov. 22, 1988

[54] FIBER-REACTIVE DYES CONTAINING A VINYLSULFONYLALKYLAMINO- OR SULFONYL-ARYLAMINOTRIAZINE MOIETY

[75] Inventors: Athanassios Tzikas, Pratteln; Peter Aeschlimann, Allschwil; Paul Herzig, Basel, all of Switzerland

[73] Assignee: Ciba-Geigy Corporation, New York, N.Y.

[21] Appl. No.: 896,290

[22] Filed: Aug. 13, 1986

[30] Foreign Application Priority Data

Aug. 14, 1985 [CH] Switzerland ............. 3503/85

[51] Int. Cl.$^4$ .............. C09B 62/04; C09B 62/06; C09B 62/08; C09B 62/085; C09B 62/09; C09B 62/095; C09B 62/10; C09B 62/523
[52] U.S. Cl. ................. 534/617; 534/582; 534/588; 534/593; 534/598; 534/618; 534/619; 534/621; 534/622; 534/624; 534/625; 534/628; 534/629; 534/631; 534/632; 534/634; 534/635; 534/636; 534/637; 534/638; 534/640; 534/641; 534/642; 534/643; 540/125; 544/64; 544/76; 544/77; 544/187; 544/208; 544/380; 558/34; 260/370; 260/371; 260/373; 260/377; 260/378

[58] Field of Search ........ 534/617, 618, 619, 620–643, 534/; 260/370, 371, 373; 540/125; 544/380, 187, 76, 208, 77; 558/34

[56] References Cited

U.S. PATENT DOCUMENTS

| | | | |
|---|---|---|---|
| 3,128,267 | 4/1964 | Schmitz et al. | 534/643 X |
| 3,223,470 | 12/1965 | Boedeker et al. | 534/638 X |
| 3,503,953 | 3/1970 | Loffelman | 534/643 X |
| 4,248,773 | 2/1981 | Hurter et al. | 534/643 X |
| 4,602,084 | 7/1986 | Hurter | 534/643 X |

FOREIGN PATENT DOCUMENTS

| | | | |
|---|---|---|---|
| 0074928 | 3/1983 | European Pat. Off. | 534/632 |
| 0085025 | 8/1983 | European Pat. Off. | 534/632 |
| 0144766 | 6/1985 | European Pat. Off. | 534/632 |
| 881536 | 11/1961 | United Kingdom | 534/643 |
| 2026529 | 2/1980 | United Kingdom | 534/638 |
| 1576237 | 10/1980 | United Kingdom | 534/638 |

*Primary Examiner*—Floyd D. Higel
*Attorney, Agent, or Firm*—Wenderoth, Lind & Ponack

[57] ABSTRACT

The reactive dyes are useful, in particular, for dyeing or printing cellulose-containing fiber materials by the cold pad-batch method and produce, with a high dyeing yield, dyeings and prints having good fastness properties.

25 Claims, No Drawings

FIBER-REACTIVE DYES CONTAINING A VINYLSULFONYLALKYLAMINO- OR SULFONYL-ARYLAMINOTRIAZINE MOIETY

The present invention relates to novel reactive dyes, to a process for their preparation and to their use for dyeing or printing fiber materials.

The practice of dyeing with reactive dyes has recently led to increased demands on the quality of the dyeings and economics of the dyeing process. There consequently continues to be a demand for new reactive dyes which have improved properties, in particular application properties.

The present demand in the dyeing of cotton by the cold pad-batch method is for reactive dyes which have adequate substantivity adapted to the low dyeing temperature and which also have good wash-off properties with respect to the unfixed portions. They should also have a high reactivity, so that only short batching times are necessary, and they should in particular produce dyeings having high degrees of fixation. These demands are met only inadequately by known dyes.

The present invention therefore had for its object to find new, improved reactive dyes for the cold pad-batch method which have the qualities characterized above to a high degree. The new dyes should be distinguished in particular to high degrees of fixation and high fiber-dye bond stabilities, and moreover the portions not fixed on the fiber should be easy to wash off. They should furthermore produce dyeings having good allround fastness properties, for example light and wet fastness properties.

It has been found that this object is achieved with the novel reactive dyes defined hereinafter.

The invention accordingly provides reactive dyes of the formula

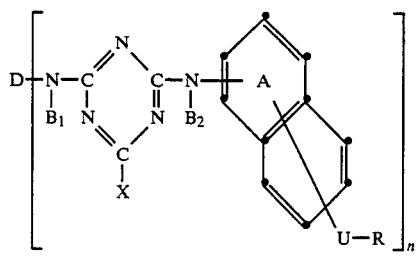
(1)

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; $B_1$ and $B_2$ independently of each other are hydrogen or alkyl having 1 to 4 carbon atoms, which can be substituted by carboxyl, sulfo, cyano or hydroxyl; X is fluorine, chlorine, bromine, sulfo, alkylsulfonyl having 1 to 4 C atoms or phenylsulfonyl; U is —CO— or —$SO_2$—; R is a radical of the formula

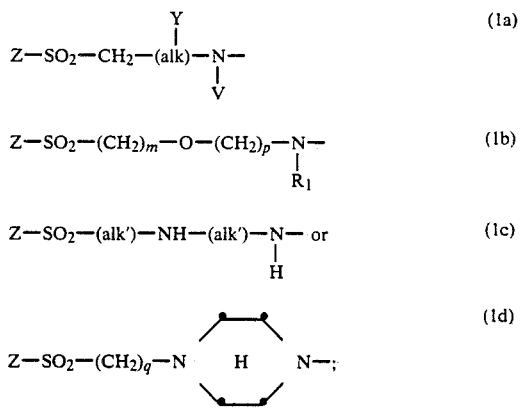

Z is sulfatoethyl, β-thiosulfatoethyl, β-phosphatoethyl, β-acetoxyethyl, β-halogenoethyl or vinyl; alk is a polymethylene radical having 1 to 6 C atoms or its branched isomers; Y is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical —$SO_2$—Z in which Z is defined as above; V is hydrogen or an alkyl radical having 1 to 4 C atoms which can be substituted by carboxyl or sulfo groups or by their derivatives, alkoxy groups having 1 or 2 C atoms, halogen or hydroxyl; or a radical

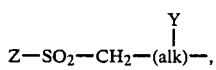

in which Z, alk and Y are as defined above; $R_1$ is hydrogen or $C_{1-6}$-alkyl; alk', independently of each other, are polymethylene radicals having 2 to 6 C atoms or their branched isomers; n is 1 or 2, m is 1 to 6, p is 1 to 6 and q is 1 to 6; where, when U is —$SO_2$—, V must not be hydrogen; and the benzene or naphthalene radical A can contain further substituents.

The radical D in the formula (1) can contain, bonded to its basic structure, the substituents customary with organic dyes.

Examples of further substituents in the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo. Preferably the radical D contains one or more sulfonic acid groups. Reactive dyes of the formula (1) in which D is the radical of an azo dye contain as substituents, in particular, methyl, ethyl, methoxy, ethoxy, acetylamino, benzoylamino, amino, chlorine, bromine, ureido, hydroxyl, carboxyl, sulfomethyl or sulfo.

An alkyl radical $B_1$ or $B_2$ is straight-chain or branched; it can be further substituted, for example by halogen, hydroxyl, cyano, $C_{1-4}$-alkoxy, carboxyl or sulfo. Examples of $B_1$ and $B_2$ are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably $B_1$ or $B_2$ is hydrogen, methyl or ethyl.

The substituent X which is detachable as an anion is a halogen atom, such as fluorine, chlorine or bromine, a low molecular weight alkylsulfonyl group, such as methylsulfonyl or ethylsulfonyl, the phenylsulfonyl radical or a sulfonic acid group. Preferably X is fluorine or chlorine.

A suitable β-halogenoethyl for Z is in particular the β-chloroethyl radical. The polymethylene radical alk is preferably methylene, ethylene, methylmethylene, propylene or butylene. An acyloxy radical Y is in particular acetyloxy propionyloxy or butyryloxy, and an alkoxycarbonyl radical Y is in particular methoxycarbonyl, ethoxycarbonyl or propyloxycarbonyl. An alkyl radical V can be methyl, ethyl, propyl, isopropyl, isobutyl, sec-butyl or tert-butyl. Derivatives of the carboxyl or sulfo groups are for example carbamoyl, N-methyl-, N-ethyl-, N,N-dimethyl- and N,N-diethylcarbamoyl, cyano, acetyl, propionyl, butyryl, methoxycarbonyl, ethoxycarbonyl, propyloxycarbonyl, sulfamoyl, N-methyl-, N-ethyl-, N,N-dimethyl- and N,N-diethyl-sulfamoyl, methylsulfonyl, ethylsulfonyl and propylsulfonyl. The radical $R_1$ is for example methyl, ethyl, propyl, isopropyl, butyl, iso-butyl, sec-butyl, tert-butyl, pentyl or hexyl, or preferably hydrogen. The polymethylene radicals alk' are preferably ethylene, propylene or butylene. The indices m, p and q are independent of one another and preferably 2, 3 or 4. Suitable further substituents on the benzene or naphthalene radical A are the same as mentioned above in the explanation of the radical D.

The formula (1) part which is enclosed in square brackets is a reactive radical which can be present in the molecule once or twice; the two formula variants are of equal importance. In the case of n being 2, the two reactive radicals can be identical or different; preferably the two radicals are identical. The reactive radical contains two substituents, namely X and Z, which are fiber-reactive leaving groups, for example when X is F, or contain fiber-reactive leaving groups, for example when Z is β-chloroethyl, or which can become active in the manner of fiber-reactive leaving groups, for example when Z is vinyl. "Fiber-reactive compounds" is to be understood as meaning those which are capable of reacting with the hydroxyl groups of cellulose, the amino, carboxyl, hydroxyl and thiol groups in the case of wool and silk, or with the amino and, possibly, carboxyl groups of synthetic polyamides to form covalent chemical bonding.

Preferred embodiments of the reactive dyes of the formula (1) are:

(a) reactive dyes of the formula (1) in which X is fluorine or chlorine.

(b) reactive dyes as per (a) in which Z is β-chloroethyl.

(c) reactive dyes as per (b) in which U is —CO—.

The symbols of the formula (1) not mentioned under (a) to (c) are as defined in the explanation of the formula (1). Eligible are also in particular combinations of features as per (a) to (c). Preference is also given to:

(d) reactive dyes of the formula (1) or as per (a) to (c) in which D is the radical of a monoazo or disazo dye.

(e) reactive dyes of the formula (1) or as per (a) to (c) in which D is the radical of a metal complex azo or formazan dye.

(f) reactive dyes of the formula (1) or as per (a) to (c) in which D is the radical of an anthraquinone dye.

(g) reactive dyes of the formula (1) or as per (a) to (c) in which D is the radical of a phthalocyanine dye.

(h) reactive dyes as per (e) in which D is the radical of a 1:1 copper complex azo dye of the benzene or naphthalene series and the copper atom is bonded on either side to a metallizable group in the ortho-position relative to the azo bridge.

Preference is given in particular to:

(i) reactive dyes of the formula

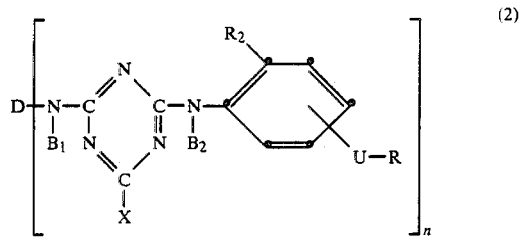

(2)

in which $R_2$ is hydrogen, $C_{1-4}$-alkyl, $C_{1-4}$-alkoxy, halogen, hydroxyl, carboxyl or sulfo; and D, $B_1$, $B_2$, X, U, R and n are as defined under the formula (1).

(j) reactive dyes as per (d) or (e) in which D is a monoazo or disazo dye radical of the formula

$D_1—N=N—(M—N=N)_q—K—$ (3a),

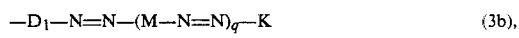

$—D_1—N=N—(M—N=N)_q—K$ (3b), or

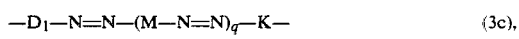

$—D_1—N=N—(M—N=N)_q—K—$ (3c), or of a metal complex derived therefrom; $D_1$ is the radical of a diazo component of the benzene or naphthalene series, M is the radical of a middle component of the benzene or naphthalene series, and K is the radical of a coupling component of the benzene, naphthalene, pyrazolone, 6-hydroxypyrid-2-one or acetoacetarylamide series, where $D_1$, M and K can carry substituents customary with azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms; q is 0 or 1; and $D_1$, M and K together contain at least two sulfo groups, preferably three or four sulfo groups.

(k) reactive dyes as per (d) in which D is a disazo dye radical of the formula $$D_1-N=N-K-N=N-D_2- \quad (4a),$$

or $$-D_1-N=N-K-N=N-D_2- \quad (4b),$$

$D_1$ and $D_2$ are independently of each other the radical of a diazo component of the benzene or naphthalene series, and K is the radical of a coupling component of the naphthalene series; where $D_1$, $D_2$ and K can carry substituents customary with azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms; and $D_1$, $D_2$ and K together contain at least two sulfo groups, preferably three or four sulfo groups.

(l) reactive dyes as per (f) in which D is the radical of an anthraquinone dye of the formula

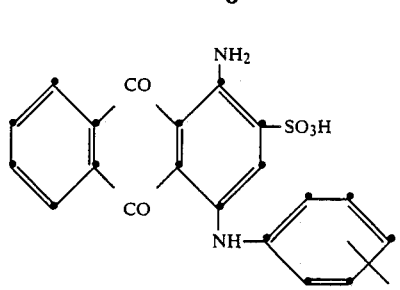

where the anthraquinone nucleus can be substituted by a further sulfo group and the phenylene radical by alkyl having 1 to 4 C atoms, alkoxy having 1 to 4 C atoms, halogen, carboxyl or sulfo, and the dye preferably contains at least 2 strongly water-solubilizing groups.

(m) reactive dyes as per (g) in which D is the radical of a phthalocyanine dye of the formula

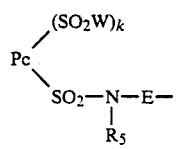

Pc is the radical of a copper or nickel phthalocyanine; W is —OH and/or —$NR_3R_4$; $R_3$ and $R_4$ are independently of one another hydrogen or alkyl having 1 to 4 carbon atoms, which can be substituted by hydroxyl or sulfo; $R_5$ is hydrogen or alkyl having 1 to 4 carbon atoms; E is a phenylene radical, which can be substituted by alkyl having 1 to 4 C atoms, halogen, carboxyl or sulfo; or an alkylene radical having 2 to 6 C atoms, preferably a sulfophenylene or ethylene radical; and k is 1 to 3.

(n) reactive dyes as per (j) of the formula

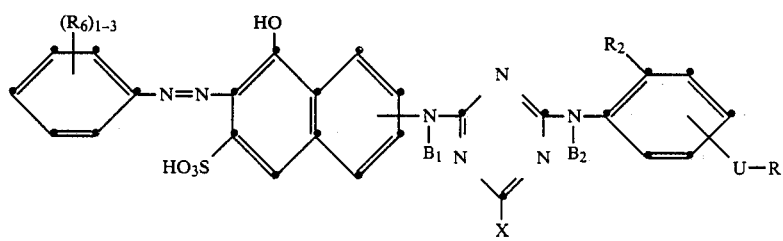

in which $R_6$ is 1 to 3 substituents from the group $C_{1-4}$-alkyl, $C_{1-4}$-alkoxy, halogen, carboxyl and sulfo; and $B_1$, $B_2$, X, U, R and $R_2$ are as defined under the formula (2).

(o) reactive dyes as per (j) of the formula

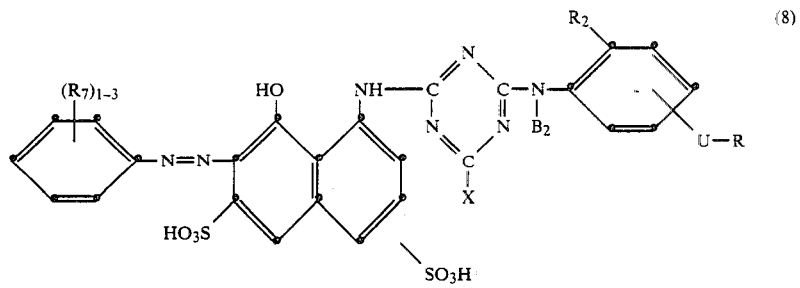

in which $R_7$ is 1 to 3 substituents from the group $C_{1-4}$-alkyl, $C_{1-4}$-alkoxy, halogen, carboxyl and sulfo; and $B_2$, X, U, R and $R_2$ are as defined under the formula (2).

(p) reactive dyes as per (j) of the formula

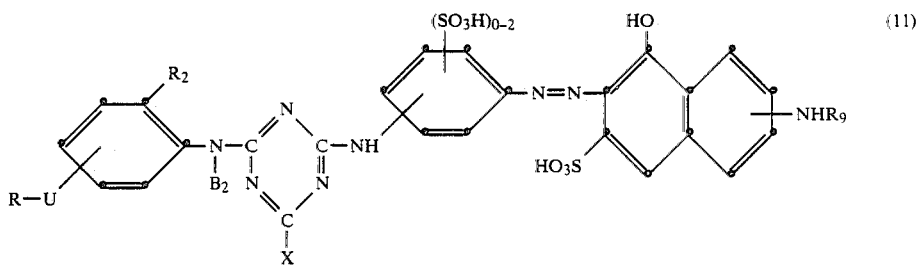

in which $R_8$ is 1 to 3 substituents of the group $C_{1-4}$-alkyl, $C_{1-4}$-alkoxy, halogen, carboxyl and sulfo; and $B_2$, X, U, R and $R_2$ are as defined under the formula (2).

(q) reactive dyes as per (j) of the formula

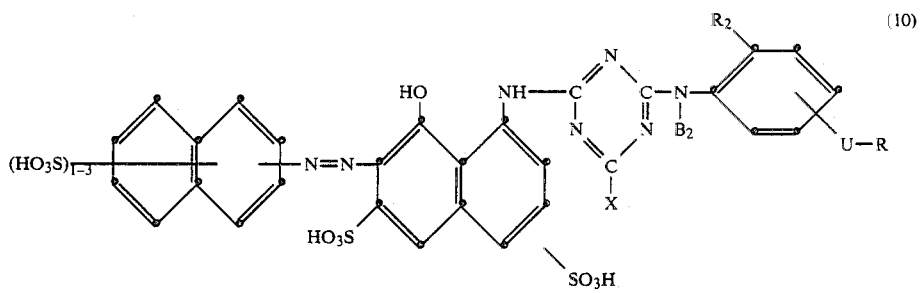

in which $B_2$, X, U, R and $R_2$ are as defined under the formula (2).

(r) reactive dyes as per (j) of the formula

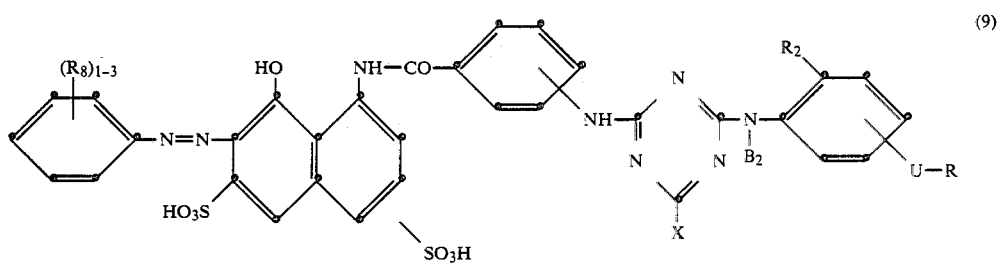

in which $R_9$ is hydrogen or $C_{1-4}$-alkanoyl; and $B_2$, X, U, R and $R_2$ are as defined under the formula (2).

(s) reactive dyes as per (j) of the formula

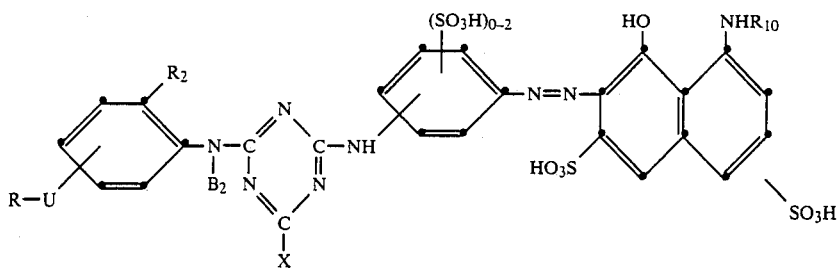
(12)

in which $R_{10}$ is hydrogen, $C_{1-4}$-alkanoyl or benzoyl; and $B_2$, $X$, $U$, $R$ and $R_2$ are as defined under the formula (2).

(t) reactive dyes as per (j) of the formula

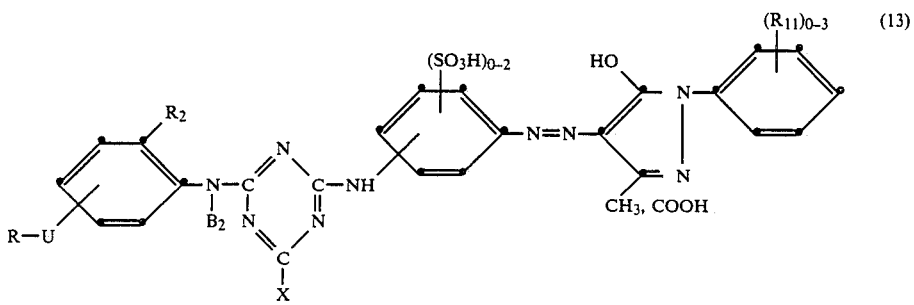
(13)

in which $R_{11}$ is 0 to 3 substituents from the group $C_{1-4}$-alkyl, $C_{1-4}$-alkoxy, halogen, carboxyl and sulfo; and $B_2$, $X$, $U$, $R$ and $R_2$ are as defined under the formula (2).

(u) reactive dyes as per (j) of the formula

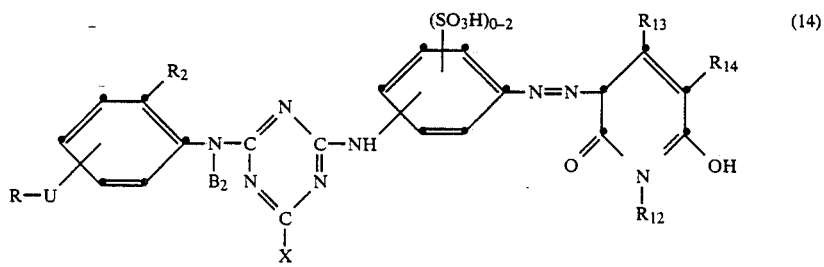
(14)

in which $R_{12}$ and $R_{13}$ are independently of each other hydrogen, $C_{1-4}$-alkyl or phenyl, and $R_{14}$ is hydrogen, cyano, carbamoyl or sulfomethyl; and $B_2$, $X$, $U$, $R$ and $R_2$ are as defined under the formula (2).

(v) reactive dyes as per (k) of the formula

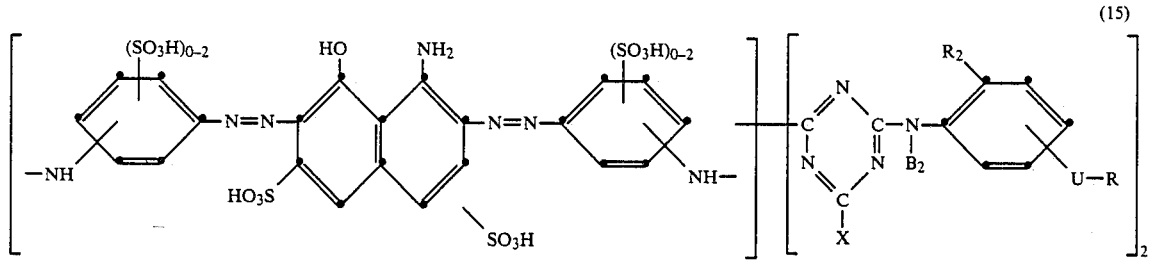
(15)

in which $B_2$, $X$, $U$, $R$ and $R_2$ are as defined under the formula (2).

(w) heavy metal complexes of reactive dyes of the formulae (1) to (15); possible complexing heavy metals are in particular copper, nickel, cobalt or chromium.

Preference is given in particular to compounds of the formulae (1) to (15) in which Z is the β-sulfatoethyl, β-chloroethyl or vinyl group.

The reactive dyes of the formula (1) are obtained by reacting an organic dye of the formula

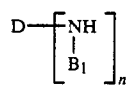
(16)

or a dye precursor, at least one equivalent of an s-triazine of the formula

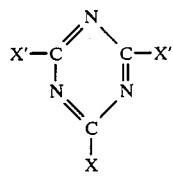
(17)

and at least one equivalent of an amine of the formula

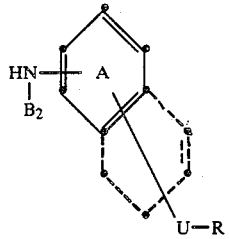
(18)

in any order to give a reactive dye of the formula (1), D, $B_1$, U, $B_2$, n, R and A being as defined under the formula (1), and X and X' independently of each other have one of the meanings mentioned for X under the formula (1); or, if dye precursors are used, converting the intermediates obtained into the desired end dyes.

The molar ratio of the starting substances must be chosen to correspond to the composition of the end product, according to whether n is 1 or 2.

The process according to the invention is, if desired, followed by a further conversion reaction. In the case of the preparation of end dyes from precursors possible further conversion reactions are in particular couplings which lead to azo dyes.

Since the individual abovementioned process steps can be carried out in various orders, in some instances even simultaneously if desired, different process variants are possible. In general the reaction is carried out in successive steps, the order of the elementary reactions between the individual reactants advantageously depending on the particular conditions.

An important process comprises first condensing a dye of the formula

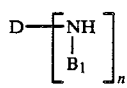
(16)

with a reactive derivative of the s-triazine of the formula

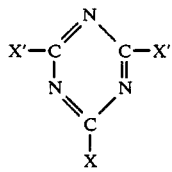
(17)

and subsequently condensing the resulting compound of the formula

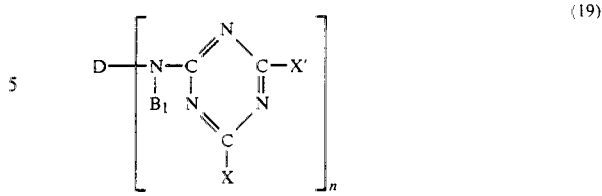
(19)

with an amine of the formula

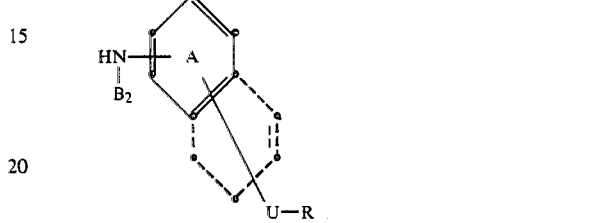
(18)

to give a reactive dye of the formula (1).

The modified process comprises preparing reactive dyes of the formula (1) by reacting such a component of this dye as contains a radical of the formula

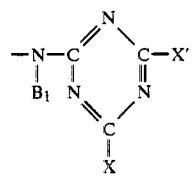
(20)

in which X and X' are as defined for the formula (17), with a second component which is required for preparing the dye and which, if desired, also contains a radical of the formula (20), and condensing the resulting dye of the formula (19) with an amine of the formula (18).

In the above reactions, it depends on the structure of the starting materials which of the possible process variants produce the best results, or under which specific conditions, for example at which condensation temperature, the reaction is most advantageously carried out.

Since under certain preconditions a halogenotriazinyl radical undergoes hydolysis, an intermediate which contains acetylamino groups must be hydrolyzed to eliminate the acetyl groups before condensation with a halogenotriazine. Which reaction is expediently carried out first, for example, in the preparation of a secondary condensation product from a compound of the formula (18), the triazine of the formula (17) and the organic dye of the formula (16) or a precursor, namely that of the triazine with the compound of the formula (18) or with the organic dye or a precursor of the dye, varies from case to case and depends in particular on the solubility of the amino compounds involved and on the basicity of the amino groups to be acylated.

A modified embodiment of the process comprises first preparing a dye which contains a precursor of the reactive radical and subsequently converting this precursor into the end stage, for example via esterification or an addition reaction. It is possible for example to prepare a dye in which Z is an HO—CH$_2$—CH$_2$— radical and to react the intermediate before or after the acylation with sulfuric acid, so that the hydroxyl group is converted into the sulfato group; or to use an analogous dye in which Z is the H$_2$C=CH— group and to add thiosulfuric acid onto the intermediate to form an HO$_3$SS—CH$_2$CH$_2$— radical. The sulfation of the hydroxyl group in a dye of the formula (1) or a suitable precursor is preferably effected by reaction with concentrated sulfuric acid at 0° C. to moderately elevated temperature. The sulfation can also be effected by reacting the hydroxyl compound with two equivalents of chlorosulfonic acid per hydroxyl group in a polar organic solvent, such as N-methylpyrrolidone, at 10° to 80° C. Preferably the sulfation is effected by adding the compound in question to sulfuric acid monohydrate at temperatures between 5° and 15° C. The introduction of another radical which is detachable under alkaline conditions into a compound of the formula (1) or an intermediate in place of the sulfato group, for example a thiosulfato group, is effected in a manner known per se. The preparation via an intermediate in place of the sulfato group, for example a thiosulfato group, is effected in a manner known per se. The preparation via an intermediate of the reactive radical proceeds in many cases uniformly and to completion.

The process variant where the starting materials are dye precursors is suitable for preparing reactive dyes of the formula (1) in which D are [sic] the radical of a dyes [sic] composed of two or more than two components: monoazo, disazo, trisazo, metal complex azo, formazan and azomethine dyes. In principle, the reactive dyes of the formula (1) of all classes of dye can be prepared in a manner known per se or analogously to known methods by starting from precursors or intermediates for dyes which contain fiber-reactive radicals of the formula (1), or introducing these fiber-reactive radicals into intermediates which have dye characteristics and are suitable for this purpose.

Preference is given to reactive dyes of the formula (1) in which D is the radical of a monoazo or disazo dye or of a metal complex azo dye. In this case the reactive radicals of the formula

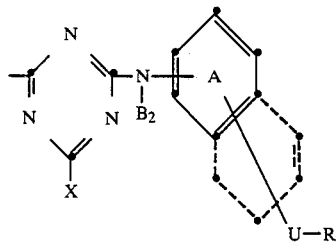

(21)

are bonded to the diazo or coupling component or, if n is 2, to different or identical radicals of starting components, i.e. diazo or coupling components. Preferably, when n is 2, the two reactive radicals are bonded to one component each, the diazo component or the coupling component. The reactive dyes then for example have the formulae

and

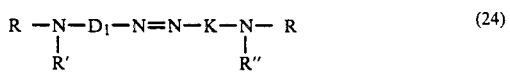

in which R' and R" independently of each other are defined in the same way as B$_1$ in the formula (1), D$_1$ is the radical of a diazo component, K is the radical of a coupling component, and R is a reactive radical of formula (21).

When starting from dye precursors, the reactive dyes of the formula (1) are obtained by condensing such a component of the dye of the formula (16) as contains a —N(B$_1$)H group and a triazine of the formula (17), condensing beforehand or afterwards with a compound of the formula (18), and reacting with the other component of the dye of the formula (16). In preparing the preferred azo dyes, the diazo components and the coupling components together must contain at least one amino group —N(B$_1$)H and can contain further amino groups. The diazo components used in this case are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired, use is made of corresponding acetylamino or nitro compounds in which the acetylamino or the nitro group is converted by hydrolysis or reduction respectively into the H$_2$N group before the condensation with the 2,4,6-trihalogenotriazine.

If groups capable of metal complex formation are present in the reactive dyes prepared, such as hydroxyl, carboxyl, amino or sulfo, the reactive dyes can also be subsequently metallized. Metal complex azo dyes are obtained for example by treating azo compounds obtained according to the invention which contain in the ortho-ortho'-position relative to the azo bridge complexing groups, for example hydroxyl or carboxyl groups, with heavy metal donors before or, if desired, even after the condensation with the 2,4,6-trihalogenotriazine of the formula (17). Particular interest attaches to copper complexes of reactive dyes of the formula (1). Suitable methods of metallization are in addition to the abovementioned method also the dealkylating metallization and, for preparing copper complexes, oxidative coppering.

The most important process variants are described in the examples.

In what follows, possible starting materials which can be used for preparing the reactive dyes of the formula (1) will be named individually.

Organic dyes of the formula (16)

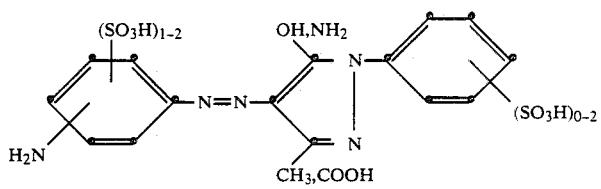
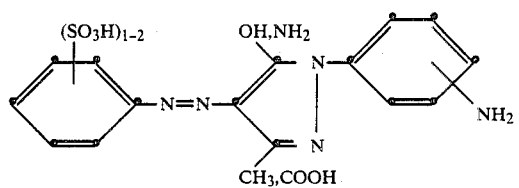
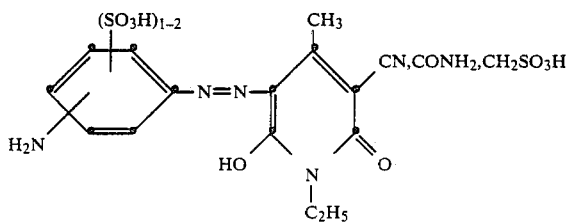
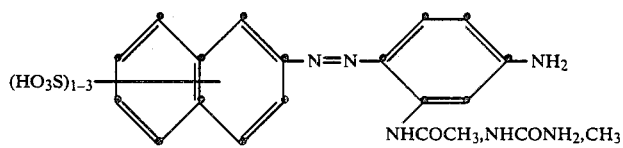
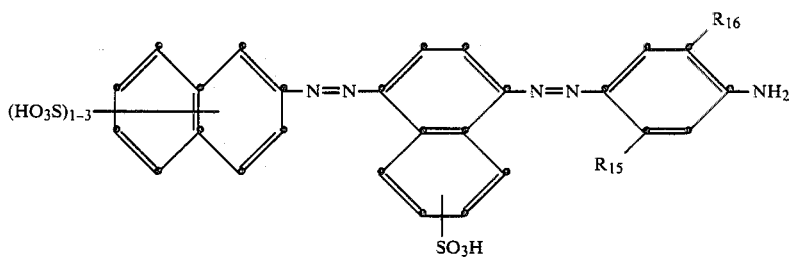
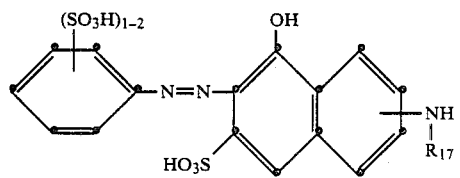
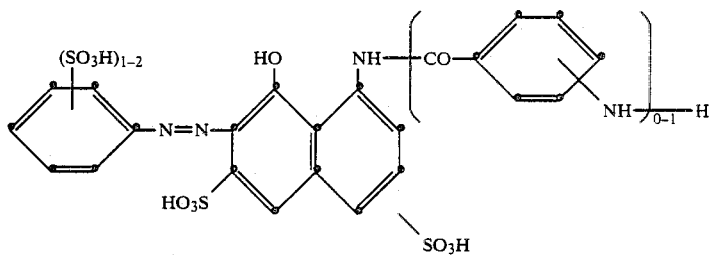

-continued
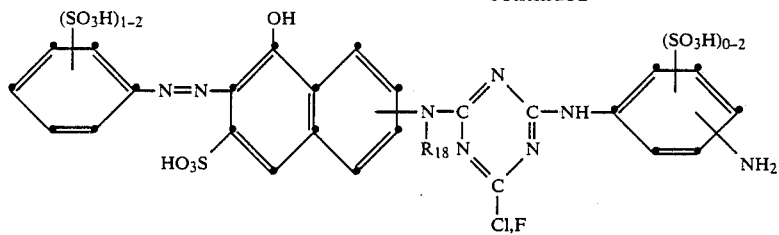
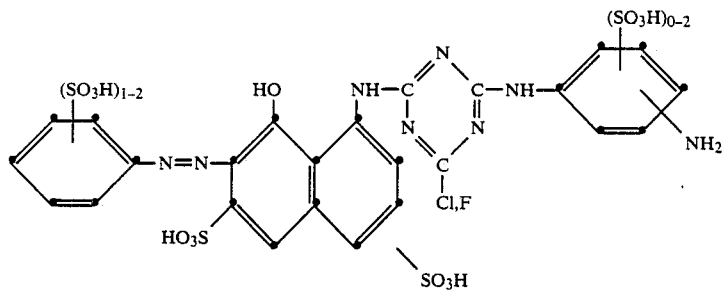
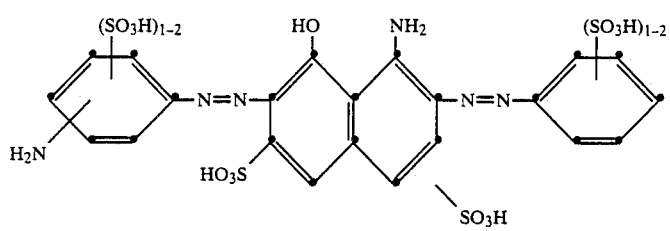
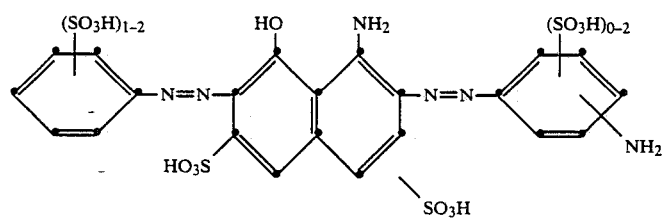
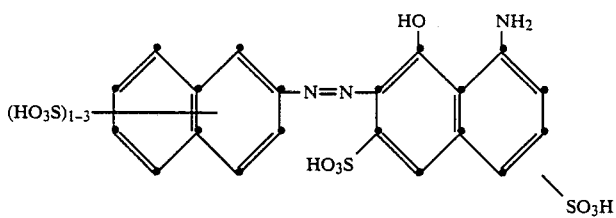
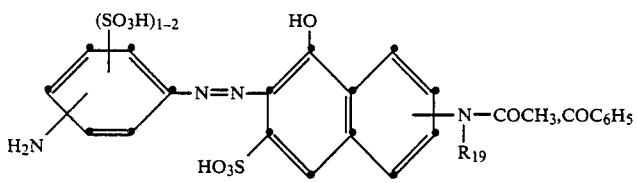
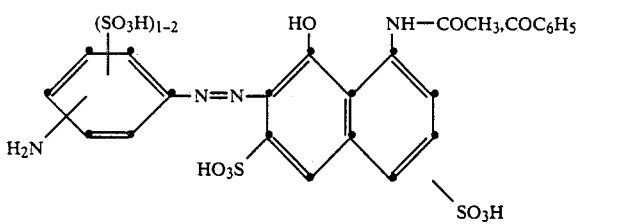

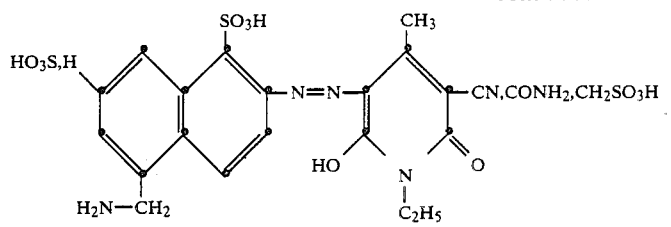

Metal complexes of dyes of the formulae:

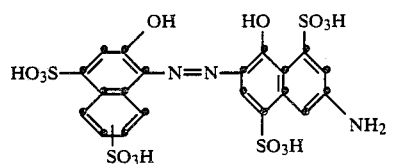

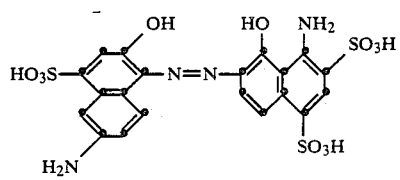

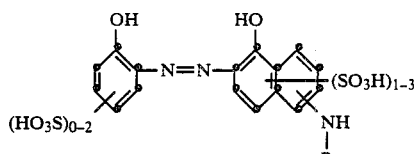

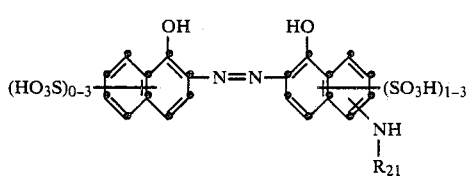

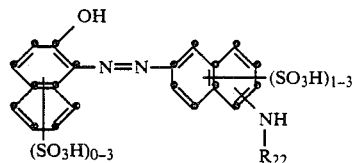

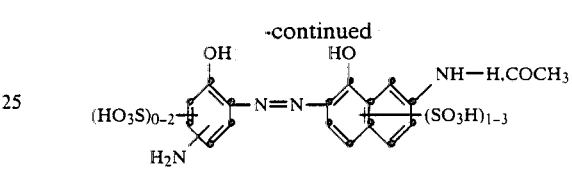

Preferred metal atoms are Cu (1:1 complex) or Cr and Co (1:2 complex). Cr- and Co-complexes can contain the azo compound of the abovementioned formula once or twice, i.e. they can be of symmetrical structure or, by incorporating any other ligands, of asymmetrical structure.

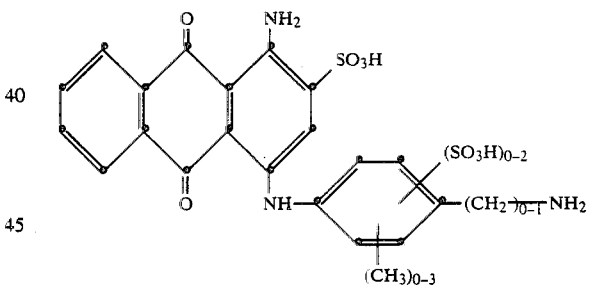

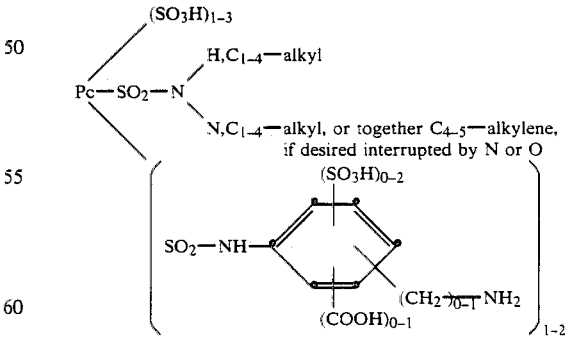

In the formula, Pc is the Cu- or Ni-phthalocyanine radical, and the total number of substituents on the Pc skeleton is 4.

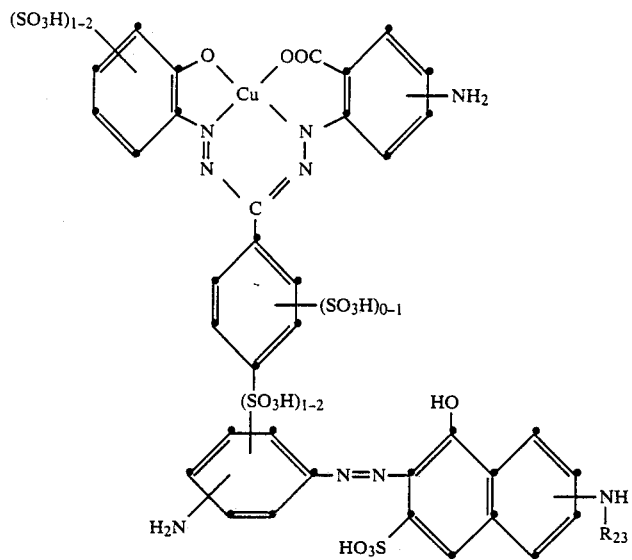
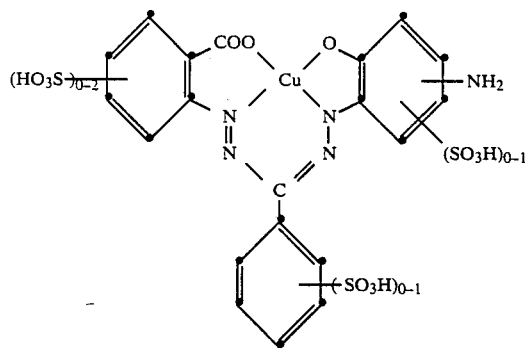
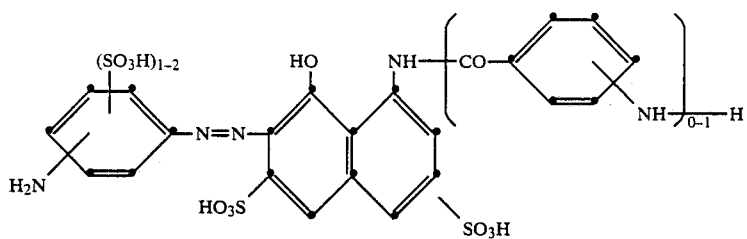
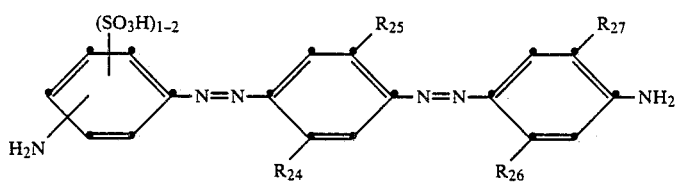
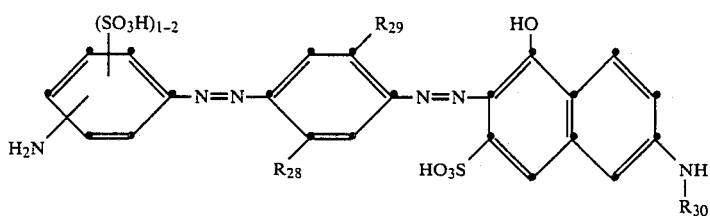

-continued
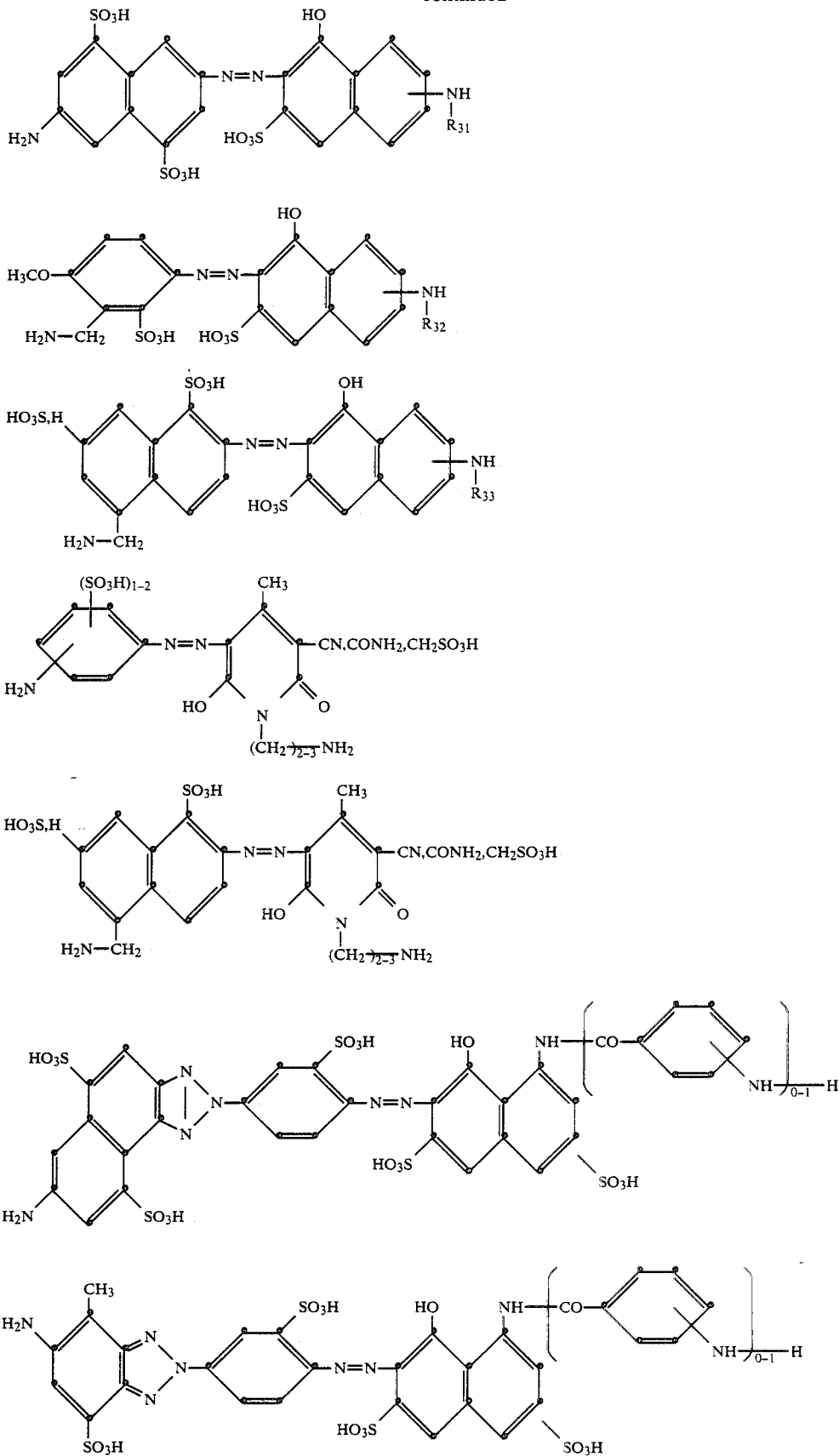

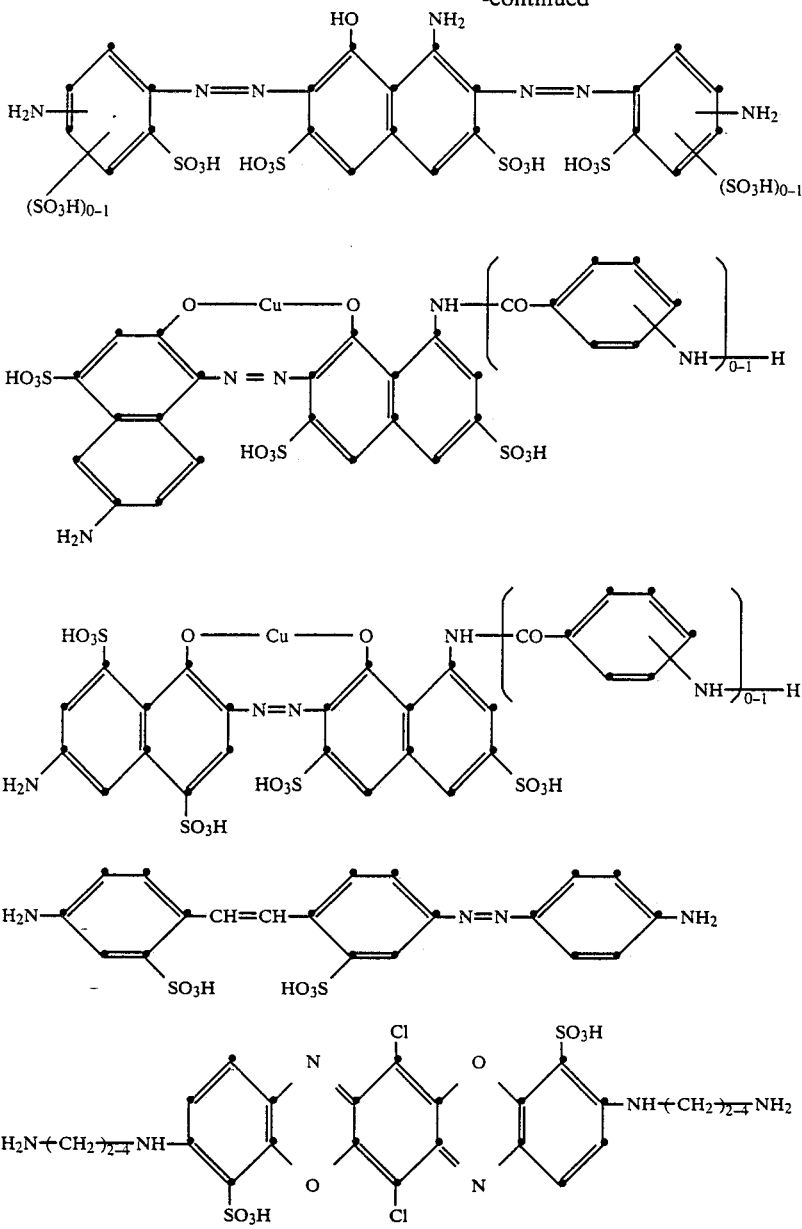

In the formulae listed above, the radicals $R_{17}$ to $R_{23}$ and $R_{30}$ to $R_{33}$ are hydrogen or $C_{1-4}$-alkyl, and the radicals $R_{15}$, $R_{16}$ and $R_{24}$ to $R_{29}$ are hydrogen, $C_{1-4}$-alkyl, $C_{1-4}$-alkoxy, $C_{1-4}$-alkanoylamino, ureido, or halogen, the radicals $R_{15}$, $R_{16}$ ... etc. which belong to one and the same formula being independent of one another. Preferably the radicals $R_{17}$ to $R_{23}$ and $R_{30}$ the [sic] $R_{33}$ are hydrogen, methyl or ethyl, and the radicals $R_{15}$, $R_{16}$ and $R_{24}$ to $R_{29}$ are hydrogen, methyl, ethyl methoxy, ethoxy, acetylamino, ureido or chlorine. The aromatic rings in the above dyes can be further substituted, the benzene rings in particular by methyl, methoxy, ethoxy, carboxyl, acetylamino or chlorine, and the naphthalene rings in particular by methoxy, carboxyl, acetylamino, nitro or chlorine; the same applies to the anthraquinones, dioxazines and so on. Preferably the benzene rings are not further substituted. The diazo components used in this case are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid.

Specific examples of diazo and coupling components are:

Diazo components

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide, -N-methylamide, -N-ethylamide, -N,N-dimethylamide or -N,N-diethylamide, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and 2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 2-aminonaphthalene-3,6- or -5,7-disulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4sulfonic acid, 3-(3'- and 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diaminobenzene-2-methylbenzene, 4,4'-diaminodiphenyl oxide, 4,4'-diaminodiphenyl urea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not to be a diamine but an aminoacetylamino compound from which the acetyl group is subsequently reeliminated by hydrolysis, as is described above in the explanations of the process variants, the monoacetyl compounds of the abovementioned diazo components, for example 1-acetylamino-3-aminobenzene-4-sulfonic acid or 1-acetylamino-4-aminobenzene-3-sulfonic acid, are possible.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or 4,7-disulfonic acid, 1-amino-3-methylbenzene, 1-amino-2-methoxy-5-methylbenzene, 1-amino-2,5-dimethylbenzene, 3-aminophenyl urea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-5-one, 1-phenyl-3-methyl-5-pyrazolone, 1-(4'-sulfophenyl)-3-methyl-5-pyrazolone, 1-(4'-sulfophenyl)-pyrazol-5-one-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphth-2'-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-2-(phenylazo)naphthalene-3,6-disulfonic acid, 1-amino-8-hydroxy-2-(4'-sulfophenylazonaphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxypyrid-2-one, 1-γ-aminopropyl-3-sulfomethyl-4-methyl-6-hydroxypyrid-2-one, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-di-sulfobenzylaminobenzene.

Triazines of the formula (17).

2,4,6-Trifluoro-s-triazine (cyanuric fluoride), 2,4,6-trichloro-s-triazine (cyanuric chloride), 2,4,6-tribromo-s-triazine (cyanuric bromide).

Compounds of the formula (18)

1-β-(β'-chloroethylsulfonyl)-ethylcarbamoyl-3-aminobenzene,
1-β-(β'-chloroethylsulfonyl)-ethylcarbamoyl-4-chloro-3-aminobenzene,
1-β-(β'-chloroethylsulfonyl)-ethylcarbamoyl-4-methyl-3-aminobenzene,
1-β-(β'-chloroethylsulfonyl)-ethylcarbamoyl-4-methoxy-3-aminobenzene,
1-β-[β'-(β''-chloroethylsulfonyl)ethyloxy]-ethylcarbamoyl-3-aminobenzene,
1-γ-(β'-chloroethylsulfonyl)-propylcarbamoyl-3-aminobenzene,
1-bis-[β-(β'-chloroethylsulfonyl)-ethyl]-carbamoyl-3-aminobenzene,
1-bis[γ-(β'-chloroethylsulfonyl)-propyl]-carbamoyl-3-aminobenzene,
1-β-(β'-chloroethylsulfonyl)-ethylcarbamoyl-3-N-ethylaminobenzene
1-β-(β'-chloroethylsulfonyl)-ethylcarbamoyl-3-N-isopropylaminobenzene,
1-γ-(β'-chloroethylsulfonyl)-propylcarbamoyl-3-N-isopropylaminobenzene,
1-β-(β'-chloroethylsulfonyl)-ethylcarbamoyl-4-aminobenzene,
1-β[β'-(β''-chloroethylsulfonyl)ethyloxy]-ethylcarbamoyl-4-aminobenzene,
1-γ-(β'-chloroethylsulfonyl)propylcarbamoyl-4-aminobenzene,
1-bis-[β-(β'-chloroethylsulfonyl)-ethyl]-carbamoyl-4-aminobenzene,
1-bis-[γ-(β'-chloroethylsulfonyl)-propyl]-carbamoyl-4-aminobenzene,
1-β-(β'-chloroethylsulfonyl)-ethylcarbamoyl-4-N-ethylaminobenzene,
1-γ-(β'-chloroethylsulfonyl)-propylcarbamoyl-4-N-isopropylaminobenzene,
1-β-(vinylsulfonyl)-ethylcarbamoyl-4-aminobenzene,
1-bis-[β-(vinylsulfonyl)-ethyl]-carbamoyl-4-aminobenzene,
1-δ-(β'-chloroethylsulfonyl)-butylcarbamoyl-4-aminobenzene,
1-bis-[β-(β'-chloroethylsulfonyl)-ethyl]-carbamoyl-4-chloro-3-aminobenzene,
1-bis-[β-(β'-chloroethylsulfonyl)-ethyl]-carbamoyl-4-methyl-3-aminobenzene,
1-bis-[γ-(β'-chloroethylsulfonyl)-propyl]-carbamoyl-4-methoxy-3-aminobenzene,
1-δ-(β'-chloroethylsulfonyl)-butylcarbamoyl-3-aminobenzene,
1-β-[β'-(β''-chloroethylsulfonyl)-ethyloxy]-ethylcarbamoyl-3-aminobenzene,
1-β-(β'-chloroethylsulfonyl)-ethylcarbamoyl-4-hydroxy-3-aminobenzene,
1-bis-[β-(β'-chloroethylsulfonyl)-ethyl]-4-hydroxy-3-aminobenzene,
1-bis-[β-(β'-chloroethylsulfonyl)-ethyl]-carbamoyl-4-methoxy-3-aminobenzene,
and corresponding compounds in which the β-chloroethylsulfonyl group is replaced by β-sulfatoethylsulfonyl or vinylsulfonyl; also suitable are:
1-β-(β'-chloroethylsulfonyl)-ethylcarbamoyl-4-amino-3-sulfobenzene,
1-β-(β'-sulfatoethylsulfonyl)-ethylcarbamoyl-4-amino-3-sulfobenzene,
1-β-vinylsulfonylethylcarbamoyl-4-amino-3-sulfobenzene,
1-β-vinylsulfonylethylcarbamoyl-3-amino-2-sulfobenzene,
1-β-(β'-sulfatoethylsulfonyl)-ethylcarbamoyl-3-amino-4-methoxybenzene, 1-bis-(β-vinylsulfonylethyl)-carbamoyl-4-amino-3-sulfobenzene,
1-bis-[β-(β'-sulfatoethylsulfonyl)-ethyl]-carbamoyl-3-amino-4-methoxybenzene,
1-bis-(β-vinylsulfonylethyl)-carbamoyl-3-amino-2-sulfobenzene,
1-(3-amino-4-methoxybenzoyl)-N'-(γ-vinylsulfonylpropyl)-piperazine,
1-bis-(β-vinylsulfonylethyl)-carbamoyl-4-amino-3-methoxybenzene,
1-β-(β'-vinylsulfonylethylamino)-ethylcarbamoyl-3-aminobenzene,
1-(3-amino-4-methylbenzoyl)-N'-(β-vinylsulfonylethyl)-piperazine,
1-bis-[β-(β'-sulfatoethylsulfonyl)-ethyl]-carbamoyl-4-amino-3-sulfobenzene,
1-bis-(β-vinylsulfonylethyl)-carbamoyl-3-amino-4-methoxybenzene,
1-(β-vinylsulfonylethyl)-carbamoyl-3-amino-4-methoxybenzene,
1-(4-amino-3-sulfobenzoyl)-N'-(γ-vinylsulfonylpropyl)-piperazine,
1-β-(β'-vinylsulfonylethylamino)-ethylcarbamoyl-4-amino-3-sulfobenzene,
1-β-(β'-sulfatoethylsulfonyl)-ethylcarbamoyl-3-amino-4-methylbenzene,
1-bis-[β-(β'-chloroethylsulfonyl)-ethyl]-carbamoyl-4-amino-3-sulfobenzene,
1-(4-amino-3-sulfobenzoyl)-N'-(β-vinylsulfonylethyl)-piperazine,
1-β-(β'-vinylsulfonylethylamino)-ethylcarbamoyl-4-amino-3-sulfobenzene,
5-amino-1,3-bis(β-vinylsulfonylethylcarbamoyl)benzene,
1-β-(β'-vinylsulfonylethyloxy)-ethylcarbamoyl-4-amino-3-sulfobenzene,
and also analogous aminobenzoamides or aminobenzenesulfonamides of the following amino compounds:
β-[β'-(β''-chloroethylsulfonyl)-ethylamino]-ethylamine,
β-(β'-vinylsulfonylethylamino)-ethylamine,
β-[β'-(β''-sulfatoethylsulfonyl)-α'-methylethylamino]-ethylamine,
β[β'-(β''-sulfatoethylsulfonyl)-α'-methylethylamino]-β-methylethylamine,
γ-[β'-(β''-sulfatoethylsulfonyl)-α'-methylethylamino]-propylamine,
δ-[β'-(β''-sulfatoethylsulfonyl)-α'-methylethylamino]-n-butylamine.

The diazotization of the diazo components or of the intermediates containing a diazotizable amino group is generally effected by the action of nitrous acid in aqueous mineral acid solution at low temperature. The coupling onto the coupling component is effected at strongly acid, neutral or weakly alkaline pH.

The condensation of the 2,4,6-trihalogeno-s-triazine with the organic dyes of the formula (16) or the diazotizable and/or couplable components containing an —N(B₁)H group are [sic] preferably effected in aqueous solution or suspensions, at low temperatures, preferably between 0° and 5° C. and at weakly acid, neutral or weakly alkaline pH. Advantageously the hydrogen halide liberated in the course of the condensation is continuously neutralized by adding aqueous alkali metal hydroxides, carbonates or bicarbonates. For the further reaction of the halogenotriazine dyes thus obtained or for the reaction of the 2,4,6-trihalogeno-s-triazine with the compounds of the formula (18), the free amines or salts thereof, preferably in the form of the hydrochloride, are used. The reaction is carried out at temperatures approximately between 0° and 40°, preferably between 5° and 25°, C., in the presence of acid-binding agents, preferably sodium bicarbonate, in a pH range of 2 to 8, preferably 5 to 6.5.

The condensation of the halogenotriazine with a compound of the formula (18) can take place before or after the condensation of the halogenotriazine with a dye of the formula (16). The condensation of the halogenotriazine with a compound of the formula (18) is preferably carried out in aqueous solution or suspension, at low temperature and at weakly acid or neutral pH. Here too the hydrogen halide liberated in the course of the condensation is advantageously neutralized by continuous addition of alkali metal hydroxides, carbonates or bicarbonates.

The synthesis can also be followed by elimination reactions. It is possible for example to treat reactive dyes of the formula (1) which contain sulfatoethylsulfonyl radicals with agents which eliminate hydrogen halide, such as sodium hydroxide, the sulfatoethylsulfonyl radicals converting into vinylsulfonyl radicals.

Of particular significance are also the compounds of the formula

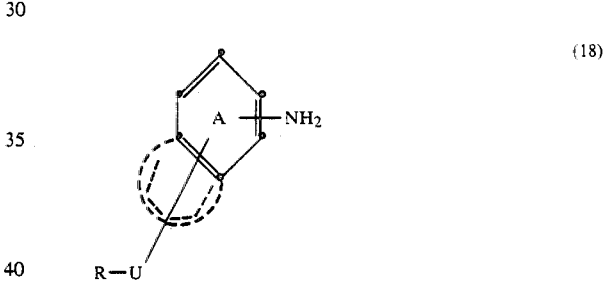

(18)

in which R and U are as defined under the formula (1).

The compounds of the formula (18) can be prepared by condensing the corresponding aminobenzoyl or aminonaphthoyl chlorides or the corresponding sulfonyl chlorides with amines which conform to the radicals of the formula (1a) or (1b); or by starting from a nitrobenzoyl or nitronaphthoyl chloride or nitrosulfonyl chloride, condensing with the amine, and reducing the nitro group to the amino group. By another method, described in German Offenlegungsschrift No. 2,040,620, the acid chloride can be reacted with an unsaturated aliphatic amine and 2-mercaptoethanol can be added onto the double bond of the acid amide at temperatures between 50° C. and 180° C. using catalytic amounts of a free radical producer or of sulfur. The resulting hydroxyethyl thioether compounds can also be prepared by condensing the acid chloride with a halogenoalkylamine and heating the condensation product with 2-mercaptoethanol and sodium alcoholate in alcohol. The thioether compounds are then additionally oxidized to the corresponding sulfones.

The oxidation of the thioether compounds to the sulfones can be effected by various methods, for example with hydrogen peroxide with or without the presence of tungsten or vanadium compounds as catalysts, and also with peracetic acid, potassium permanganate or chromic acid, or with chlorine/hydrochloric acid in each case in an aqueous, aqueous/organic or organic medium.

The carboxamides or sulfonamides thus obtainable, in which the —SO₂—Z grouping is a β-hydroxyethylsulfonyl group, can be converted by treatment with sulfating agents, phosphorylating agents, halogenating agents, alkylsulfonic or arylsulfonic acid halides, alkyl- or aryl-carboxylic acid halides or alkyl- or aryl-carboxylic anhydrides into the corresponding dye precursors in which the —SO₂—Z grouping is the —SO₂—CH₂—CH₂—O—SO₃H, —SO₂—CH₂—CH₂—O—PO₃H₂, —SO₂—CH₂—CH₂— halogen or —SO₂—CH₂—CH₂—O— acyl grouping. The products thus obtained can in turn be converted by treatment with alkalizing agents, for example alkali metal hydroxide or alkali metal carbonate, such as sodium hydroxide or sodium carbonate, into corresponding compounds in which the —SO₂—Z grouping is the —SO₂—CH=CH₂ grouping. The products thus obtained can in turn be converted by reaction (addition) with salts of thiosulfuric acid, such as sodium thiosulfate, with dialkylamines, such as dimethylamine or diethylamine, or with phenol into compounds in which the —SO₂—Z grouping is the —SO₂—CH₂—CH₂—S—SO₃H, —SO₂—CH₂—CH₂—N(alkyl)₂ or

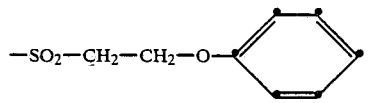

grouping.

Suitable sulfating agents are herein for example concentrated sulfuric acid and also chlorosulfonic acid and amidosulfonic acid or other compounds which give off sulfur trioxide. Suitable phosphorylating agents are herein for example concentrated phosporic acid, pyophosphoric, metaphosphoric or polyphosphoric acid, alkyl polyphosphates, phosphorus oxychloride or mixtures of phosphoric acid and phosphorus(V) oxide. Suitable halogenating agents are for example thionyl chloride or thionyl bromide.

Preference is given to compounds of the formula

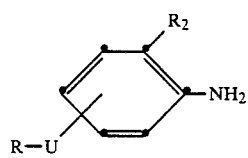 (25)

in which R is a radical of the formula

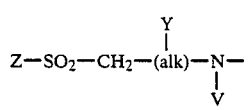 (25a)

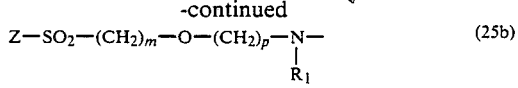 (25b)

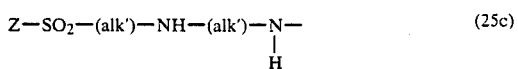 (25c)

or

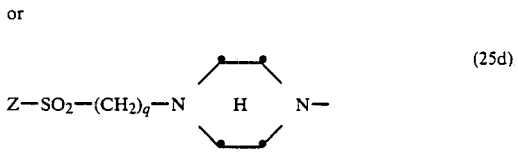 (25d)

U, Z, alk, A, V, R₁, alk', m, p and q are as defined under the formula (1); and R₂ is hydrogen, C₁₋₄-alkyl, C₁₋₄-alkoxy, halogen, hydroxyl, carboxyl or sulfo.

The preferred process for preparing the compounds of the formula (25) comprises condensing a nitrobenzoyl chloride of the formula

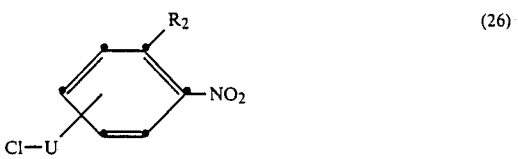 (26)

with an amine of the formula

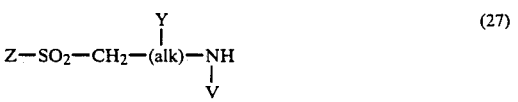 (27)

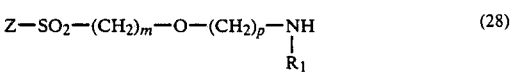 (28)

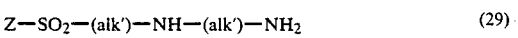 (29)

or

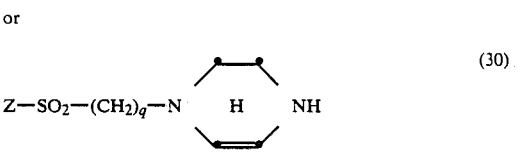 (30)

and reducing the nitro group to the amino group.

The reaction is preferably carried out in a high-boiling organic solvent, for example nitrobenzene. The reduction of the nitro group to the amino group is effected in a manner known per se by catalytic hydrogenation with Pd/carbon in ethanol, ethyl acetate or tetrahydrofuran at room temperature up to about 40° C. The reduction can also be carried out with Fe/hydrochloric acid or Fe/acetic acid in aqueous solution.

In a modification of the process described above, compounds of the formula (25) can also be prepared by condensing a nitrobenzoyl chloride of the formula (26) with an amine of the formula

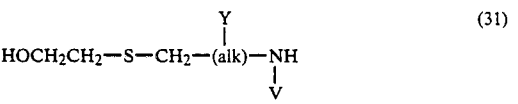 (31)

-continued

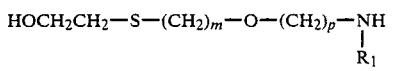

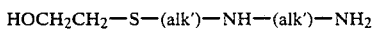

or

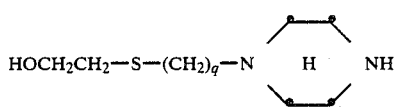

oxidizing the condensation product with elemental chlorine to the corresponding β-chloroethylsulfonyl compound and reducing the nitro group to the amino group.

The condensation of the nitrobenzoyl chloride with the amines of the formulae (31) to (34) is carried out for example in chloroform at room temperature and in the presence of alkaline, acid-binding agents, for example alkali metal hydroxides, carbonates or bicarbonates. The condensation product is subsequently oxidized in a manner known per se with a chlorine/hydrochloric acid mixture. The reduction of the nitro group to the amino group is effected as described above.

The amines of the formulae (27) to (34) used as starting compounds can be prepared analogously to the process of Example 1 of German Offenlegungsschrift No. 2,614,550.

The reactive dyes of the formula (1) are suitable for dyeing and printing a very wide variety of materials, such as silk, leather, wool, polyamide fibers and polyurethanes, and in particular cellulose-containing fiber materials of any kind. These fiber materials are for example the natural cellulose fibers, such as cotton, linen and hemp, and wood pulp and regenerated cellulose. The reactive dyes of the formula (1) are also suitable for dyeing or printing hydroxyl-containing fibers which are contained in blend fabrics, for example blends of cotton with polyester fibers or polyamide fibers.

The dyes according to the invention can be applied to the fiber material and be fixed on the fiber in various ways, in particular in the form of aqueous dye solutions and print pastes. They are suitable not only for the exhaust method of dyeing but also for dyeing by the pad dye method, whereby the cloth is impregnated with aqueous dye solutions which can, if desired, also contain salt, and the dyes are fixed after an alkali treatment or in the presence of alkali, if desired, with heating. They are particularly suitable for the so-called cold pad-batch method, whereby the dye is applied together with the alkali on the pad-mangle and is then fixed by storing at room temperature for several hours. After fixing, the dyeings or prints are thoroughly rinsed with cold and hot water, if desired in the presence of an agent which acts like a dispersant and promotes the diffusion of the unfixed portions.

The reactive dyes of the formula (1) are distinguished by high reactivity, good fixing properties and very good bath stability. They can therefore be used in the exhaust dyeing method at low dyeing temperatures and only require short steaming times in the pad-steam method. The degrees of fixation are high, and the unfixed portions can be readily washed off, the difference between the degree of exhaustion and the degree of fixation being remarkably small, i.e. the hydrolysis loss being very low. The reactive dyes of the formula (1) are also particularly suitable for printing, especially on cotton, but also for printing nitrogen-containing fibers, for example wool, silk or wool-containing blend fabrics.

The dyeings and prints on cellulose fiber materials prepared with the dyes according to the invention have a high tinctorial strength and a high fiber-dye bond stability not only in the acid but also in the alkaline range, as well as a good light fastness and very good wet fastness properties, such as wash, water, seawater, cross-dyeing and perspiration fastness properties, and a good pleating fastness, hot press fastness and crock fastness.

The following examples serve to illustrate the invention. The temperatures are given in degrees Celsius, and parts and percentages are by weight unless otherwise stated. Parts by weight relate to parts by volume as the kilogram relates to the liter.

The preparation of the monoazo or disazo intermediate compound has not been described in all cases in the examples which follow, but it is immediately evident from the general description.

EXAMPLE 1

A solution of 48.3 parts of 1-(4'-sulfophenyl)-3-carboxy-4-(4'-amino-2'-sulfophenylazo)-pyrazol-5-one in 750 parts of ice-water is reacted at 0°–2° C. and pH 5 with 14 parts of cyanuric fluoride. As soon as free amino groups are no longer detectable, 30 parts of 4-amino-1-β-(β'-chloroethylsulfonyl)-ethylcarbamoylbenzene hydrochloride are added and reacted at 0°–20° C. and pH 5–7. The dye obtained on precipitation with potassium chloride and gentle drying dyes cotton in fast golden yellow shades. It has the formula

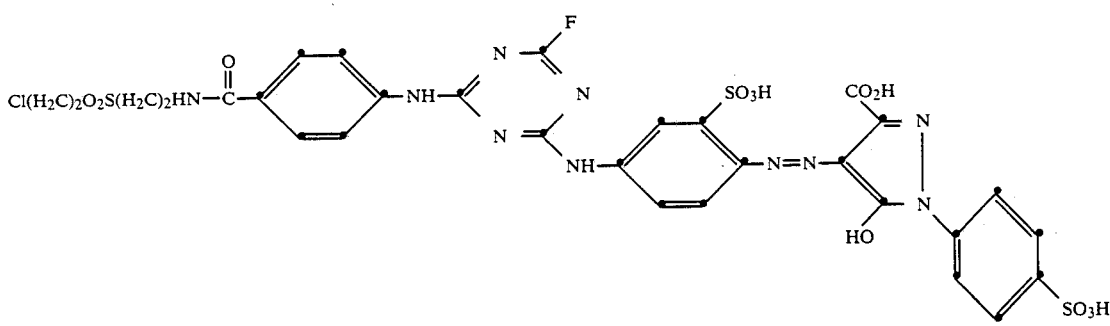

EXAMPLE 2

The condensation product of 18.8 parts of 1,3-phenylenediamine-4-sulfonic acid and 19 parts of cyanuric chloride is diazotized in the presence of hydrochloric acid, and 28.5 parts of 1-(4'-sulfophenyl)-3-carboxypyrazol-5-one are added and coupled at pH 5–7. After addition of a solution of 30 parts of 4-amino-1-β-(β'-chloroethylsulfonyl)-ethylcarbamoylben-zene the temperature is raised to 40° C. and a pH value of 7.5 is established. After the condensation has ended, the dye is precipitated with potassium chloride from neutral solution and dried under gentle conditions. It dyes cotton in fast yellow shades and has the formula

EXAMPLE 3

The condensation product of 18.8 parts of 1,3-phenylenediamine-4-sulfonic acid and 19 parts of cyanuric chloride is diazotized in the presence of hydrochloric acid, and 28.5 parts of 1-(4'-sulfophenyl)-3-carboxypyrazol-5-one are added and coupled at pH 5–7. After addition of a solution of 30 parts of 3-amino-1-β-(β'-chloroethylsulfonyl)-ethylcarbamoylbenzene the temperature is raised to 40° C. and a pH value of 7.5 is established. After the condensation has ended, the dye is precipitated with potassium chloride from neutral solution and dried under gentle conditions. It dyes cotton in fast yellow shades and has the formula

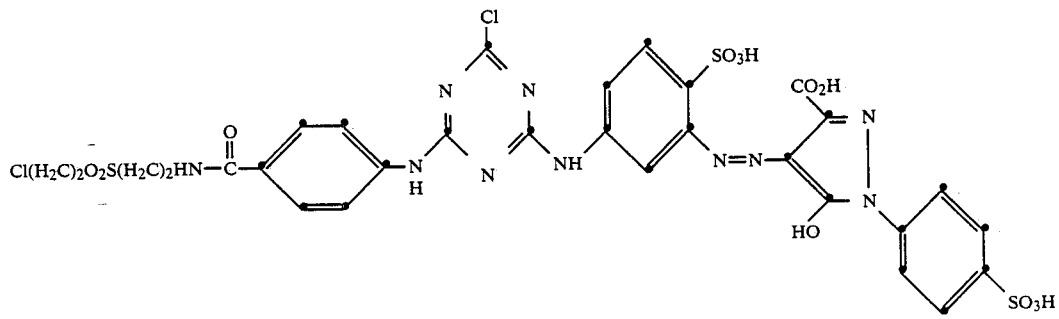

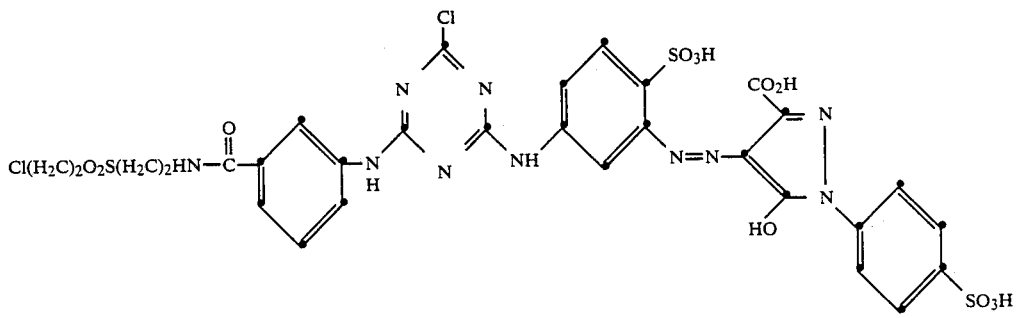

Further dyes according to the invention are listed in Table 1, column I listing the compound used in place of 1,3-phenylenediamine-4-sulfonic acid, column II the coupling component used in place of 1-(4'-sulfophenyl)-3-carboxypyrazol-5-one, column III the reactive radical T present in the dye, and column IV the hue obtained on cotton.

The reactive amines of the formula (18), $T_1$ to $T_{19}$, mentioned in Table 1 and the other tables are the following compounds:

$T_1$: 3-amino-1-β-(β'-chloroethylsulfonyl)-ethylcarbamoylbenzene, $T_2$: 4-chloro-3-amino-1-β-(β'-chloroethylsulfonyl)-ethylcarbamoylbenzene, $T_3$: 4-methyl-3-amino-1-β-(β'-chloroethylsulfonyl)-ethylcarbamoylbenzene, $T_4$: 4-methoxy-3-amino-1-β-(β'-chloroethylsulfonyl)-ethylcarbamoylbenzene, $T_5$: 3-amino-1-β-[β'-(β''-chloroethylsulfonyl)-ethyloxy]ethylcarbamoylbenzene, $T_6$: 3-amino-1-γ-(β'-chloroethylsulfonyl)-propylcarbamoylbenzene, $T_7$: 3-amino-1-bis-[β-(β'-chloroethylsulfonyl)-ethyl]-carbamoylbenzene, $T_8$: 3-amino-1-bis-[γ-(β'-chloroethylsulfonyl)-propyl]-carbamoylbenzene, $T_9$: 3-N-ethylamino-1-β-(β'-chloroethylsulfonyl)-ethylcarbamoylbenzene, $T_{10}$: 3-N-isopropylamino-1-β-(β'-chloroethylsulfonyl)-ethylcarbamoylbenzene, $T_{11}$: 3-N-isopropylamino-1-γ-(β'-chloroethylsulfonyl)-propylcarbamoylbenzene, $T_{12}$: 4-β-(β'-chloroethylsulfonyl)-ethylcarbamoylbenzene, $T_{13}$: 4-amino-1-β-[β'-(β''-chloroethylsulfonyl)-ethyloxy]ethylcarbamoylbenzene, $T_{14}$: 4-amino-1-Γ-(β'-chloroethylsulfonyl)-propylcarbamoylbenzene, $T_{15}$: 4-amino-1-bis-[β-(β'-chloroethylsulfonyl)-ethyl]-carbamoylbenzene, $T_{16}$: 4-amino-1-bis-[γ-(β'-chloroethylsulfonyl)-prpyl]-carbamoylbenzene, $T_{17}$: 4-N-ethylamino-1-β-(β'-chloroethylsulfonyl)-ethylcarbamoylbenzene, $T_{18}$: 4-N-isopropylamino-1-β-(β'-chloroethylsulfonyl)-ethylcarbamoylbenzene, $T_{19}$: 4-N-isopropylamino-1-γ-(β'-chloroethylsulfonyl)-propylcarbamoylbenzene.

TABLE 1

| Example | I | II | III | IV |
|---|---|---|---|---|
| 4 | 1,3-diaminobenzene-4-sulfonic acid | 1-(2'-methyl-4'-sulfophenyl)-3-carboxypyrazol-5-one | $T_2$ | yellow |
| 5 | 1,3-diaminobenzene-4-sulfonic acid | 1-naphthol-3,6-disulfonic acid | $T_3$ | orange |
| 6 | 1,3-diaminobenzene-4-sulfonic acid | 1-naphthol-3,8-disulfonic acid | $T_4$ | scarlet |
| 7 | 1,3-diaminobenzene-4-sulfonic acid | 1-naphthol-4,8-disulfonic acid | $T_5$ | yellowish red |
| 8 | 1,3-diaminobenzene-4-sulfonic acid | 1-naphthol-7-(3'-sulfophenyl)-amino-3-sulfonic acid | $T_6$ | brown |
| 9 | 1,3-diaminobenzene-4-sulfonic acid | 1-naphthol-7-(3'-sulfophenyl)-amino-3-sulfonic acid | $T_{13}$ | brown |
| 10 | 1,3-diaminobenzene-4-sulfonic acid | 1-ethyl-2-hydroxy-4-methyl-5-aminocarbonyl-pyrid-2-one | $T_{14}$ | yellow |
| 11 | 1,3-diaminobenzene-4-sulfonic acid | 1-(4'-sulfophenyl)-3-carboxypyrazol-5-one | $T_9$ | yellow |
| 12 | 1,3-diaminobenzene-4-sulfonic acid | 1-(4'-sulfophenyl)-3-carboxypyrazol-5-one | $T_{10}$ | yellow |
| 13 | 1,3-diaminobenzene-4-sulfonic acid | 1-(4'-sulfophenyl)-3-carboxypyrazol-5-one | $T_{11}$ | yellow |
| 14 | 1,3-diaminobenzene-4-sulfonic acid | 1-(4'-sulfophenyl)-3-carboxypyrazol-5-one | $T_{17}$ | yellow |
| 15 | 1,4-diaminobenzene-2,5-disulfonic acid | 2-isopropoxy-4,5-dihydroxypyrimidine | $T_{18}$ | yellow |
| 16 | 1,3-diaminobenzene-4,6-disulfonic acid | 1-phenyl-3-carboxypyrazol-5-one | $T_{19}$ | yellow |
| 17 | 1,3-diaminobenzene-4-sulfonic acid | 1,4-dimethyl-6-oxy-2-pyrid-3-onesulfonic acid | $T_1$ | greenish yellow |
| 18 | 1,3-diaminobenzene-4-sulfonic acid | 1-ethyl-4-methyl-6-oxy-2-pyrid-3-one carboxamide | $T_1$ | greenish yellow |
| 19 | 1,3-diaminobenzene-4-sulfonic acid | 1-ethyl-4-methyl-6-oxy-2-pyrid-3-one carboxamide | $T_7$ | greenish yellow |
| 20 | 1,3-diaminobenzene-4-sulfonic acid | 1-ethyl-4-methyl-6-oxy-2-pyrid-3-one carboxamide | $T_8$ | greenish yellow |
| 21 | 1,4-diaminobenzene-6-Sulfonic acid | 1-ethyl-4-methyl-6-oxy-2-pyrid-3-one carboxamide | $T_{12}$ | greenish yellow |
| 22 | 1,4-diaminobenzene-6-Sulfonic acid | 1-butyl-4-methyl-6-oxy-2-pyrid-3-one carboxamide | $T_1$ | greenish yellow |
| 23 | 1,3-diaminobenzene-4-sulfonic acid | 1-ethyl-4-methyl-6-oxy-2-pyrid-3-one methanesulfonic acid | $T_1$ | greenish yellow |
| 24 | 1,3-diaminobenzene-4-sulfonic acid | 1-ethyl-4-methyl-6-oxy-2-pyrid-3-one methanesulfonic acid | $T_{15}$ | greenish yellow |
| 25 | 1,3-diaminobenzene-4-sulfonic acid | 1-ethyl-4-methyl-6-oxy-2-pyrid-3-one methanesulfonic acid | $T_{16}$ | greenish yellow |

EXAMPLE 26

30.3 parts of 2-aminonaphthalene-4,8-disulfonic acid are diazotized in the presence of hydrochloric acid and coupled onto 15 parts of 3-acetylaminoaniline. Acylation with 19 parts of finely dispersed cyanuric chloride is followed at 20° C. and pH 6-7 by reaction with 30 parts of 4-amino-1-β-(β'-chloroethylsulfonyl)-ethylcarbamoylbenzene and salting out with potassium chloride. The dye obtained after gentle drying dyes cotton in fast reddish yellow hues and has the formula

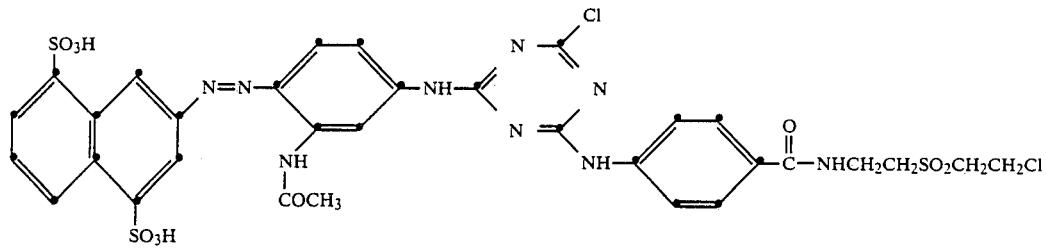

EXAMPLE 27

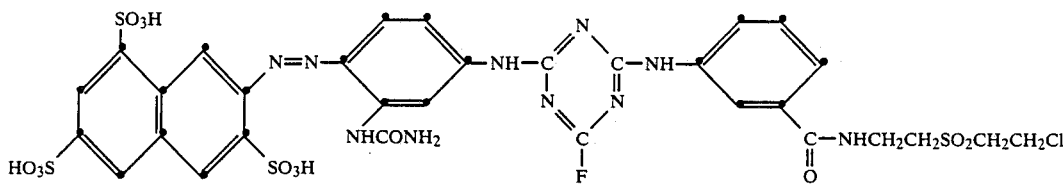

30.3 parts of 2-aminonaphthalene-4,8-disulfonic acid are diazotized in the presence of hydrochloric acid and coupled onto 15 parts of 3-acetylaminoaniline. Acylation with 14 parts of cyanuric fluoride at 0°–2° C. and pH 6–7, is followed by reaction at 20° C. and pH 6–7 with 30 parts of 4-amino-1-$\beta$-($\beta'$-chloroethylsulfonyl)-ethylcarbamoylbenzene and salting out with potassium chloride. The dye obtained after gentle drying dyes cotton in fast reddish yellow hues and has the formula

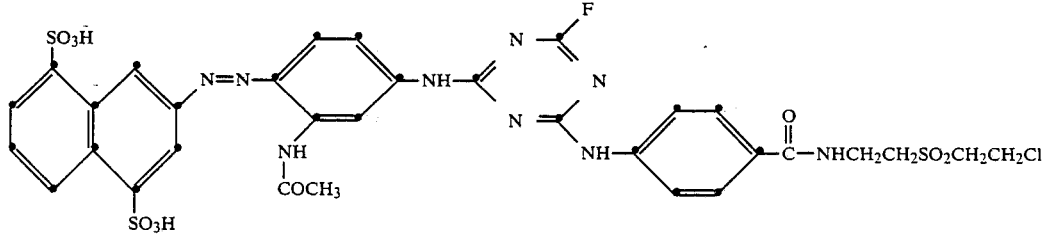

EXAMPLE 28

To the neutral solution in 500 parts of water of 30.5 parts of the trisodium salt of the aminoazo dye obtained by coupling diazotized 2-aminonaphthalene-3,6,8-trisulfonic acid with 3-aminophenylurea in an acetic acid medium are added at 0° C. 7 parts of cyanuric fluoride, while a pH value of 6 to 6.5 is maintained by constant addition of 2N sodium hydroxide solution.

15 parts of 3-amino-1-$\beta$-($\beta'$-chloroethylsulfonyl)e-thylcarbamoylbenzene hydrochloride are then added and reacted at 0°–20° C. pH 6–7. The condensation is continued until starting dye is no longer detectable by chromatography. The resulting dye of the formula

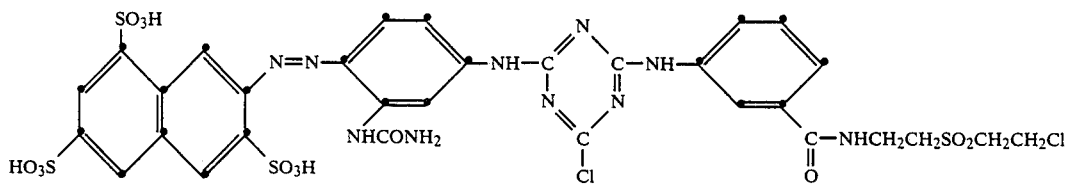

is salted out with sodium chloride, filtered off with suction, washed and dried in vacuo. It dyes cellulose materials in very fast reddish yellow shades.

EXAMPLE 29

To the neutral solution in 500 parts of water of 30.5 parts of the trisodium salt of the aminoazo dye obtained by coupling diazotized 2-aminonaphthalene-3,6,8-trisulfonic acid with 3-aminophenylurea in an acetic acid medium are added at 0° C. 7 parts of cyanuric chloride, while a pH value of 6 to 6.5 is maintaind by constant addition of 2N sodium hydroxide solution.

15 parts of 3-amino-1-$\beta$-($\beta'$-chloroethylsulfonyl)e-thylcarbamoylbenzene hydrochloride are then added and reacted at 0°–20° C. pH 6–7. The condensation is continued until starting dye is no longer detectable by chromatography. The resulting dye of the formula is salted out with sodium chloride, filtered off with suction, washed and dried in vacuo. It dyes cellulose materials in very fast reddish yellow shades.

EXAMPLE 30

To the neutral solution in 500 parts of water of 30.5 parts of the trisodium salt of the aminoazo dye obtained by coupling diazotized 2-aminonaphthalene-3,6,8-trisulfonic acid with 3-aminophenylurea in an acetic acid medium are added at 0° C. 7 parts of cyanuric chloride, while a pH value of 6 to 6.5 is maintained by constant addition of 2N sodium hydroxide solution.

15 parts of 4-amino-1-$\beta$-($\beta'$-chloroethylsulfonyl)ethylcarbamoylbenzene hydrochloride are then added and reacted at 0°-20° C. pH 6-7. The condensation is continued until starting dye is no longer detectable by chromatography. The resulting dye of the formula

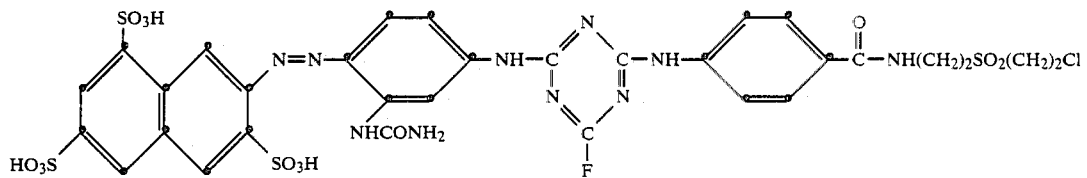

is salted out with sodium chloride, filtered off with suction, washed and dried in vacuo. It dyes cellulose materials in very fast reddish shades.

Further dyes according to the invention are listed in Table 2, column I indicating the diazo component used in place of 2-aminonaphthalene-3,6,8-trisulfonic acid, column II the coupling component used in place of 3-aminophenylurea, column III the reactive amine used and column IV the hue obtained on cotton.

TABLE 2

| Example | I | II | III | IV |
|---|---|---|---|---|
| 31 | 2-aminonaphthalene-6,8-disulfonic acid | 3-acetylamino-aniline | $T_5$ | golden yellow |
| 32 | 2-aminonaphthalene-6,8-disulfonic acid | 3-pivaloyl-aminoaniline | $T_1$ | golden yellow |
| 33 | 2-aminonaphthalene-3,6,8-trisulfonic acid | 3-aminophenyl-urea | $T_{13}$ | golden yellow |
| 34 | 2-aminonaphthalene-3,6,8-trisulfonic acid | 3-aminophenyl-urea | $T_{14}$ | golden yellow |
| 35 | 2-aminonaphthalene-3,6,8-trisulfonic acid | 3-aminophenyl-urea | $T_5$ | golden yellow |
| 36 | 2-aminonaphthalene-3,6,8-trisulfonic acid | 3-aminophenyl-urea | $T_6$ | golden yellow |
| 37 | 2-aminonaphthalene-3,6,8-trisulfonic acid | N—phenyl-N'—(3-aminophenyl)-urea | $T_1$ | golden yellow |
| 38 | 2-aminonaphthalene-3,6,8-trisulfonic acid | N—(3-aminophenyl)-N'—methylurea | $T_{12}$ | golden yellow |
| 39 | 2-aminonaphthalene-4,8-disulfonic acid | N—cyclohexyl-N'—(3-aminophenyl)-urea | $T_1$ | golden yellow |
| 40 | 2-aminonaphthalene-4,8-disulfonic acid | N—cyclohexyl-N'—(3-aminophenyl)-urea | $T_{12}$ | golden yellow |
| 41 | 2-aminonaphthalene-4,8-disulfonic acid | 3-methylsulfonylamino-aniline | $T_1$ | golden yellow |
| 42 | 2-aminonaphthalene-1,6-disulfonic acid | 3-aminophenylurea | $T_1$ | golden yellow |
| 43 | 2-aminonaphthalene-1,6-disulfonic acid | N—(3-aminophenyl)-N'—methylurea | $T_{12}$ | golden yellow |
| 44 | 2-aminonaphthalene-1,5-disulfonic acid | 3-acetyl-aminoaniline | $T_1$ | golden yellow |
| 45 | 2-aminonaphthalene-1,5-disulfonic acid | 3-acetyl-aminoaniline | $T_{12}$ | golden yellow |
| 46 | 2-aminonaphthalene-4,6,8-trisulfonic acid | aniline | $T_5$ | golden yellow |
| 47 | 2-aminonaphthalene-4,6,8-trisulfonic acid | N—methyl-aniline | $T_1$ | golden yellow |
| 48 | 2-aminonaphthalene-4,6,8-trisulfonic acid | 3-aminotoluene | $T_1$ | golden yellow |
| 49 | 2-aminonaphthalene-4,6,8-trisulfonic acid | 3-aminoanisole | $T_1$ | golden yellow |
| 50 | 2-aminonaphthalene-4,6,8-trisulfonic acid | 2-amino-4-acetaminotoluene | $T_1$ | golden yellow |
| 51 | 2-aminonaphthalene-4,6,8-trisulfonic acid | 2-amino-4-acetaminoanisole | $T_1$ | golden yellow |
| 52 | 2-aminonaphthalene-5,7-disulfonic acid | 3-amino-4-methoxytoluene | $T_1$ | golden yellow |
| 53 | 2-aminonaphthalene-5,7-disulfonic acid | 3-toluidine | $T_1$ | golden yellow |
| 54 | 2-aminonaphthalene-5,7-disulfonic acid | 1-naphthylamine-8-sulfonic acid | $T_1$ | golden yellow |
| 55 | 2-aminonaphthalene-1,6-disulfonic acid | 2-aminotoluene | $T_1$ | golden yellow |
| 56 | 2-aminonaphthalene-1,6-disulfonic acid | 2-aminoanisole | $T_1$ | golden yellow |
| 57 | 2-aminonaphthalene-1,6-sulfonic acid | 2,5-dimethyl-aniline | $T_{12}$ | golden yellow |
| 58 | 2-aminonaphthalene-1,6-sulfonic acid | 2-methoxy-5-methylaniline | $T_{12}$ | golden yellow |
| 59 | aniline-2,5-disulfonic acid | 2,5-dimethoxy-aniline | $T_1$ | golden yellow |
| 60 | aniline-2,5-disulfonic acid | o-phenetidine | $T_{12}$ | golden yellow |
| 61 | aniline-2,5-disulfonic acid | m-phenetidine | $T_5$ | golden yellow |
| 62 | aniline-2,5-disulfonic acid | 1-naphthylamine-5-sulfonic acid | $T_3$ | golden yellow |
| 63 | aniline-2,5-disulfonic acid | 1-naphthylamine-7-sulfonic acid | $T_4$ | golden yellow |

EXAMPLE 64

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled down to 0°-5° C. At that temper-

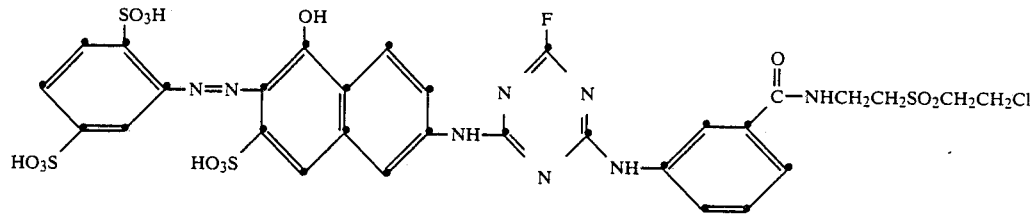

ature 14.2 parts of cyanuric fluoride are added dropwise in the course of 20 minutes, during which the pH of the reaction solution is maintained at 6 to 6.5 by simultaneous addition of 2N sodium hydroxide solution. After addition of 30 parts of 4-amino-1-β-(β'-chloroethylsulfonyl)-ethylcarbamoylbenzene hydrochloride in 100 ml of water, the temperature is raised to 20°-25° C. and the pH is maintained at 5.5 to 6.5. Reaction duration about 2 hours.

To separate out the dye, the neutral solution has added to it 10% of sodium chloride and 10% of potassium chloride, and is filtered. The paste obtained is dried at 40°-50° C. in vacuo. The reactive dye thus prepared has the following structure:

EXAMPLE 65

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled down to 0°-5° C. At that tempera-

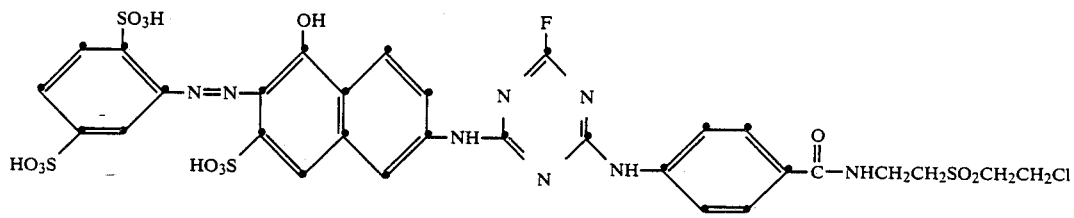

ture 14.2 parts of cyanuric fluoride are added dropwise in the course of 20 minutes, during which the pH of the reaction solution is maintained at 6 to 6.5 by simultaneous addition of 2N sodium hydroxide solution. After addition of 30 parts of 3-amino-1-β-(β'-chloroethylsulfonyl)-ethylcarbamoylbenzene hydrochloride in 100 ml of water, the temperature is raised to 20°-25° C. and the pH is maintaind at 5.5 to 6.5. Reaction duration about 2 hours.

To separate out the dye, the neutral solution has added to it 10% of sodium chloride and 10% of potassium chloride, and is filtered. The paste obtaind is dried at 40°-50° C. in vacuo. The reactive dye thus prepared has the following structure:

EXAMPLE 66

50.3 parts of the dye 2-amino-5-hydroxy-6-(2,5-disulfonylbenzeneazo)-naphthalene-7-sulfonic acid are dissolved in 800 ml of water under neutral conditions, and the solution is cooled down to 0°-5° C. At that temperature 18.4 parts of cyanuric fluoride are added dropwise in the course of 20 minutes, during which the pH of the reaction solution is maintained at 6 to 6.5 by simultaneous addition of 2N sodium hydroxide solution. After addition of 30 parts of 4-amino-1-β-(β'-chloroethylsulfonyl)-ethylcarbamoylbenzene hydrochloride in 100 ml of water, the temperature is raised to 20°-25° C. and the pH is maintained at 5.5 to 6.5. Reaction duration about 2 hours.

To separate out the dye, the neutral solution has added to it 10% of sodium chloride and 10% of potassium chloride, and is filtered. The paste obtained is dried at 40°-50° C. in vacuo. The reactive dye thus prepared has the following structure:

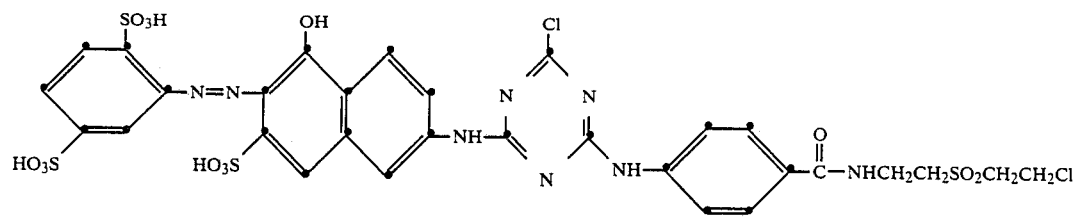

The starting dye 2-amino-5-hydroxy-6-(2',5'-disulfophenylazo)-naphthalene-7-sulfonic acid required for preparing the dye according to the invention can be obtained as follows:

50.6 parts of 2-aminobenzene-1,4-disulfonic acid are dissolved in 120 parts of water under neutral conditions and diazotized in conventional manner. The diazo compound is then added at 0°-5° to a mixture of 56.2 parts of 2-acetamino-5-naphthol-7-sulphonic acid, which have been dissolved in 300 parts of water under neutral conditions, 25 parts of sodium hydrogencarbonate and 150 parts of ice. The pH value is initially 6.5 and rises on prolonged stirring to 7.5–7.8. After the coupling has ended, 60 parts of 10-normal sodium hydroxide solution are added, and to hydrolyze the acetamino group the temperature is raised to 90° for 2 hours. The alkaline solution of orange intermediate dye is neutralized with about 22 parts of 10-normal hydrochloric acid, has added to it 20% of sodium chloride and 15% of potassium chloride, is stirred for some time and filtered.

Further dyes according to the invention are listed in Table 3, column I indicating the diazo component used in place of 2-aminobenzene-1,4-disulfonic acid, column II the coupling component used in place of 2-acetamino-5-naphthol-7-disulfonic acid, column III the reactive amine used, and column IV the hue obtained on cotton.

TABLE 3

| Example | I | II | III | IV |
|---|---|---|---|---|
| 67 | 2-naphthylamine-6,8-disulfonic acid | 2-amino-5-hydroxy-naphthalene-7-sulfonic acid | $T_1$ | scarlet |
| 68 | 2-naphthylamine-6,8-disulfonic acid | 2-amino-5-hydroxy-naphthalene-7-sulfonic acid | $T_{12}$ | scarlet |
| 69 | 2-naphthylamine-5,7-disulfonic acid | 2-amino-5-hydroxy-naphthalene-7-sulfonic acid | $T_1$ | scarlet |
| 70 | 2-naphthylamine-5,7-disulfonic acid | 2-amino-5-hydroxy-naphthalene-7-sulfonic acid | $T_{12}$ | scarlet |
| 71 | 2-naphthylamine-4,7-disulfonic acid | 2-amino-5-hydroxy-naphthalene-7-sulfonic acid | $T_1$ | orange (reddish) |
| 72 | 2-naphthylamine-4,7-disulfonic acid | 2-amino-5-hydroxy-naphthalene-7-sulfonic acid | $T_{19}$ | orange (reddish) |
| 73 | 2-naphthylamine-3,7-disulfonic acid | 2-amino-5-hydroxy-naphthalene-7-sulfonic acid | $T_{12}$ | orange (reddish) |
| 74 | 2-naphthylamine-3,6-disulfonic acid | 2-amino-5-hydroxy-naphthalene-7-sulfonic acid | $T_1$ | orange (reddish) |
| 75 | 2-naphthylamine-7-sulfonic acid | 2-amino-5-hydroxy-naphthalene-7-sulfonic acid | $T_{14}$ | orange (reddish) |
| 76 | 2-naphthylamine-1,7-disulfonic acid | 2-amino-5-hydroxy-naphthalene-7-sulfonic acid | $T_{12}$ | orange (reddish) |
| 77 | aniline | 2-amino-5-hydroxy-naphthalene-7-sulfonic acid | $T_1$ | orange |
| 78 | aminotoluene-3,5-disulfonic acid | 2-amino-5-hydroxy-naphthalene-7-sulfonic acid | $T_{12}$ | orange |
| 79 | 4-aminophenetol-1,3-sulfonic acid | 2-amino-5-hydroxy-naphthalene-7-sulfonic acid | $T_{12}$ | scarlet |
| 80 | 4-aminoanisole-1,3-sulfonic acid | 2-amino-5-hydroxy-naphthalene-7-sulfonic acid | $T_1$ | scarlet |
| 81 | 4-aminoanisole-2-sulfonic acid | 2-amino-5-hydroxy-naphthalene-7-sulfonic acid | $T_{14}$ | scarlet |
| 82 | 2-naphthylamine-1,5-disulfonic acid | 2-amino-5-hydroxy-naphthalene-7-sulfonic acid | $T_1$ | orange |
| 83 | 2-naphthylamine-1,5-disulfonic acid | 2-amino-5-hydroxy-naphthalene-7-sulfonic acid | $T_5$ | orange |
| 84 | 2-naphthylamine-1,5-disulfonic acid | 2-amino-5-hydroxy-naphthalene-7-sulfonic acid | $T_6$ | orange |
| 85 | 2-naphthylamine-1,5-disulfonic acid | 2-amino-5-hydroxy-naphthalene-7-sulfonic acid | $T_4$ | orange |
| 86 | 2-naphthylamine-1,5-disulfonic acid | 2-amino-5-hydroxy-naphthalene-7-sulfonic acid | $T_3$ | orange |
| 87 | 2-naphthylamine-1,5-disulfonic acid | 2-amino-5-hydroxy-naphthalene-7-sulfonic acid | $T_2$ | orange |
| 88 | 2-naphthylamine-1,5-disulfonic acid | 2-amino-5-hydroxy-naphthalene-7-sulfonic acid | $T_{12}$ | orange |
| 89 | 2-naphthylamine-1,5-disulfonic acid | 2-amino-5-hydroxy-naphthalene-7-sulfonic acid | $T_{13}$ | orange |
| 90 | 2-naphthylamine-1,5-disulfonic acid | 2-amino-5-hydroxy-naphthalene-7-sulfonic acid | $T_{14}$ | orange |
| 91 | 2-naphthylamine-3,6,8-trisulfonic acid | 2-amino-5-hydroxy-naphthalene-7-sulfonic acid | $T_1$ | scarlet |
| 92 | 2-naphthylamine-3,6,8-trisulfonic acid | 2-amino-5-hydroxy-naphthalene-7-sulfonic acid | $T_{12}$ | scarlet |
| 93 | 2-naphthylamine-3,6,8-trisulfonic acid | 2-amino-5-hydroxy-naphthalene-7-sulfonic acid | $T_5$ | scarlet |
| 94 | 2-naphthylamine-3,6,8-trisulfonic acid | 2-amino-5-hydroxy-naphthalene-7-sulfonic acid | $T_6$ | scarlet |
| 95 | 2-naphthylamine-3,6,8-trisulfonic acid | 2-amino-5-hydroxy-naphthalene-7-sulfonic acid | $T_{12}$ | scarlet |
| 96 | 2-naphthylamine-4,6,8-trisulfonic acid | 2-amino-5-hydroxy-naphthalene-7-sulfonic acid | $T_1$ | orange |
| 97 | 2-naphthylamine-4,6,8-trisulfonic acid | 2-amino-5-hydroxy-naphthalene-7-sulfonic acid | $T_{12}$ | orange |
| 98 | 2-naphthylamine-4,6,8-trisulfonic acid | 2-amino-5-hydroxy-naphthalene-7-sulfonic acid | $T_5$ | orange |
| 99 | 2-naphthylamine-4,6,8-trisulfonic acid | 2-amino-5-hydroxy-naphthalene-7-sulfonic acid | $T_{14}$ | orange |
| 100 | 2-naphthylamine-1,5,7-trisulfonic acid | 2-amino-5-hydroxy-naphthalene-7-sulfonic acid | $T_1$ | orange |
| 101 | 2-naphthylamine-1,5,7-trisulfonic acid | 2-amino-5-hydroxy-naphthalene-7-sulfonic acid | $T_{19}$ | orange |
| 102 | 4-amino-1,3-dimethylbenzene-5-sulfonic acid | 2-amino-5-hydroxy-naphthalene-7-sulfonic acid | $T_1$ | orange |
| 103 | 3-chloro-2-aminotoluene-5-sulfonic acid | 2-amino-5-hydroxy-naphthalene-7-sulfonic acid | $T_{12}$ | orange |
| 104 | 4-aminotoluene-3-sulfonic acid | 2-amino-5-hydroxy-naphthalene-7-sulfonic acid | $T_1$ | orange |
| 105 | 2-aminobenzene-sulfonic acid | 2-amino-5-hydroxy-naphthalene-7-sulfonic acid | $T_1$ | orange |
| 106 | 3-aminobenzene-sulfonic acid | 2-amino-5-hydroxy-naphthanlene-7-sulfonic acid | $T_{14}$ | orange |
| 107 | 4-aminobenzene-sulfonic acid | 2-amino-5-hydroxy-naphthalene-7-sulfonic acid | $T_5$ | orange |
| 108 | 2-naphthylamine-1,5-disulfonic acid | 2-amino-5-hydroxy-naphthalene-7-sulfonic acid | $T_1$ | scarlet |
| 109 | 2-naphthylamino-6,8-disulfonic acid | 2-amino-5-hydroxy-naphthanlene-7-sulfonic acid | $T_{12}$ | red |
| 110 | 2-aminobenzene-1,4-disulfonic acid | 2-amino-8-hydroxy-naphthalene-7-sulfonic acid | $T_1$ | scarlet |

TABLE 3-continued

| Example | I | II | III | IV |
|---|---|---|---|---|
| 111 | 2-aminobenzene-1,4-disulfonic acid | 2-amino-8-hydroxy-naphthalene-7-sulfonic acid | $T_{12}$ | scarlet |
| 112 | 2-aminobenzene-1,4-disulfonic acid | 2-amino-8-hydroxy-naphthalene-7-sulfonic acid | $T_5$ | scarlet |
| 113 | 2-aminobenzene-1,4-disulfonic acid | 2-amino-8-hydroxy-naphthalene-7-sulfonic acid | $T_6$ | scarlet |
| 114 | 2-aminobenzene-1,4-disulfonic acid | 2-amino-8-hydroxy-naphthalene-7-sulfonic acid | $T_{14}$ | scarlet |

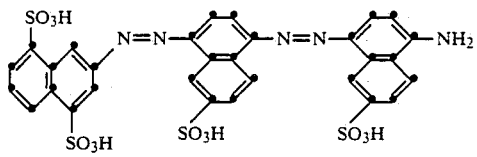

are dissolved at pH 6.5 in 300 parts by volume of water and reacted at 0°–5° C. with 10 parts of cyanuric chloride. The product formed is subsequently made to react at pH 6–7 and 20°–25° C. with 16 parts of 4-amino-1-β-(β'-chloroethylsulfonyl)-ethylcarbamoylbenzene hydrochloride. Precipitation with 80 parts of potassium chloride gives the dye of the formula

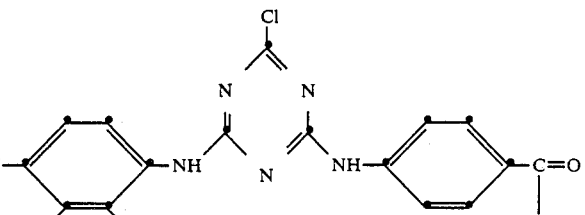

EXAMPLE 115

47 parts of the known aminodisazo compound of the formula

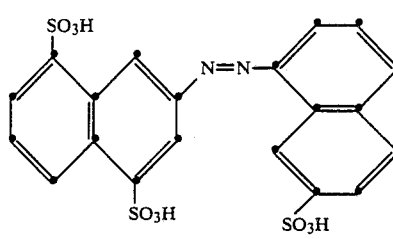

which dyes cotton in fast reddish brown shades.

In the same way the following aminodisazo dyes were converted into brown reactive dyes.

| Example | Aminodisazo dye | Hue on cotton |
|---|---|---|
| 116 | (structure with SO₃H groups, N=N linkages, and CH₃) | brown |
| 117 | (structure with HO₃S, SO₃H groups and N=N linkages) | reddish brown |

| Example | Aminodisazo dye | Hue on cotton |
|---|---|---|
| 118 | | reddish brown |
| 119 | | orange-brown |
| 120 | | reddish brown |

EXAMPLE 121

The condensation product of metamic acid and cyanuric chloride is conventionally diazotized . . . [sic] coupled at pH 7-7.5 onto the coupling component of the formula

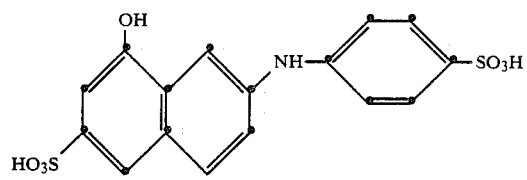

This is followed by a reaction at pH 6–7 with 3-amino-1-β-(β'-chloroethylsulfonyl)-ethylcarbamoylbenzene hydrochloride and precipitation of the resulting dye with potassium chloride. The result obtained is a dye of the formula

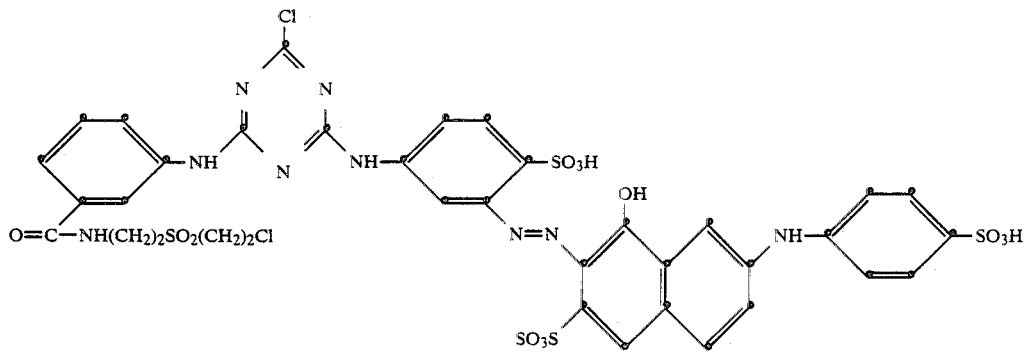

which dyes cotton in fast brown shades.

EXAMPLE 122

95 parts of cyanuric chloride are reacted in conventional manner with 1-amino-8-hydroxynaphthalene-3,6-disulfonic acid in water. To this product is added a freshly diazotized solution of 1-aminobenzene-2-sulfonic acid, and the pH is brought to 4–4.5. After coupling has ended, 155 parts of 4-amino-1-β-(β'-chloroethylsulfonyl)-ethylcarbamoylbenzene hydrochloride are added and made to react at pH 7-7.5 and 35° C. Salting out with KCl gives 420 parts of a dye of the formula

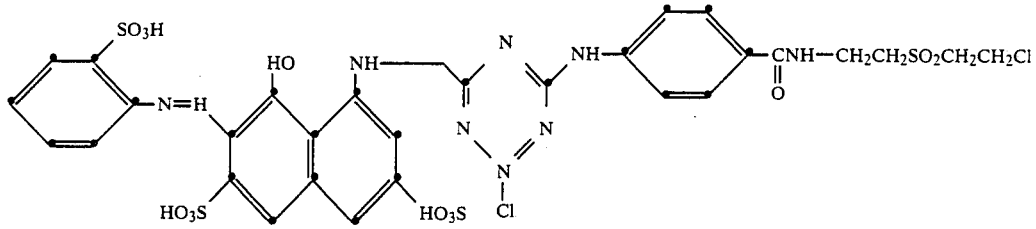

which dyes cotton in . . . [sic] red, fast shades.

EXAMPLE 123

16 parts of 1-amino-8-hydroxynaphthalene-3,6-disulfonic acid are dissolved in 400 parts of water under neutral conditions. The reaction solution is brought to pH 4.5, and at 0° to 3° C. 7.0 parts of cyanuric fluoride are added dropwise with thorough stirring. The hydrogen fluoride which is liberated in the course of the reaction is neutralized by metered addition of 2N sodium hydroxide solution. As soon as free 1-amino-8-hydroxynaphthalene-3,6-disulfonic acid is no longer detectable, 15 parts of 3-amino-1-$\beta$-($\beta'$-chloroethylsulfonyl)-ethylcarbamoylbenzene hydrochloride in 50 parts of water are added. The temperature is allowed to rise to 20° to 25° C. and the pH of the reaction solution is maintained at 4 to 4.5. After the condensation has ended, the dye intermediate is coupled at 0° to 10° C. with 15 parts of diazotized 2-aminonaphthalene-1,5-disulfonic acid. At an end pH of 6.5 to 7 the dye of the formula

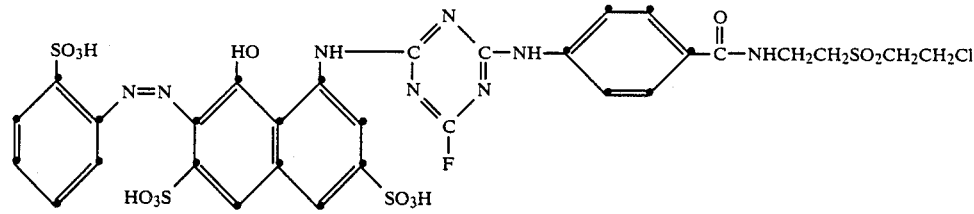

are added dropwise with thorough stirring. The hydrogen fluoride which is liberated in the course of the reaction is neutralized by metered addition of 2N sodium hydroxide solution. As soon as free 1-amino-8-hydroxynaphthalene-3,6-disulfonic acid is no longer detectable, 15 parts of 4-amino-1-$\beta$-($\beta'$-chloroethylsulfonyl)-ethylcarbamoylbenzene hydrochloride in 50 parts of water are added. The temperature is allowed to rise to 20° to 25° C. and the pH of the reaction solution is maintained at 4 to 4.5. After the condensation has ended, the dye intermediate is coupled at 0° to 10° C. with 9 parts of diazotized 2-aminobenzenesulfonic acid. At an end pH of 6.5 to 7 dye of the formula

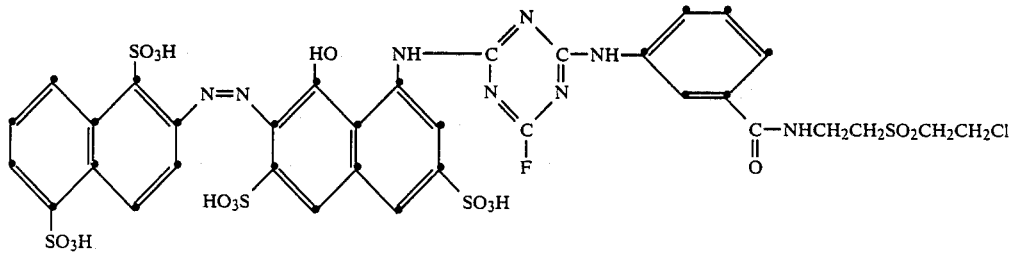

is salted out with sodium chloride, filtered off, washed and dried in vacuo. It is a dark red powder and dyes cotton and regenerated cellulose in bluish red shades of good wet, crock and light fastness.

EXAMPLE 125

16 parts of 1-amino-8-hydroxynaphthalene-3,6-disulfonic acid are dissolved in 400 parts of water under is salted out with sodium chloride, filtered off, washed and dried in vacuo. It is a dark red powder and dyes cotton and regenerated cellulose in bluish red shades of good wet, crock and light fastness.

EXAMPLE 124

16 parts of 1-amino-8-hydroxynaphthalene-3,6-disulfonic acid are dissolved in 400 parts of water under neutral conditions. The reaction solution is brought to pH 4.5, and at 0° to 3° C. 7.0 parts of cyanuric fluoride neutral conditions. The reaction solution is brought to pH 4.5, and at 0° to 3° C. 7.0 parts of cyanuric fluoride are added dropwise with thorough stirring. The hydrogen chloride which is liberated in the course of the reaction is neutralized by metered addition of 2N sodium hydroxide solution. As soon as free 1-amino-8-hydroxynaphthalene-3,6-disulfonic acid is no longer detectable, 15 parts of 4-amino-1-$\beta$-($\beta'$-chloroethylsulfonyl)-ethylcarbamoylbenzene hydrochloride in 50 parts of water are added. The temperature is allowed to rise to 20° to 25° C. and the pH of the reaction solution is maintained at 4 to 4.5. After the condensation has ended, the dye intermediate is coupled at 0° to 10° C. with 15 parts of diazotized 2-aminonaphthalene-1,5-disulfonic acid. At an end pH of 6.5 to 7 dye of the formula

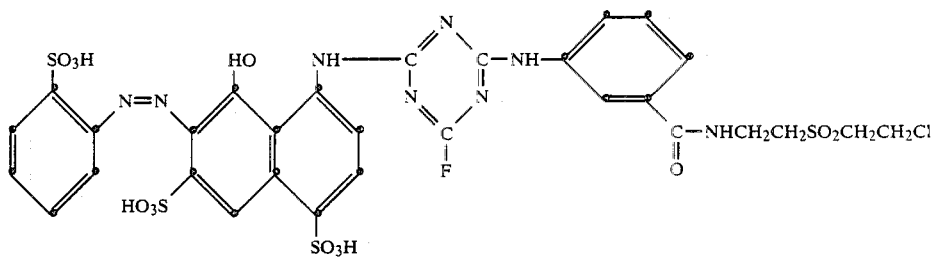

is salted out with sodium chloride, filtered off, washed and dried in vacuo. It is a dark red powder and dyes cotton and regenerated cellulose in bluish red shades of good wet, crock and light fastness.

EXAMPLE 126

16 parts of 1-amino-8-hydroxynaphthalene-4,6-disulfonic acid are dissolved in 400 parts of water under neutral conditions. The reaction solution is brought to pH 4.5, and at 0° to 3° C. 7.0 parts of cyanuric fluoride are added dropwise with thorough stirring. The hydrogen chloride which is liberated in the course of the reaction is neutralized by metered addition of 2N sodium hydroxide solution. As soon as free 1-amino-8-hydroxynaphthalene-3,6-disulfonic [sic] acid is no longer detectable, 15 parts of 3-amino-1-β-(β'-chloroethylsulfonyl)-ethylcarbamoylbenzene hydrochloride in 50 parts of water are added. The temperature is allowed to rise to 20° to 25° C. and the pH of the reaction solution is maintained at 4 to 4.5. After the condensation has ended, the dye intermediate is coupled at 0° to 10° C.

with 11 parts of diazotized 2-aminobenzenesulfonic acid. At an end pH of 6.5 to 7 the dye of the formula

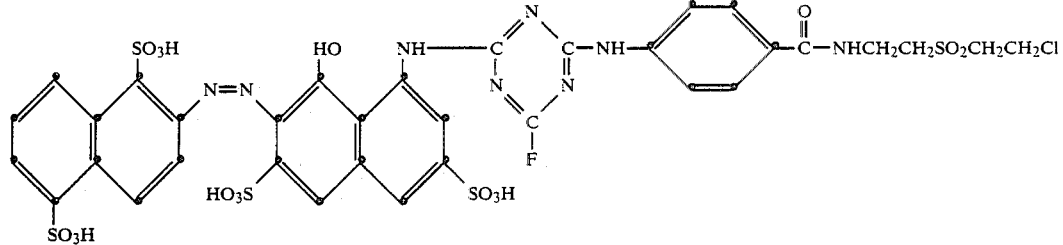

is salted out with sodium chloride, filtered off, washed and dried in vacuo. It is a dark red powder and dyes cotton and regenerated cellulose in bluish red shades of good wet, crock and light fastness.

EXAMPLE 127

16 parts of 1-amino-8-hydroxynaphthalene-4,6-acid are dissolved in 400 parts of water under neutral conditions. The reaction solution is brought to pH 4.5, and at 0° to 3° C. 7.0 parts of cyanuric fluoride are added dropwise with thorough stirring. The hydrogen fluoride which is liberated in the course of the reaction is neutralized by metered addition of 2N sodium hydroxide solution. As soon as free 1-amino-8-hydroxynaphthalene-4,6-disulfonic acid is no longer detectable, 15 parts of 4-amino-1-β-(β'-chloroethylsulfonyl)-ethylcarbamoylbenzene hydrochloride in 50 parts of water are added. The temperature is allowed to rise to 20° to 25° C. and the pH of the reaction solution is maintained at 4 to 4.5. After the condensation has ended, the dye intermediate is coupled at 0° to 10° C. with 9 parts of diazotized 2-aminobenzenesulfonic acid. At an end pH of 6.5 to 7 dye of the formula

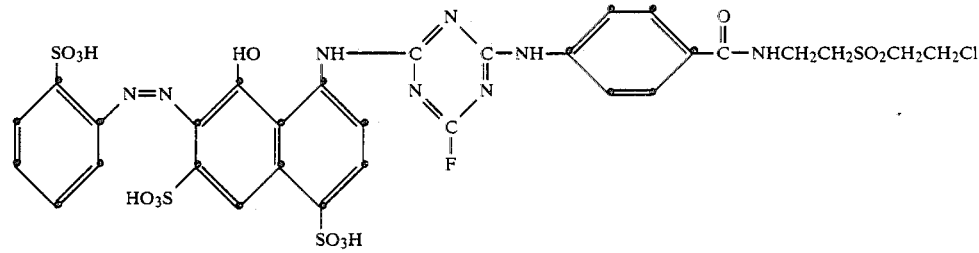

is salted out with sodium chloride, filtered off, washed and dried in vacuo. It is a dark red powder and dyes cotton and regenerated cellulose in yellowish red shades of good wet, crock and light fastness.

Further dyes according to the invention are listed in Table 4, column I indicating the diazo component used in place of aniline-2-sulfonic acid, column II the coupling component used in place of 1-amino-8-hydroxynaphthalene-4,6-disulfonic acid, column III the reactive amine used and column IV the hue obtained on cotton.

TABLE 4

| Example | I | II | III | IV |
|---|---|---|---|---|
| 128 | aniline | 1-amino-8-hydroxy-naphthalene-3,6-disulfonic acid | $T_5$ | red |
| 129 | aniline | 1-amino-8-hydroxy-naphthalene-3,6-disulfonic acid | $T_6$ | red |
| 130 | aniline | 1-amino-8-hydroxy-naphthalene-3,6-disulfonic acid | $T_{14}$ | red |
| 131 | O-chloroaniline | 1-amino-8-hydroxy-naphthalene-3,6-disulfonic acid | $T_{13}$ | red |
| 132 | m-toluidine | 1-amino-8-hydroxy-naphthalene-3,6-disulfonic acid | $T_{10}$ | red |
| 133 | 1-amino-4-methoxy-benzene-2-sulfonic acid | 1-amino-8-hydroxy-naphthalene-3,6-disulfonic acid | $T_{12}$ | bluish red |
| 134 | 1-amino-4-phenoxy-benzene-2-sulfonic acid | 1-amino-8-hydroxy-naphthalene-3,6-disulfonic acid | $T_2$ | bluish red |
| 135 | 4-ethoxyaniline | 1-amino-8-hydroxy-naphthalene-3,6-disulfonic acid | $T_3$ | bluish red |
| 136 | p-anisidine | 1-amino-8-hydroxy-naphthalene-3,6-disulfonic acid | $T_4$ | bluish red |
| 137 | 1-amino-4-methyl-benzene-2-sulfonic acid | 1-amino-8-hydroxy-naphthalene-3,6-disulfonic acid | $T_5$ | bluish red |
| 138 | aniline-4-sulfonic acid | 1-amino-8-hydroxy-naphthalene-3,6-disulfonic acid | $T_6$ | red |
| 139 | aniline-3-sulfonic acid | 1-amino-8-hydroxy-naphthalene-3,6-disulfonic acid | $T_9$ | red |
| 140 | 2-naphthylamine-1,5-disulfonic acid | 1-amino-8-hydroxy-naphthalene-3,6-disulfonic acid | $T_{11}$ | red |
| 141 | 2-naphthylamine-4,8-disulfonic acid | 1-amino-8-hydroxy-naphthalene-3,6-disulfonic acid | $T_{18}$ | bluish red |
| 142 | 1-naphthylamine-4-sulfonic acid | 1-amino-8-hydroxy-naphthalene-3,6-disulfonic acid | $T_1$ | bluish red |
| 143 | 1-naphthylamine-6-sulfonic acid | 1-amino-8-hydroxy-naphthalene-3,6-disulfonic acid | $T_{12}$ | bluish red |
| 144 | 2-naphthylamine-1-sulfonic acid | 1-amino-8-hydroxy-naphthalene-3,6-disulfonic acid | $T_{14}$ | bluish red |
| 145 | aniline | 1-amino-8-hydroxy-naphthalene-4,6-disulfonic acid | $T_5$ | scarlet |
| 146 | aniline | 1-amino-8-hydroxy-naphthalene-4,6-disulfonic acid | $T_6$ | scarlet |
| 147 | aniline | 1-amino-8-hydroxy-naphthalene-4,6-disulfonic acid | $T_{14}$ | scarlet |
| 148 | O-chloroaniline | 1-amino-8-hydroxy-naphthalene-4,6-disulfonic acid | $T_{13}$ | scarlet |
| 149 | m-toluidine | 1-amino-8-hydroxy-naphthalene-4,6-disulfonic acid | $T_{10}$ | scarlet |
| 150 | 1-amino-4-methoxy-benzene-2-sulfonic acid | 1-amino-8-hydroxy-naphthalene-4,6-disulfonic acid | $T_{12}$ | red |
| 151 | 1-amino-4-phenoxy-benzene-2-sulfonic acid | 1-amino-8-hydroxy-naphthalene-4,6-disulfonic acid | $T_2$ | red |
| 152 | 4-ethoxyaniline | 1-amino-8-hydroxy-naphthalene-4,6-disulfonic acid | $T_3$ | red |
| 153 | p-anisidine | 1-amino-8-hydroxy-naphthalene-4,6-disulfonic acid | $T_4$ | red |
| 154 | 1-amino-4-methyl-benzene-2-sulfonic acid | 1-amino-8-hydroxy-naphthalene-4,6-disulfonic acid | $T_5$ | red |
| 155 | aniline-4-sulfonic acid | 1-amino-8-hydroxy-naphthalene-4,6-disulfonic acid | $T_6$ | yellowish red |
| 156 | aniline-3-sulfonic acid | 1-amino-8-hydroxy-naphthalene-4,6-disulfonic acid | $T_9$ | yellowish red |
| 157 | 2-naphthylamine-1,5-disulfonic acid | 1-amino-8-hydroxy-naphthalene-4,6-disulfonic acid | $T_{11}$ | red |
| 158 | 2-naphthylamine-4,8-disulfonic acid | 1-amino-8-hydroxy-naphthalene-4,6-disulfonic acid | $T_{18}$ | red |
| 159 | 1-naphthylamine-4-sulfonic acid | 1-amino-8-hydroxy-naphthalene-4,6-disulfonic acid | $T_1$ | red |
| 160 | 1-naphthylamine-6-sulfonic acid | 1-amino-8-hydroxy-naphthalene-4,6-disulfonic acid | $T_{12}$ | red |
| 161 | 2-naphthylamine-1-sulfonic acid | 1-amino-8-hydroxy-naphthalene-4,6-disulfonic acid | $T_{14}$ | red |
| 162 | N—naphthylamine-2,5-disulfonic acid | 1-amino-8-hydroxy-naphthalene-4,6-disulfonic acid | $T_1$ | red |
| 163 | N—naphthylamine-2,5-disulfonic acid | 1-amino-8-hydroxy-naphthalene-4,6-disulfonic acid | $T_{12}$ | red |
| 164 | 2-naphthylamine-5-sulfonic acid | 1-amino-8-hydroxy-naphthalene-3,6-disulfonic acid | $T_1$ | red |
| 165 | 2-naphthylamine-6-sulfonic acid | 1-amino-8-hydroxy-naphthalene-3,6-disulfonic acid | $T_{12}$ | red |
| 166 | 2-naphthylamine-6-sulfonic acid | 1-amino-8-hydroxy-naphthalene-3,6-disulfonic acid | $T_5$ | red |
| 167 | aniline-2-sulfonic acid | 1-amino-8-hydroxy-naphthalene-3,6-disulfonic acid | $T_1$ | red |
| 168 | aniline-2-sulfonic acid | 1-amino-8-hydroxy-naphthalene-4-sulfonic acid | $T_{12}$ | red |
| 169 | aniline-2-sulfonic acid | 1-amino-8-hydroxy-naphthalene-4-sulfonic acid | $T_1$ | red |
| 170 | aniline-2-sulfonic acid | 2-amino-8-hydroxy-naphthalene-6-sulfonic acid | $T_1$ | red |
| 171 | aniline | 1-amino-8-hydroxy-naphthalene-2,4-disulfonic acid | $T_1$ | red |

EXAMPLE 172

A suspension of the conventionally prepared aminoazo dye of the formula drochloride as described in Example 1 gives a dye of the formula

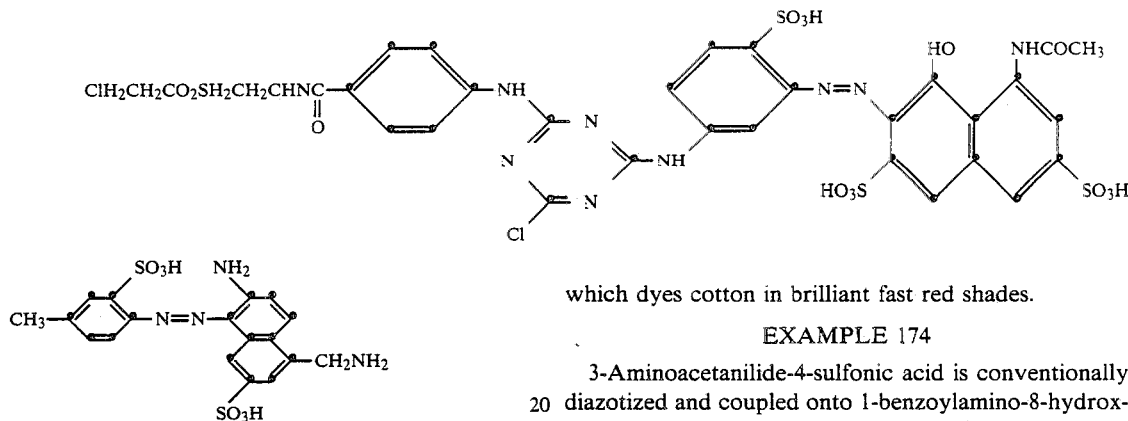

are [sic] reacted in water at pH 2-3 and 0°-5° C. with 1 equivalent of cyanuric chloride in conventional manner. 1 chlorine of the triazinyl radical is then replaced at pH 6-7 for 3-amino-1-β-(β'-chloroethylsulfonyl)-ethylcarbamoylbenzene hydrochloride.

The resulting dye of the formula which dyes cotton in brilliant fast red shades.

EXAMPLE 174

3-Aminoacetanilide-4-sulfonic acid is conventionally diazotized and coupled onto 1-benzoylamino-8-hydroxynaphthalene-3,6-disulfonic acid, and the acetyl group is subsequently selectively hydrolyzed under alkaline conditions. The chromphore is then reacted as described in Example 1 with 2,4,6-trifluoro-1,3,5-triazine. Replacing a fluorine for the radical of 3-amino-1-β-(β'-chloroethylsulfonyl)-ethylcarbamoylbenzene hydrochloride gives a dye of the formula

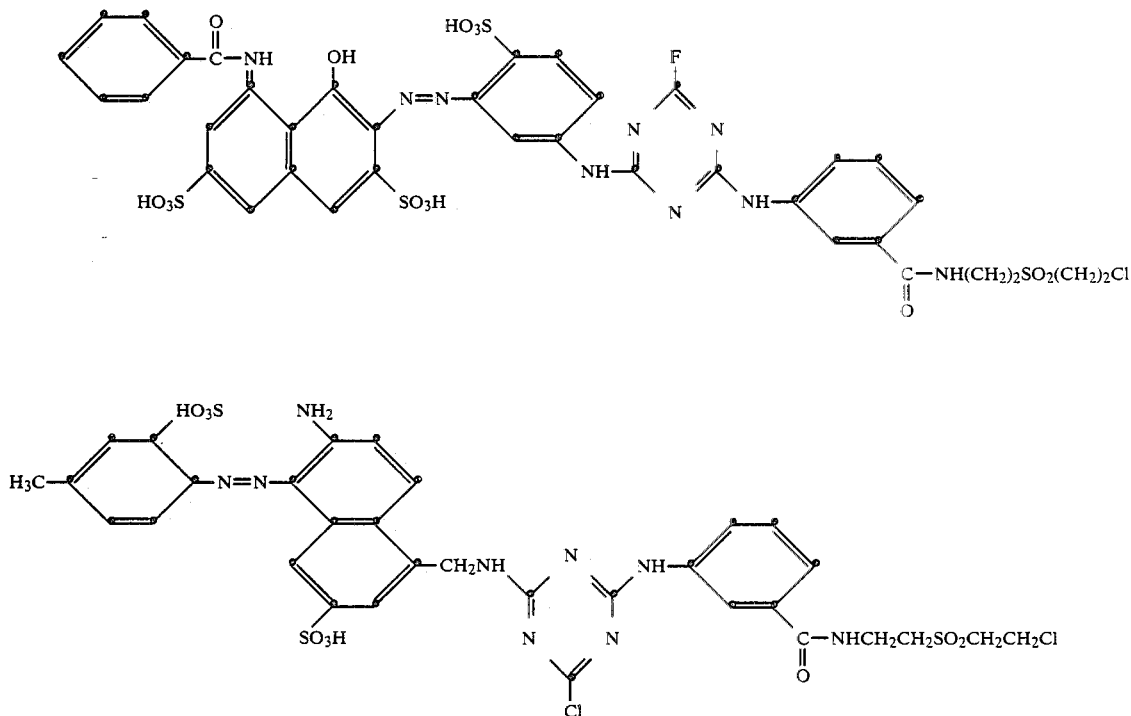

is precipitated by adding potassium chloride, filtered off with suction and dried. It dyes cotton in fast red shades.

EXAMPLE 173

The condensation product of 1,3-diaminobenzene-6-sulfonic acid with cyanuric chloride is conventionally diazotized and coupled onto 1-acetylamino-8-hydroxy-3,6-disulfonic acid. Replacing a chlorine for 4-amino-1-β-(β'-chloroethylsulfonyl)-ethylcarbamoylbenzene hywhich dyes cotton in brilliant fast red shades.

Further dyes which carry the reactive radical on the diazo component are listed below.

Column I lists diamino compounds which can be used in place of 1,3-diaminobenzene-6-sulfonic acid, column II the coupling components used and column III the reactive amines used.

In the examples 182 to 185 and also 187, the method given in Example 173 is modified to the effect that first the diazotization and coupling of component I takes place and then the reaction with cyanuric fluoride and benzoic acid derivative.

TABLE 5

| Example | I | II | III | Hue on cotton |
|---|---|---|---|---|
| 175 | 1,3-diaminobenzene-2,6-disulfonic acid | 1-benzoylamino-8-hydroxynaphthalene-3,6-disulfonic acid | $T_5$ | red |
| 176 | 1,3-diaminobenzene-2,6-disulfonic acid | 1-benzoylamino-8-hydroxynaphthalene-4,6-disulfonic acid | $T_6$ | red |
| 177 | 1,3-diaminobenzene-2,6-disulfonic acid | N—(8-hydroxy-naphthalene-3,6-disulfonic acid)-N'—cyclohexylurea | $T_{14}$ | red |
| 178 | 1,3-diaminobenzene-2,6-disulfonic acid | 1-hydroxy-naphthalene-4,8-disulfonic acid | $T_1$ | red |
| 179 | 1,3-diaminobenzene-2,6-disulfonic acid | 1-hydroxy-naphthalene-4-sulfonic acid | $T_{12}$ | red |
| 180 | 1,3-diaminobenzene-2,6-disulfonic acid | 1-hydroxy-naphthalene-4-sulfonic acid | $T_2$ | red |
| 181 | 1,4-diaminobenzene-6-sulfonic acid | 1-acetylamino-8-hydroxynaphthalene-3,6-disulfonic acid | $T_{13}$ | bluish red |
| 182 | 2-amino-5-amino-methylenenaphthalene-1-sulfonic acid | 1-acetylamino-8-hydroxynaphthalene-3,6-disulfonic acid | $T_1$ | bluish red |
| 183 | 2-amino-5-amino-methylenenaphthalene-1-sulfonic acid | 1-acetylamino-8-hydroxynaphthalene-3,6-disulfonic acid | $T_{12}$ | bluish red |
| 184 | 2-amino-5-amino-methylenenaphthalene-1-sulfonic acid | 1-benzylamino-8-hydroxynaphthalene-3,6-disulfonic acid | $T_1$ | bluish red |
| 185 | 2-amino-5-amino-methylenenaphthalene-1-sulfonic acid | 1-benzylamino-8-hydroxynaphthalene-4,6-disulfonic acid | $T_1$ | bluish red |
| 186 | 1,3-diamino-2-methylbenzene-5-sulfonic acid | 1-benzylamino-8-hydroxynaphthalene-4,6-disulfonic acid | $T_{12}$ | bluish red |
| 187 | 3-amino-N—methyl-benzylamine-4-sulfonic acid | 1-benzoylamino-8-hydroxynaphthalene-4,6-disulfonic acid | $T_{14}$ | bluish red |
| 188 | 1,4-diaminobenzene-2,5-disulfonic acid | 1-benzoylamino-8-hydroxynaphthalene-3,6-disulfonic acid | $T_1$ | bluish red |
| 189 | 1,4-diaminobenzene-2,5-disulfonic acid | 1-benzoylamino-8-hydroxynaphthalene-3,6-disulfonic acid | $T_{12}$ | bluish red |

EXAMPLE 190

The condensation product of 1,3-diaminobenzene-6-sulfonic acid with cyanuric chloride is conventionally diazotized and coupled onto 1-dichlorotriazinylamino-8-hydroxynaphthalene-3,6-disulfonic acid. Replacing two chlorines for two moles of 4-amino-1-$\beta$-($\beta'$-chloroethylsulfonyl)-ethylcarbamoylbenzene hydrochloride gives a dye of the formula

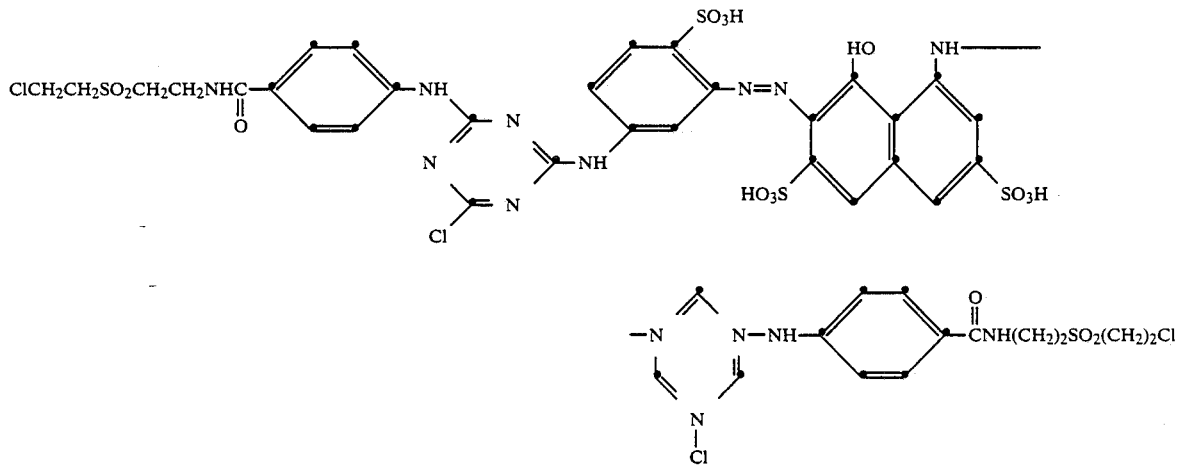

which dyes cotton in brilliant fast red shades.

EXAMPLE 191

A solution of 37 parts of 1-amino-4-$\beta$-($\beta'$-chloroethylsulfonyl)-ethylaminocarbonylbenzene-2-sulfonic acid in 350 parts of ice-water is reacted at 0°-2° C. and pH 6-6.5 with 14 parts of cyanuric fluoride. As soon as free amino groups are no longer detectable, 18.8 parts of 1,3-phenylenediamine-4-sulfonic acid in 100 parts of water are added and reacted at 0°-10° C. and pH 5-7. The condensation solution, which has been acidified with hydrochloric acid, is conventionally diazotized and added at 0°-10° C. and pH 7.0 to a solution of 28.4 parts of 1-phenyl-3-carboxypyrazolone-4'-sulfonic acid in 200 parts of water and coupled. The yellow monoazo dye is subsequently salted out with sodium chloride, filtered off with suction, washed and dried in vacuo at 45° C. The isolated dye of the formula

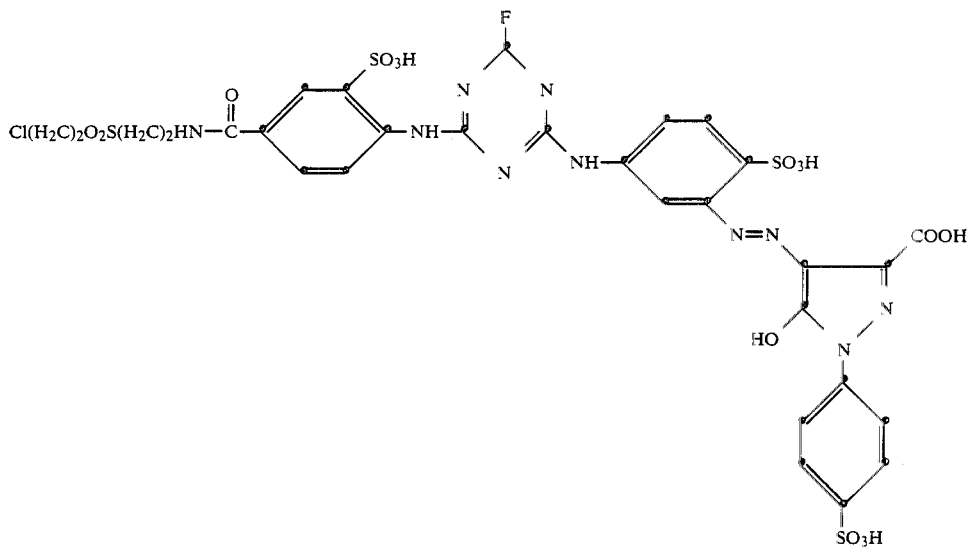

dyes cotton in fast greenish yellow shades.

EXAMPLE 192

26 parts of the known dye of the formula

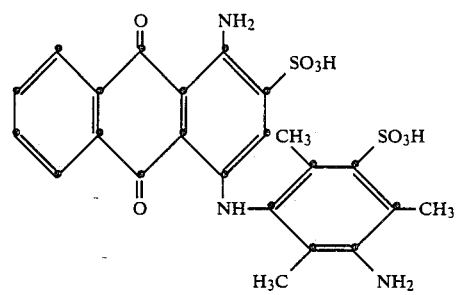

are reacted at 0°–5° C. and pH 2–3 in water with 10 parts of cynauric chloride and are subsequently made to react with 16 g of 3-amino-1-β-(β'-chloroethylsulfonyl)-ethylcarbamoylbenzene hydrochloride (temperature 20°–25° C.; pH 6.0–7.0). The resulting dye of the formula

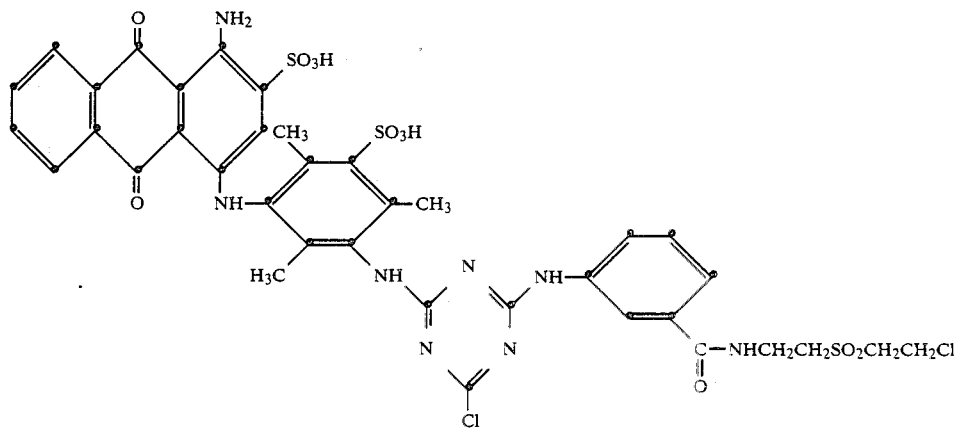

can be isolated by salting out with potassium chloride and dyes cotton, in particular in printing, in . . . [sic], very lightfast shades.

EXAMPLE 193

26 parts of the known dye of the formula

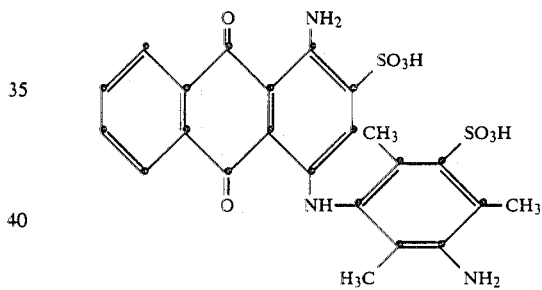

are reacted at 0°–2° C. and pH 4–5 in water with 7.5 parts of cyanuric fluoride and are then made to react with 16 g of 4-amino-1-β-(β'-chloroethylsulfonyl)-ethylcarbamoylbenzene hydrochloride (temperature 0°–2° C.; pH 4–6). The resulting dye of the formula

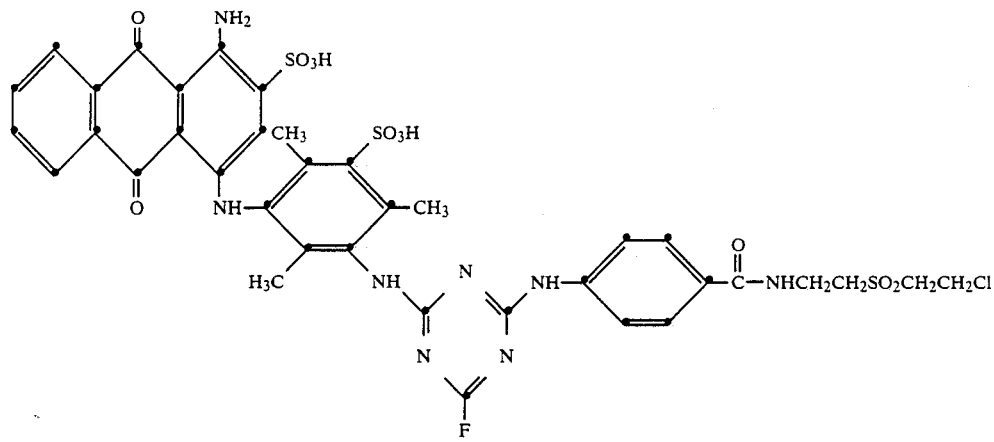
can be isolated by salting out with potassium chloride and dyes cotton, in particular in printing, in . . . [sic] blue, very lightfast shades.
The same method was used to prepare the reactive dyes below, where I lists the starting aminoanthraquinone dyes and II the reactive amine.
| Example | I | II | Hue on cotton |
|---|---|---|---|
| 194 | | $T_1$ | greenish blue |
| 195 | | $T_{12}$ | greenish blue |
| 196 | | $T_5$ | greenish blue |

| Example | I | II | Hue on cotton |
|---|---|---|---|
| 197 | 1-amino-4-[(4-sulfo-3-aminophenyl)amino]anthraquinone-2-sulfonic acid | $T_6$ | greenish blue |
| 198 | 1-amino-4-[(4-amino-3-sulfophenyl)amino]anthraquinone-2-sulfonic acid | $T_{14}$ | greenish blue |
| 199 | 1-amino-4-[(4-amino-2-sulfophenyl)amino]anthraquinone-2-sulfonic acid | $T_{13}$ | greenish blue |
| 200 | 1-amino-4-[(4-aminocyclohexyl)amino]anthraquinone-2-sulfonic acid | $T_1$ | greenish blue |
| 201 | 1-amino-4-[(4-aminocyclohexyl)amino]anthraquinone-2-sulfonic acid | $T_{12}$ | greenish blue |

| Example | I | II | Hue on cotton |
|---|---|---|---|
| 202 | 1-amino-4-(2-amino-2-methyl-propyl)amino-anthraquinone-2-sulfonic acid | $T_1$ | blue |
| 203 | 1-amino-4-[4-sulfo-3-(2-aminoethylamino-chloro-triazinylamino)phenylamino]anthraquinone-2-sulfonic acid | $T_{12}$ | blue |
| 204 | 1-amino-4-(4-aminomethyl-2-sulfophenylamino)anthraquinone-2-sulfonic acid | $T_{12}$ | blue |
| 205 | 1-amino-4-(4-methylaminomethyl-2-sulfophenylamino)anthraquinone-2-sulfonic acid | $T_1$ | blue |

EXAMPLE 206

64.8 parts of the known dye of the formula

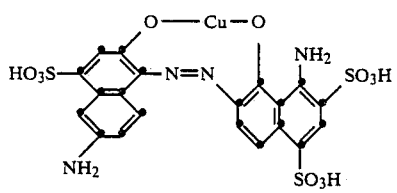

are suspended in 700 parts of water, reacted at 0°–5° C/pH 2–3 with 19 parts of cyanuric chloride and finally made to react with 30 parts of 4-amino-1-β-(β'-chloroethylsulfonyl)-ethylcarbamoylbenzene hydrochloride at pH 6–7/20° C. The dye is isolated by spray-drying the solution. This gives 90 parts of the dye of the formula

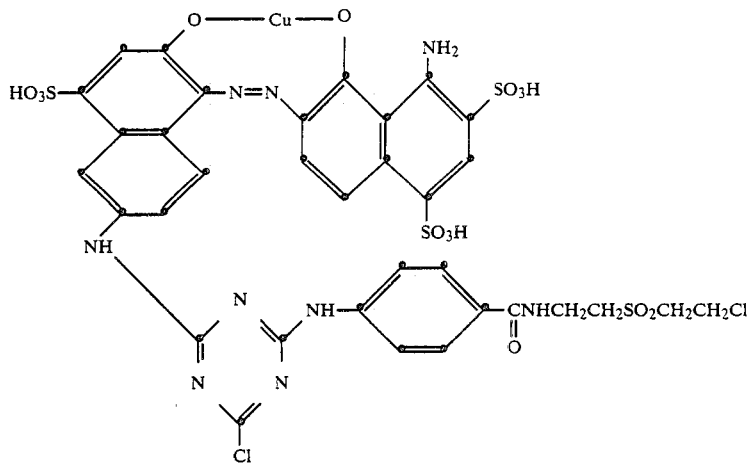

EXAMPLE 207

64.8 parts of the known dye of the formula

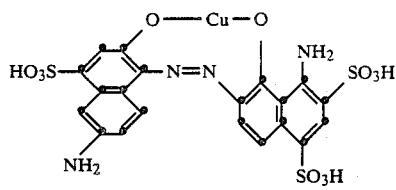

are suspended in 700 parts of water, reacted at 0°–2° C./pH 4–5 with 14 parts of cyanuric fluoride and finally made to react with 30 parts of 3-amino-1-β-(β'-chloroethylsulfonyl)-ethylcarbamoylbenzene hydrochloride at pH 6–7/0°–20° C. The dye is isolated by spray-drying the solution. This gives 90 parts of the dye of the formula

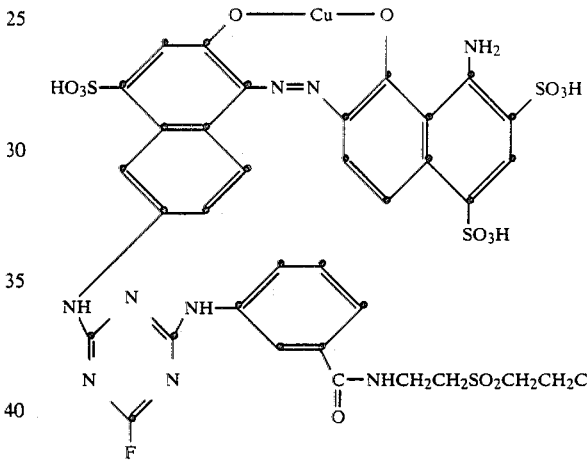

The same method and methods known per se were used to synthesize the novel dyes of the general formula $$\text{Chromophore-Cy}\underset{\text{Hal}}{-}\text{T}$$

which are listed in the table below.

| Example | Chromophore | T | Color |
|---|---|---|---|
| 208 | 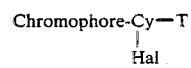 | T$_1$ | blue |

| Example | Chromophore | T | Color |
|---|---|---|---|
| 209 | (structure) | $T_{12}$ | blue |
| 210 | (structure) | $T_6$ | blue |
| 211 | (structure) | $T_5$ | blue |
| 212 | (structure) | $T_{12}$ | blue |
| 213 | (structure) | $T_{14}$ | blue |
| 214 | (structure) | $T_1$ | blue |

-continued

| Example | Chromophore | T | Color |
|---------|-------------|---|-------|
| 215 | (structure) | $T_{12}$ | blue |
| 216 | (structure) | $T_1$ | navy |
| 217 | (structure) | $T_{12}$ | blue |
| 218 | (structure) | $T_6$ | blue |
| 219 | (structure) | $T_1$ | navy |

| Example | Chromophore | T | Color |
|---|---|---|---|
| 220 | (structure: Cu complex azo dye with HO3S, SO3H, OH, NH groups) | T12 | navy |
| 221 | (structure: Cu complex azo dye with NH2, HO3S, SO3H, HN groups) | T3 | blue |
| 222 | (structure: Cu complex azo dye with NH, HO3S, SO3H, H3CO groups) | T1 | navy |
| 223 | (structure: Cu complex azo dye with NH, HO3S, SO3H, H3CO groups) | T12 | navy |
| 224 | (structure: Cu complex azo dye with Cl, NH, HO3S, SO3H groups) | T1 | violet |
| 225 | (structure: Co 1:2 complex azo dye with (CH3)2NSO2, CH3, NH groups) | T1 | brown |

-continued

| Example | Chromophore | T | Color |
|---|---|---|---|
| 226 | (structure: pyrazolone azo dye with Cu complex, SO₃H, HN-, CH₃, Cl, HO₃S substituents) | $T_{11}$ | brown |
| 227 | (structure: Cu complex azo dye with SO₃H groups, SO₂NH, NH–, naphthalene) | $T_4$ | red |
| 228 | (structure: 1:2 Co complex azo dye with NO₂, NH–, naphthalene) | $T_3$ | ruby |
| 229 | (structure: Cu complex azo dye with SO₃H, NH–, naphthalene) | $T_7$ | red |
| 230 | (structure: Cu complex azo dye with HO₃S, NH, SO₃H groups, naphthalene) | $T_8$ | violet |

| Example | Chromophore | T | Color |
|---|---|---|---|
| 231 | [structure: Cu 1:1 complex of azo dye — aminophenyl azo coupled to naphthalene with OH, SO$_3$H, SO$_3$H, SO$_3$H substituents] | T$_1$ | violet |
| 232 | [structure: 2-hydroxy-4-nitrophenyl azo coupled to 1-hydroxy-8-amino-naphthalene-3,6-disulfonic acid]<br>mixture of the Co— and Cr— 1:2 complexes | T$_{12}$ | black |
| 233 | [structure: 2-hydroxy-4-nitrophenyl azo coupled to 1-hydroxy-8-amino-naphthalene-3,6-disulfonic acid]<br>mixture of the Co— and Cr— 1:2 complexes | T$_1$ | black |
| 234 | [structure: Cr 1:2 complex of 2-hydroxy-5-nitrophenyl azo coupled to naphthalene with NH—, HO$_3$S, SO$_3$H]<br>1:2 complex | T$_1$ | gray |
| 235 | [structure: Cr 1:2 complex of nitro/sulfo-hydroxyphenyl azo coupled to amino-naphthalene-sulfonic acid]<br>1:2 complex | T$_{12}$ | blackish gray |

| Example | Chromophore | T | Color |
|---|---|---|---|
| 236 | 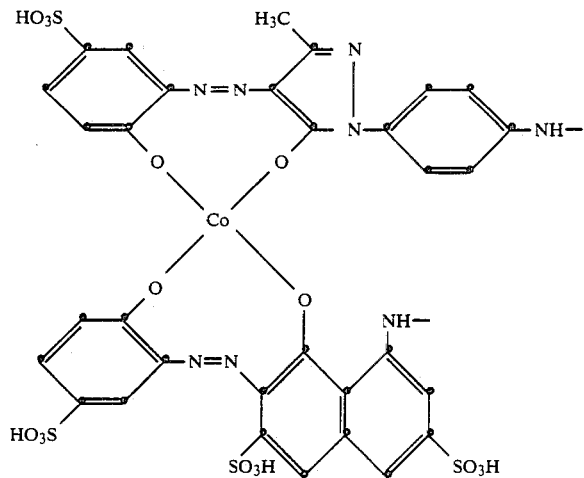 | $T_1$ | brown |
| 237 | 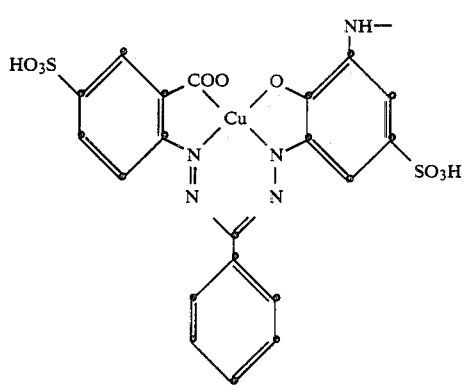 | $T_1$ | blue |
| 238 | 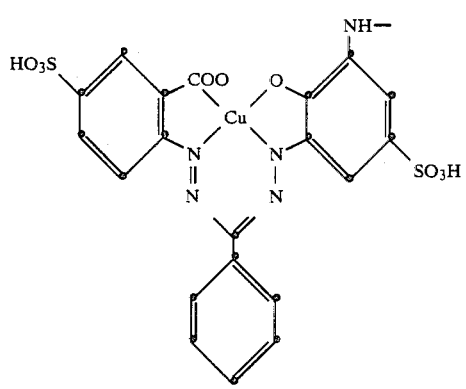 | $T_{12}$ | blue |

| Example | Chromophore | T | Color |
|---------|-------------|---|-------|
| 239 | | $T_6$ | blue |
| 240 | | $T_5$ | blue |
| 241 | | $T_1$ | blue |
| 242 | | $T_1$ | blue |

-continued

| Example | Chromophore | T | Color |
|---|---|---|---|
| 243 | (structure) | $T_{12}$ | blue |
| 244 | (structure) | $T_1$ | blue |
| 245 | (structure) | $T_{12}$ | blue |
| 246 | (structure) | $T_1$ | blue |

-continued
| Example | Chromophore | T | Color |
|---------|-------------|---|-------|
| 247 | 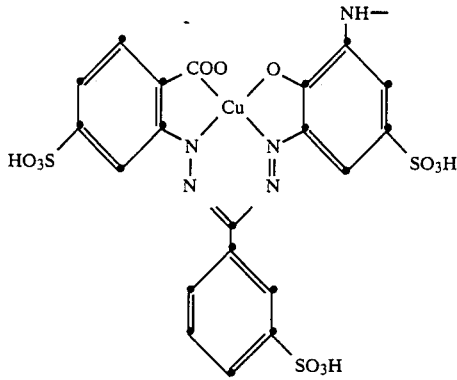 | $T_{12}$ | blue |
| 248 | 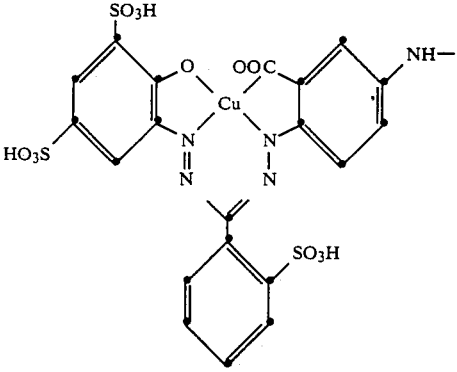 | $T_{12}$ | blue |
| 249 | 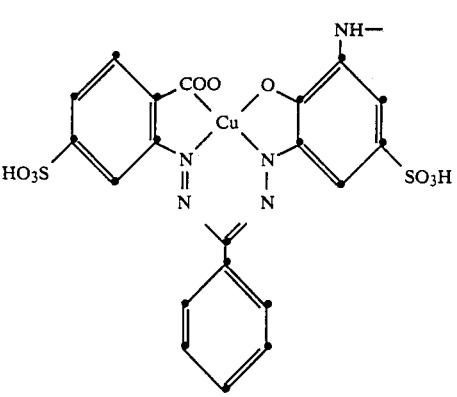 | $T_1$ | blue |
| 250 | 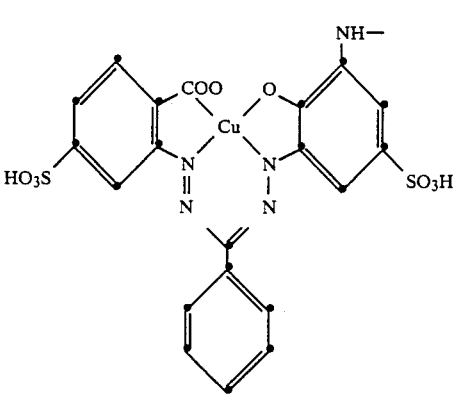 | $T_{12}$ | blue |

| Example | Chromophore | T | Color |
|---|---|---|---|
| 251 | 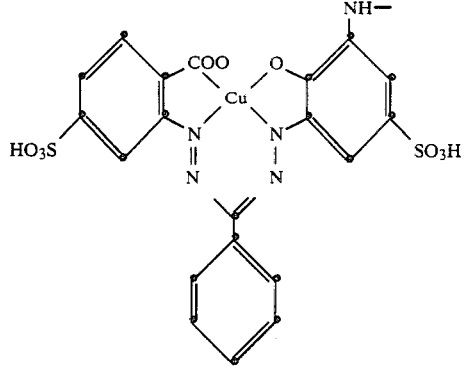 | $T_6$ | blue |
| 252 | 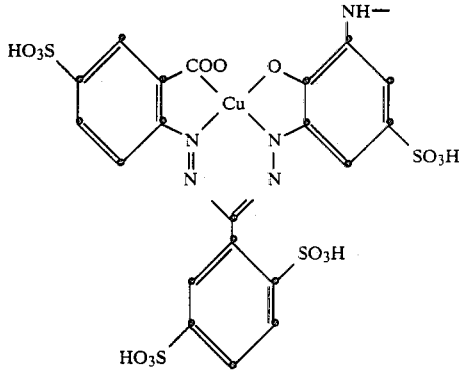 | $T_6$ | blue |
| 253 | 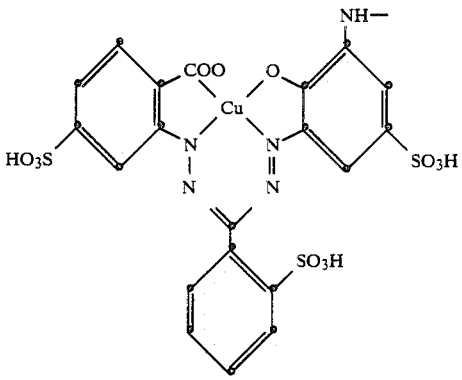 | $T_5$ | blue |
| 254 | 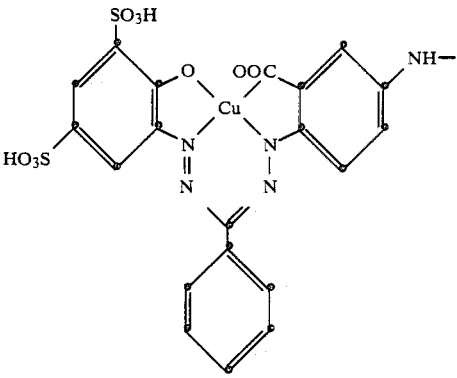 | $T_1$ | blue |

EXAMPLE 255

To 17.3 parts of aniline-4-sulfonic acid diazotized in

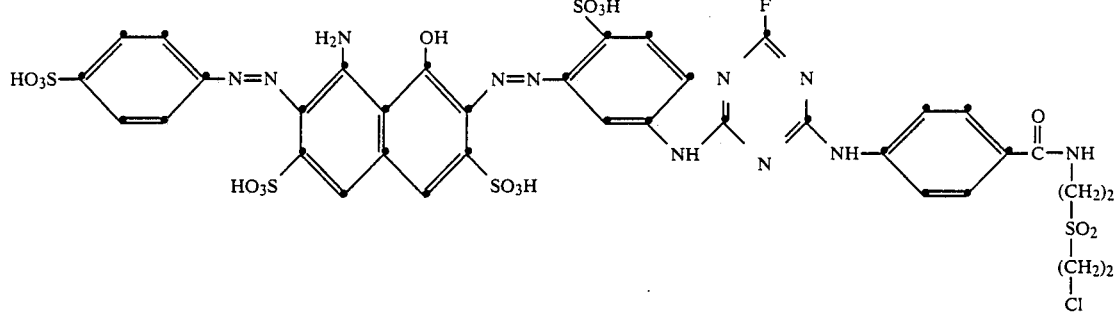

the presence of hydrochloric acid are added at 5° C. 31.6 parts of a suspension of 1-amino-8-hydroxynaphthalene-3,6-disulfonic acid in 300 parts of water. Coupling is carried out overnight at pH 1-2 and 38.6 parts of a suspension of primary condensation product, diazotized in the presence of hydrochloric acid, of cyanuric chloride and 1,3-phenylenediamine-4-sulfonic acid are then added. By adding 17.8 parts of sodium carbonate the coupling is completed under weakly acid conditions; a solution of 30 parts of 3-amino-1-$\beta$-($\beta'$-chloroethylsulfonyl)-ethylcarbamoylbenzene hydrochloride is then added and condensed at 20°-30° C. and a pH value of 7-7.5. The dye is precipitated from neutral solution by adding potassium chloride and is dried under gentle conditions. This gives a black powder which dyes cotton in fast navy shades.

The dye mentioned in Example 255 has the formula

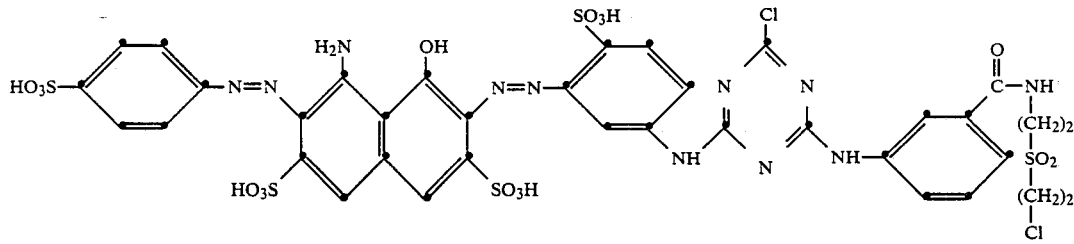

EXAMPLE 256

To 17.3 parts of aniline-4-sulfonic acid diazotized in the presence of hydrochloric acid are added at 5° C. 31.6 parts of a suspension of 1-amino-8-hydroxynaphthalene-3,6-disulfonic acid in 300 parts of water. Coupling is carried out overnight at pH 1-2 and subsequently 21.6 parts of a suspension of 3-aminoacetanilide-4-sulfonic acid diazotized in the presence of hydrochloric acid are added. By adding 17.8 parts of sodium carbonate the coupling is completed under weakly acid conditions; this is followed by 2 hours of alkaline hydrolysis at 80° C. The chromophore is isolated and condensed at 0°-2° C./pH 6-7 with 14 parts of cyanuric fluoride. 30 parts of 4-amino-1-$\beta$-($\beta'$-chloroethylsulfonyl)-ethylcarbamoylbenzene hydrochloride are then added and condensed at 0°-20° C./pH 6-7 for 2 hours. The dye is precipitated from neutral solution by adding potassium chloride and is dried gently. This gives a black powder which dyes cotton in fast navy shades.

The dye mentioned in Example 256 has the formula

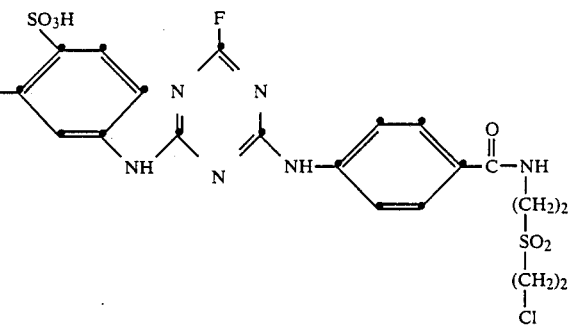

Analogous dyes according to the invention are listed in Table 6, of which column I indicates the diazo component used for the acid coupling, column II the diazo component used for the coupling in the neutral or alkaline solution, column III the reactive amine and column IV the hue obtained on cotton.

TABLE 6

| Example | I | II | III | IV |
|---|---|---|---|---|
| 257 | 2-chloro-4-sulfoaniline | 1,3-phenylenediamine-4-sulfonic acid | $T_1$ | navy |
| 258 | 2-chloro-4,6-disulfoaniline | 1,3-phenylenediamine-4-sulfonic acid | $T_{12}$ | reddish navy |
| 259 | 4-chloro-2-sulfoaniline | 1,4-phenylenediamine-5-sulfonic acid | $T_1$ | reddish navy |
| 260 | 2-naphthylamine-1,5-disulfonic acid | 1,4-phenylenediamine-5-sulfonic acid | $T_{12}$ | greenish navy |
| 261 | 4-alkylsulfonylaniline | 1,3-phenylenediamine-2,4-disulfonic acid | $T_{14}$ | reddish navy |
| 262 | 2-methyl-4,6-disulfoaniline | 1,3-phenylenediamine-2,4-disulfonic acid | $T_6$ | reddish navy |
| 263 | 2-naphthylamine-3,6,8-trisulfonic acid | 1,4-phenylenediamine-2,5-disulfonic acid | $T_1$ | greenish navy |
| 264 | 3-(4',6'-difluorotriazinyl)-amino-6-sulfoaniline | 1,3-phenylenediamine-4-sulfonic acid | $T_{12}$ | reddish navy |
| 265 | 3-(4',6'-dichlorotriazinyl)-amino-6-sulfoaniline | 1,3-phenylenediamine-4-sulfonic acid | $T_1$ | reddish navy |
| 266 | aniline | 1,3-phenylenediamine-4-sulfonic acid | $T_{12}$ | reddish navy |

EXAMPLE 267

48 parts of the secondary condensation product of 1,3-phenylenediamine-4-sulfonic acid, cyanuric chloride and 4-amino-1-β(β'-chloroethylsulfonyl)-ethylcarbamoylbenzene hydrochloride are diazotized in the presence of hydrochloric acid and coupled in acetic acid solution onto a suspension of 30.8 parts of 1-amino-8-hydroxynaphthalene-3,6-disulfonic acid in 300 -parts of water. The red monoazo dye subsequently has added to it 17.3 parts of aniline-4-sulfonic acid diazotized in the presence of hydrochloric acid and is coupled under neutral conditions to give the disazo dye. The dye is separated out by adding potassium chloride and to spare [sic] dried. This gives a black powder which dyes cotton in reddish navy shades having good fastness properties.

The dye mentioned in Example 267 has the formula

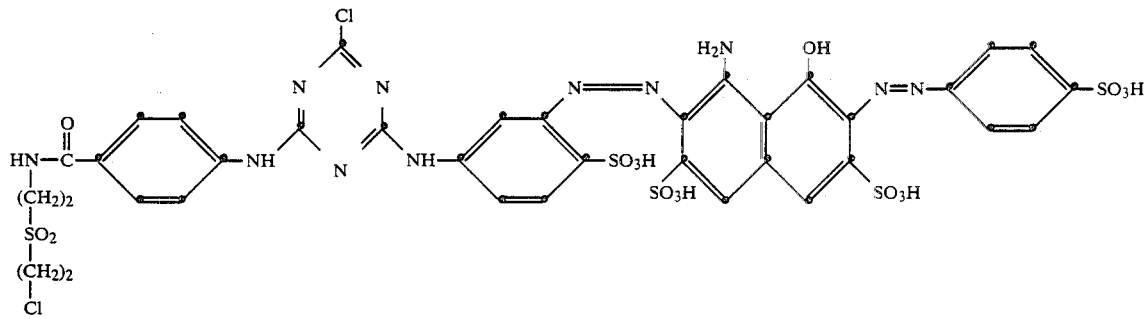

EXAMPLE 268

21.6 parts of 3-aminoacetanilide-4-sulfonic acid diazotized in the presence of hydrochloric acid are added at 5° C. 31.6 parts of a suspension of 1-amino-8-hydroxynaphthalene-3,6-disulfonic acid in 300 parts of water. Coupling is carried out overnight at pH 1–2, and subsequently 17.3 parts of a suspension of aniline-4-sulfonic acid diazotized in the presence of hydrochloric acid are added. By adding 17.8 parts of sodium carbonate the coupling is completed under weakly acid conditions; it is followed by 2 hours of alkaline hydrolysis at 80° C. The chromophore is isolated and condensed at 0°–2° C./pH 6–7 with 14 parts of cyanuric fluoride. 30 parts of 4-amino-1-β-(β'-chloroethylsulfonyl)-ethylcarbamoylbenzene hydrochloride are then added and condensed at 0°–20° C./pH 6–7 for 2 hours. The dye is precipitated from neutral solution by adding potassium chloride and is gently dried. This gives a black powder which dyes cotton in fast navy shades.

The dye mentioned in Example 268 has the formula

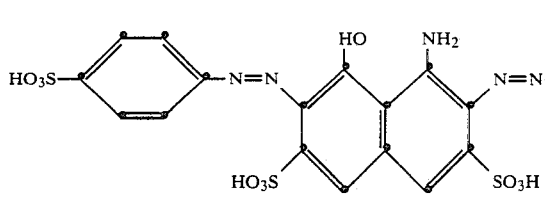

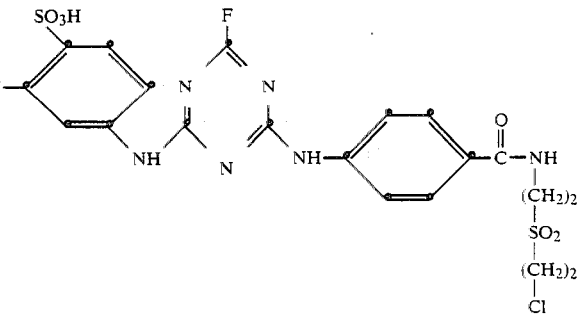

Analogous dyes according to the invention are listed in Table 7, where column I shows the diazo component used for the acid coupling, column II the diazo component used for coupling in neutral or alkaline solution, column III the fiber-reactive radical T and column IV the hue obtained on cotton.

TABLE 7

| Example | I | II | III | IV |
|---|---|---|---|---|
| 269 | 1,3-phenylenediamine-4-sulfonic acid | 2-naphthylamine-1,5-disulfonic acid | $T_1$ | reddish navy |
| 270 | 1,3-phenylenediamine-4-sulfonic acid | 2-chloro-4,6-disulfoaniline | $T_1$ | reddish navy |
| 271 | 1,3-phenylenediamine-4-sulfonic acid | 2-chloro-4-sulfoaniline | $T_1$ | reddish navy |
| 272 | 1,3-phenylenediamine-4-sulfonic acid | 2-methyl-4,6-disulfoaniline | $T_1$ | reddish navy |
| 273 | 1,3-phenylenediamine-4-sulfonic acid | 3-(4',6'-dichlorotriazinyl)-amino-6-sulfoaniline | $T_1$ | reddish navy |
| 274 | 1,3-phenylenediamine-4-sulfonic acid | 2-naphthylamine-3,6,8-trisulfonic acid | $T_1$ | reddish navy |
| 275 | 1,3-phenylenediamine-4-sulfonic acid | aniline | $T_{12}$ | reddish navy |
| 276 | 1,3-phenylenediamine-4-sulfonic acid | 4-sulfamoylaniline | $T_1$ | reddish navy |
| 277 | 1,4-phenylenediamine-5-sulfonic acid | aniline-4-sulfonic acid | $T_1$ | greenish navy |
| 278 | 1,3-phenylenediamine-2,4-disulfonic acid | aniline-4-sulfonic acid | $T_{12}$ | greenish navy |
| 279 | 1,4-phenylenediamine- | aniline-4-sulfonic | $T_1$ | greenish |

TABLE 7-continued

| Example | I | II | III | IV |
|---|---|---|---|---|
| | mine-2,5-disul-fonic acid | acid | | navy |

EXAMPLE 280

15.8 parts of the compound of the formula

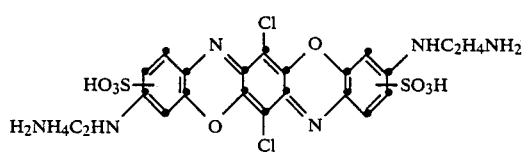

are heated with 1,500 parts of water to 45° C. and brought with sodium hydroxide solution to pH 9. This is followed by cooling to 0°-5° C. and, after reducing the pH with hydrochloric acid to 7, by addition of a fine suspension of 9.7 parts of cyanuric chloride in 100 parts of ice-water. This is followed by stirring at 0°-5° C. and maintaining the pH between 6.5 and 7 with sodium carbonate until the reaction is ended, which takes about 1½ hours. A neutral solution of 8 parts of 4-amino-1-β-(β'-chloroethylsulfonyl)-ethylcarbamoylbenzene hydrochloride in 200 parts of water is then added dropwise in the course of 10 minutes. The temperature is raised to 20°-30° C., and the reaction is stirred at a pH maintained at 6.5-7 until completion. This is followed by cooling to 20° C., salting out with 400 parts of potassium chloride, filtering off the precipitated dye with suction, and drying. The dye dyes cellulose fibers in reddish blue shades having good fastness properties and has the formula

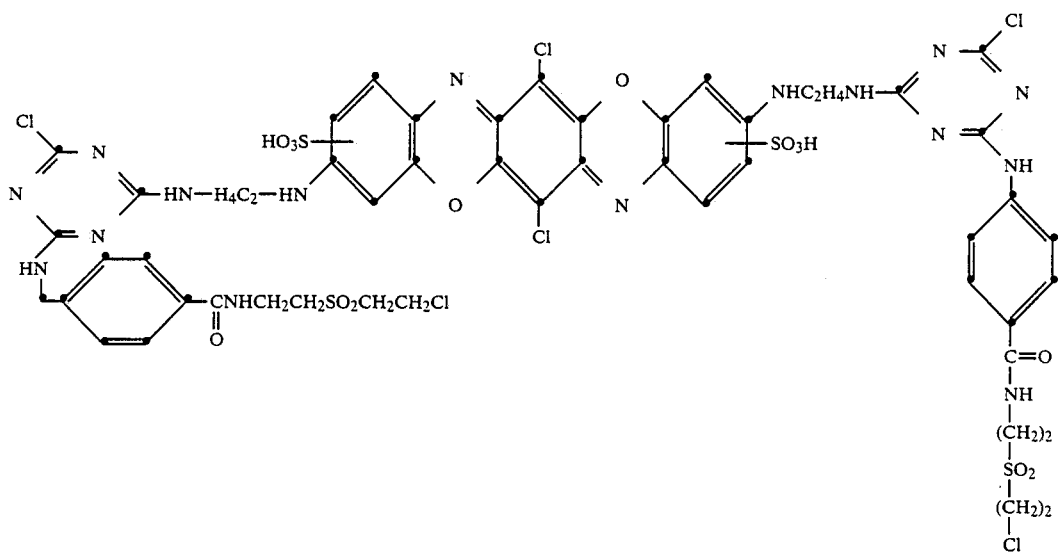

EXAMPLE 281

15.8 parts of the compound of the formula

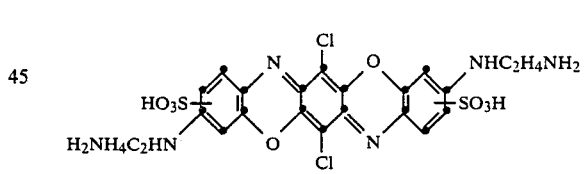

are heated with 1,500 parts of water to 45° C. and brought with sodium hydroxide solution to pH 9. This is followed by cooling to 0°-2° C. and by addition of 8 parts of cyanuric fluoride. This is followed by stirring at 0°-2° C. and maintaining the pH between 6.5 and 7 with sodium carbonate until the reaction is ended, which takes about 1½ hours. A neutral solution of 3 parts of 4-amino-1-β-(β'-chloroethylsulfonyl)-ethylcarbamoylbenzene hydrochloride in 200 parts of water is then added dropwise in the course of 10 minutes. The temperature is raised to 0°-20° C., and the reaction is stirred at a pH maintained at 6.5-7 until completion. This is followed by salting out with 400 parts of potassium chloride, filtering off the precipitated dye with suction, and drying. The dye dyes cellulose fibers in reddish blue shades having good fastness properties and has the formula

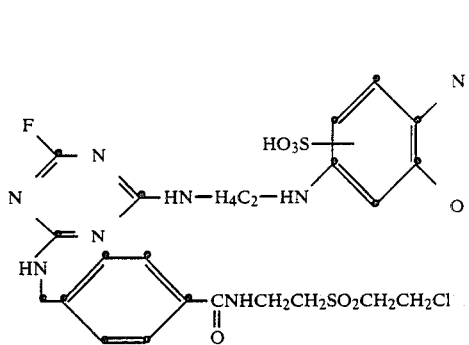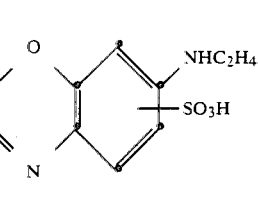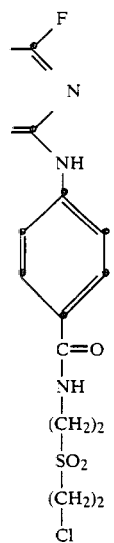

EXAMPLE 282

23 parts of the compound of the approximate formula

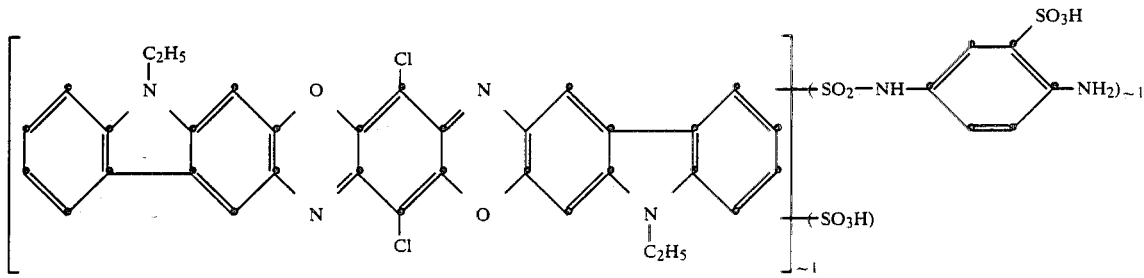

are dissolved in 400 parts of water. The solution is added dropwise at 0°–5° C. to a fine suspension of 4.8 parts of cyanuric chloride in 50 parts of ice-water. The mixture is stirred at 0°–2° C. and is brought to pH 6–6.5 with sodium carbonate, this pH being maintained until the reaction has ended. A neutral solution of 4 parts of 3-amino-1-β-(β'-chloroethylsulfonyl)-ethylcarbamoyl-benzene hydrochloride in 200 parts of water is then added and the mixture is stirred at 35°–40° C. while a pH of 6.5–7 is maintained with sodium carbonate. When the pH remains constant for about 1 hour without adding sodium carbonate, the dye is salted out with sodium chloride and dried. The dye obtained dyes cellulose fibers in reddish blue shades and has the approximate formula

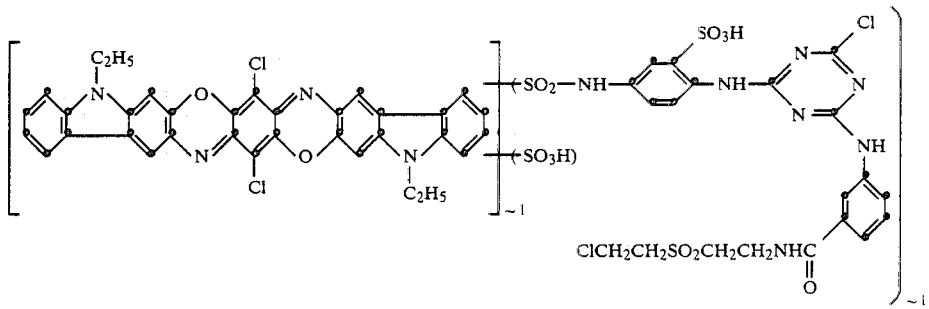

EXAMPLE 283

23 parts of the compound of the approximate formula

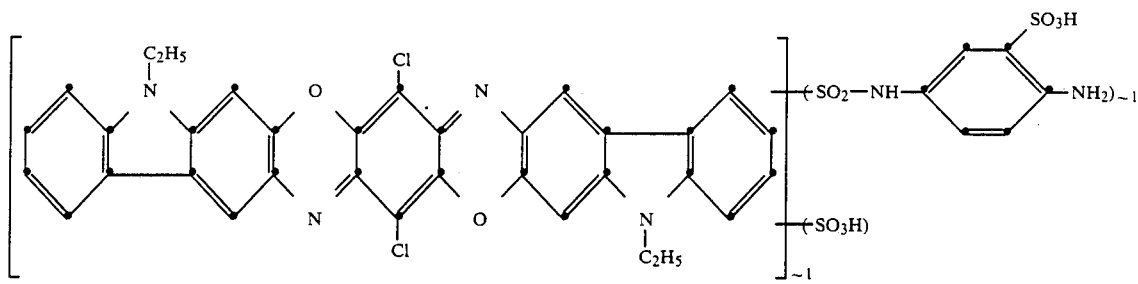

are dissolved in 400 parts of water. The solution has added to it dropwise at 0°–2° C. 4 parts of cyanuric fluoride in the course of 15 minutes. The mixture is stirred at 0°–2° C. and is brought to pH 6–6.5 with sodium car-bonate, this pH being maintained until the reaction has ended. A neutral solution of 4 parts of 3-amino-1-β(β′-chlorooöthylsulfonyl)-ethylcarbamoyl-benzene hydrochloride [sic] in 200 parts of water is then added and the mixture is stirred at 0°–20° C. while a pH of 6.5–7 is maintained with sodium carbonate. When the pH remains constant for about 1 hour without adding sodium carbonate, the dye is salted out with sodium chloride and dried. The dye obtained dyes cellulose fibers in reddish blue shades and has the approximate formula

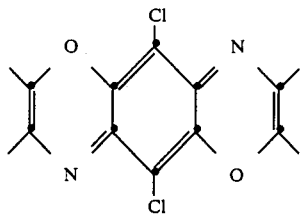

having been abbreviated to

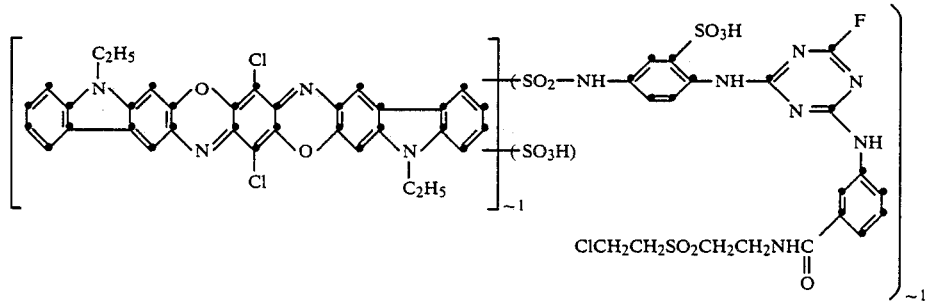

The dyes listed in the table below can be prepared analogously, the radical

| Example | Chromophore | T | Hue |
|---|---|---|---|
| 284 | [structure with C2H5, N, Q, SO3H, (SO2NH—NH—)~1, SO3H)~1] | T1 | reddish blue |

-continued

| Example | Chromophore | T | Hue |
|---|---|---|---|
| 285 | (structure with two C₂H₅−N groups, Q linker, −(SO₂NH−⟨ring-SO₃H⟩−NH−)∼1, −SO₃H∼1) | T₁₂ | reddish blue |
| 286 | (structure: −NH−HC(CH₃)−H₂C−HN−⟨ring⟩−Q−⟨ring⟩−NH−CH₂−CH(CH₃)−NH−) | T₁₄ | reddish blue |
| 287 | (structure: −NH−HC(CH₃)−H₂C−HN−⟨ring⟩−Q−⟨ring⟩−NH−CH₂−CH(CH₃)−NH−) | T₆ | reddish blue |
| 288 | (structure: −NH−HC(CH₃)−H₂C−HN−⟨ring⟩−Q−⟨ring⟩−NH−CH₂−CH(CH₃)−NH−) | T₁₃ | reddish blue |
| 289 | (structure with O bridges, Q linker, −(SO₂−NH−⟨ring-SO₃H⟩−NH−)∼2) | T₁ | reddish violet |
| 290 | (structure with Q linker, −(SO₂−NH−⟨ring-SO₃H⟩−NH−)∼1, −(SO₃H)₁) | T₁₂ | red |
| 291 | (structure: −HNH₂CH₂CHN−⟨ring-SO₃H⟩−Q−⟨ring-SO₃H⟩−NHCH₂CH₂NH−) | T₁ | reddish blue |

-continued
| Example | Chromophore | T | Hue |
|---|---|---|---|
| 292 | 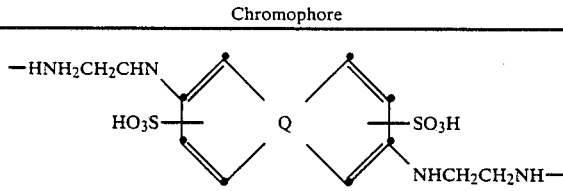 | $T_{13}$ | reddish blue |
| 293 | 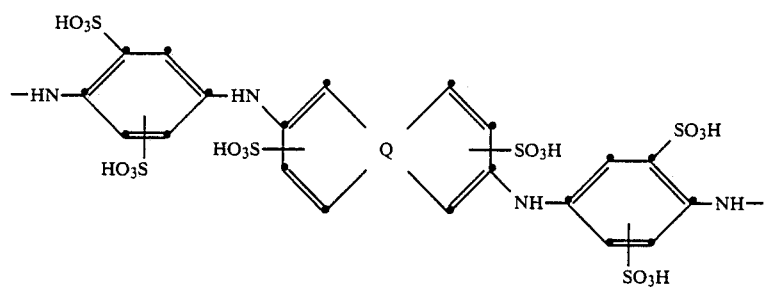 | $T_{12}$ | reddish blue |
| 294 | 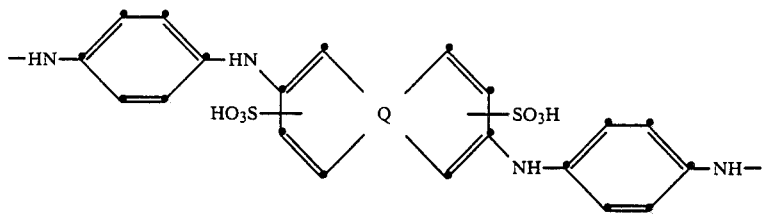 | $T_3$ | reddish blue |
| 295 | 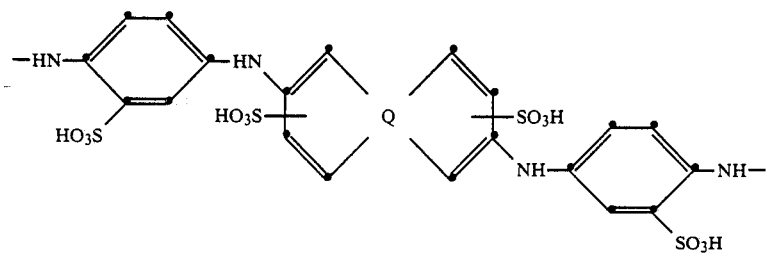 | $T_{12}$ | reddish blue |
| 296 | 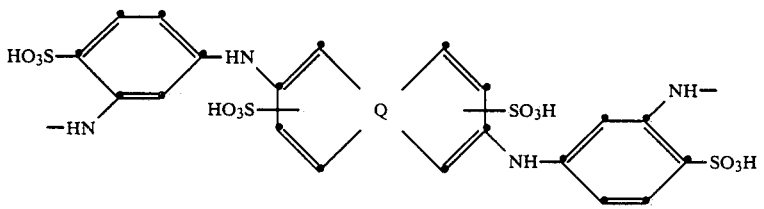 | $T_1$ | reddish blue |
| 297 | 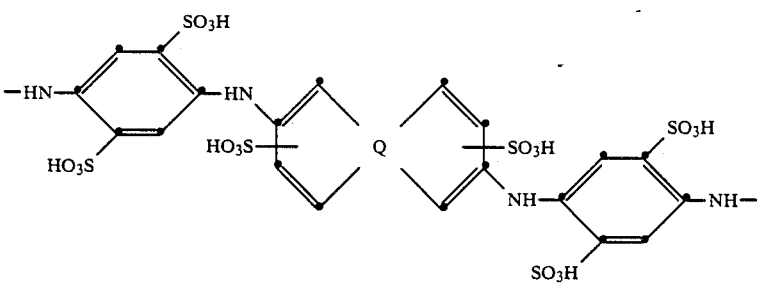 | $T_1$ | |

| Example | Chromophore | T | Hue |
|---|---|---|---|
| 298 | (structure shown) | $T_{12}$ | reddish blue |
| 299 | (structure shown) | $T_6$ | reddish blue |
| 300 | (structure shown) | $T_5$ | red |
| 301 | (structure shown) | $T_{14}$ | red |
| 302 | (structure shown) | $T_5$ | red |
| 303 | (structure shown) | $T_1$ | blue |

| Example | Chromophore | T | Hue |
|---|---|---|---|
| 304 | (structure with Cl, HNH₄C₂HN, HO₃S, SO₃H, NHC₂H₄—NH—, phenyl-substituted phenoxazine) | $T_{12}$ | reddish blue |
| 305 | (structure with —HN—, HO₃S, SO₃H, NH—, NH—, phenoxazine) | $T_1$ | reddish blue |
| 306 | (structure with OCH₃, NHC₂H₄NH—, HO₃S, SO₃H, —HNH₄C₂HN, OCH₃) | $T_{12}$ | reddish blue |
| 307 | (structure with C₂H₅, N, Q, SO₃H, —(SO₂NH—⟨ph⟩—NH—)₂, N-C₂H₅) | $T_1$ | reddish blue |

EXAMPLE 308

19.7 parts of the compound of the formula

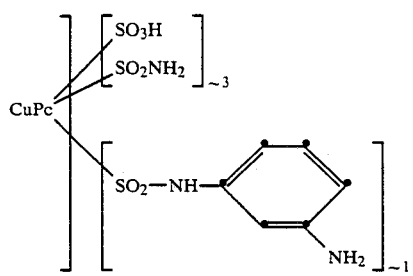

are stirred in a mixture of 125 parts of ice and 125 parts of water until a homogeneous suspension is obtained, and the latter is brought to pH 7 with sodium hydroxide solution. At a temperature of 0°–5° C. a fine suspension of 4,4 parts of cyanuric chloride in 50 parts of ice-water is then added, the pH being maintained at 5.5 to 6 with sodium carbonate. As soon as the reaction is complete, a neutral solution of 4 parts of 3-amino-1-β-(β′-chloroethylsulfonyl)-ethylcarbamolybenzene hydrochloride in 100 parts of water is added dropwise. The temperature is raised to 20°–30° C., and the mixtre is stirred at a pH maintained at 6.5–7 until the reaction is complete. The mixture is then cooled down to room temperature, and the dye is salted out with sodium chloride, filtered off with suction and dried. It has the approximate formula

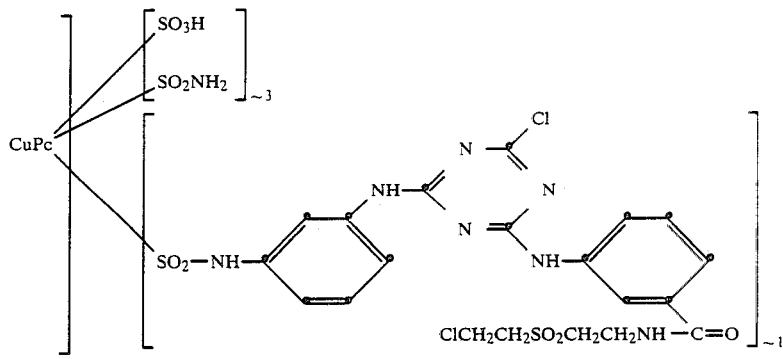

and dyes cellulose material in turquoise blue shades having good fastness properties.

EXAMPLE 309

19.7 parts of the compound of the formula

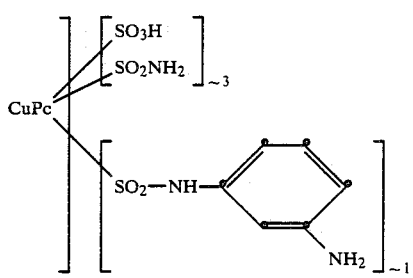

are stirred in a mixture of 125 parts of ice and 125 parts of water until a homogeneous suspension is obtained, and the latter is brought to pH 7 with sodium hydroxide solution. At a temperature of 0°-2° C. 4 parts of cyanuric fluoride are then added, the pH being maintained at 5.5 to 6 with sodium carbonate. As soon as the reaction is complete, a neutral solution of 4.5 parts of 4-amino-1-β-(β'-chloroethylsulfonyl)ethylcarbamoylbenzene hydrochloride in 100 parts of water is added dropwise. The temperature is raised to 0°-30° C., and the mixture is stirred at a pH maintained at 6.5-7 until the reaction is complete. The mixture is then cooled down to room temperature, and the dye is salted out with sodium chloride, filtered off with suction and dried. It has the approximate formula

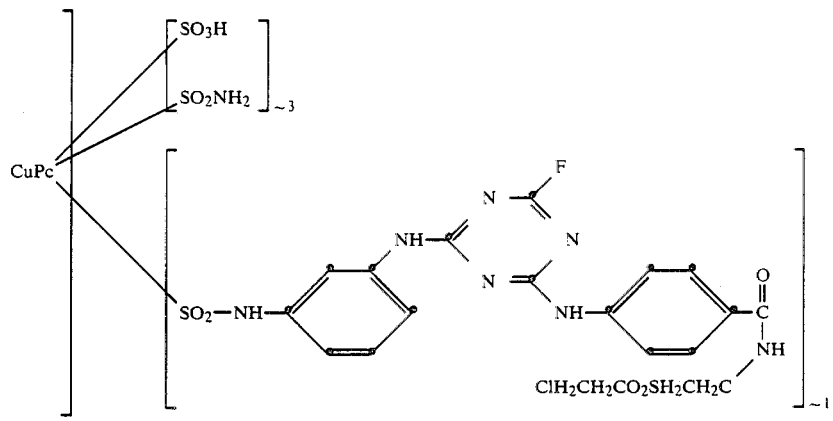

and dyes cellulose material in turquoise blue shades having good fastness properties.

EXAMPLE 310

58 parts of the compound of the approximate formula

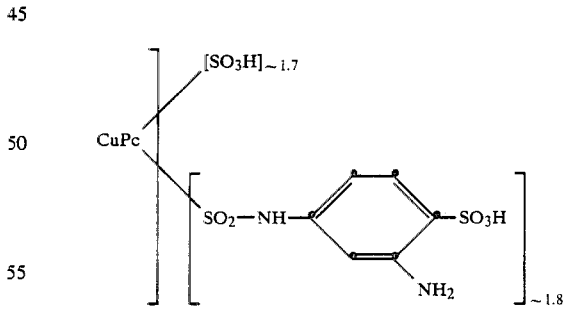

are stirred in a mixture of 300 parts of water and 125 parts of ice until a homogeneous suspension is obtained, and the latter is brought to pH 7 with sodium hydroxide solution. At 0°-5° C. a fine suspension of 16.6 parts of cyanuric chloride in 170 parts of ice-water is then added, while the pH is maintained at 5.3-5.5 with 10% strength sodium hydroxide solution. As soon as the reaction is complete, a neutral solution of 16 parts of 4-amino-1-β-(β'-chloroethylsulfonyl)ethylcarbamoylbenzene hydrochloride in 250 parts of water is added dropwise. The temperature is then raised to 20°–30° C. and is maintained for 4 hours, during which the pH value is maintained at 6.5–7 with sodium hydrogencarbonate. This is followed by cooling down and salting out with sodium chloride, and the dye is filtered off with suction and dried. It has the approximate formula the reaction is complete, a neutral solution of 17 parts of 3-amino-1-β-(β'-chloroethylsulfonyl)-ethylcarbamoyl-benzene hydrochloride in 350 parts of water is added dropwise. The temperature is then raised to 0°–30° C. and is maintained for 4 hours, during which the pH value is maintained at 6.5–7 with sodium hydrogencarbonate. This is followed by cooling down and salting

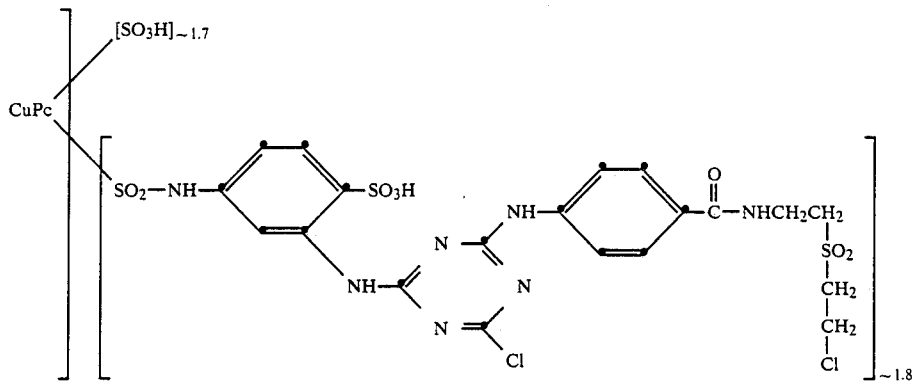

EXAMPLE 311

58 parts of the compound of the approximate formula out with sodium chloride, and the dye is filtered off with suction and dried. It has the approximate formula

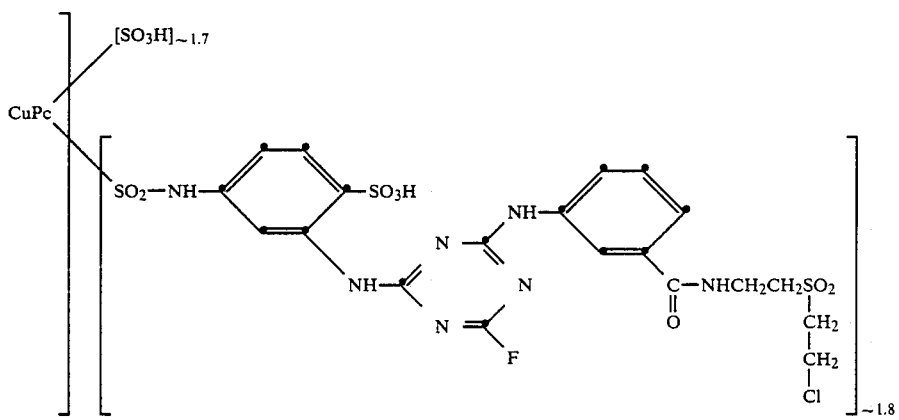

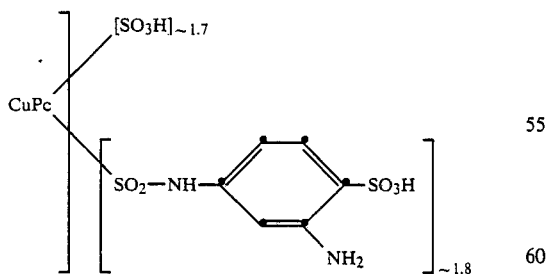

are stirred in a mixture of 300 parts of water and 125 parts of ice until a homogeneous suspension is obtained, and the latter is brought to pH 7 with sodium hydroxide solution. At 0°–2° C. 15 parts of cyanuric fluoride are then added, while the pH is maintained at 5.3–5.5 with 10% strength sodium hydroxide solution. As soon as In the same way it is possible to prepare the dyes listed in Table 8 below. They have the general formula

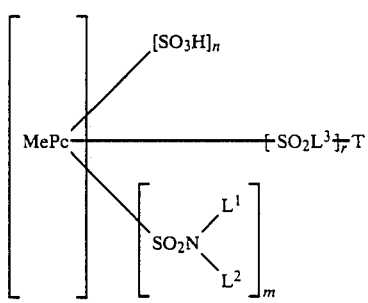

in which n and m can be values of 0–3 and r can be values of 1–4.

TABLE 8
| Example | Me | L¹ | L² | L³ | T | n | m | r | Hue |
|---|---|---|---|---|---|---|---|---|---|
| 312 | Cu | H | H | 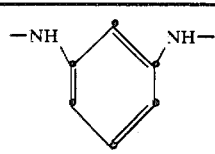 —NH— ... —NH— (benzene) | $T_1$ | 2 | 1 | 1 | turquoise blue |
| 313 | Cu | — | — | —HNCH₂CH₂NH— | $T_{12}$ | 3 | 0 | 1 | turquoise blue |
| 314 | Cu | — | — | 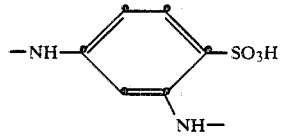 —NH—(benzene-SO₃H)—NH— | $T_1$ | 1.7 | 0 | 1.8 | turquoise blue |
| 315 | Cu | — | — | 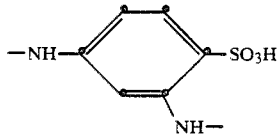 —NH—(benzene-SO₃H)—NH— | $T_{12}$ | 3 | 0 | 1 | turquoise blue |
| 316 | Cu | H | H | 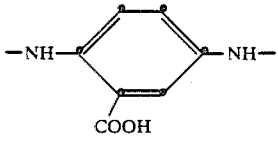 —NH—(benzene-COOH)—NH— | $T_6$ | 2 | 1 | 1 | turquoise blue |
| 317 | Cu | H | H | 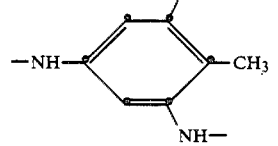 —NH—(benzene with SO₃H, CH₃)—NH— | $T_9$ | 1.6 | 1 | 1 | turquoise blue |
| 318 | Cu | H | H | 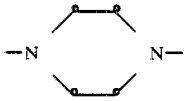 —N(pyrazine)N— | $T_1$ | 2 | 1 | 1 | turquoise blue |
| 319 | Ni | — | — | 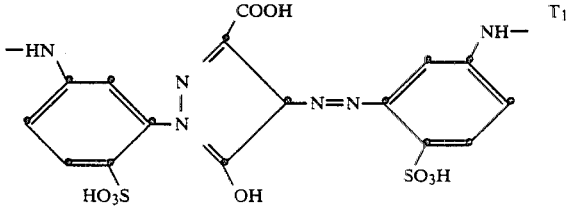 | $T_1$ | 3 | 0 | 1 | green |
| 320 | Ni | — | — | 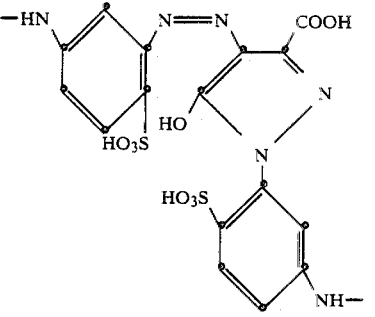 | $T_{10}$ | 2 | 0 | 1.5 | green |

TABLE 8-continued

| Example | Me | L¹ | L² | L³ | T | n | m | r | Hue |
|---|---|---|---|---|---|---|---|---|---|
| 321 | Cu | [benzene]₄-Pc | | —NH—CH₂—CH₂—NH— | $T_{12}$ | 3-4 | 0 | 2-3 | green |
| 322 | Ni | — | — | (structure with —NH—C₆H₃(SO₃H)—N=N—C(CH₃)=C(OH)— pyrazolone-N-phenyl(SO₃H)—CH=CH—C₆H₃(SO₃H)—NH—) | $T_1$ | 3 | 0 | 1 | green |
| 323 | Ni | — | — | (structure with —NH—C₆H₃(SO₃H)—N=N—C(COOH)=C(OH)— pyrazolone-N-phenyl(SO₃H)—CH=CH—C₆H₃(SO₃H)—NH—) | $T_{12}$ | 2 | 0 | 1.5 | green |

EXAMPLE 324

A solution of 37 parts of 1-amino-4-β-(β′-chloroethylsulfonyl)-ethylaminocarbonylbenzene-2-sulfonic acid in 350 parts of ice-water is reacted at 0°–2° C. and pH 6–6.5 with 14 parts of cyanuric fluoride. As soon as free amino groups are no longer detectable, 58 parts of the aminoazo dye obtained by coupling diazotized 2-aminonaphthalene-3,6,8-trisulfonic acid with 3-aminophenylurea in an acetic acid medium, in 450 parts of water, are added, and condensed at 0°–25° C./pH 7.0 until starting dye is no longer detectable by chromatography or by HPLC. The resulting dye of the formula

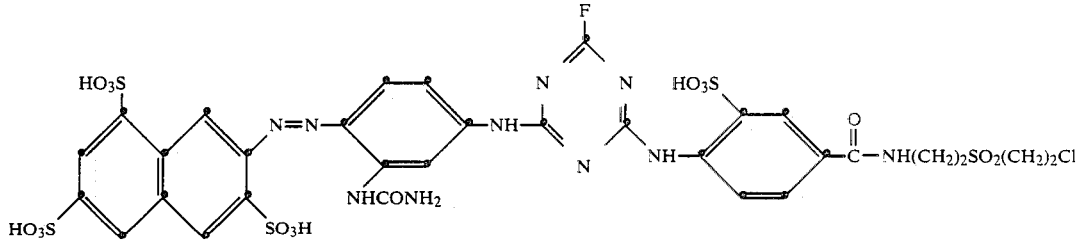

is salted out with potassium chloride, filtered off with suction, washed and dried in vacuo. It dyes cellulose materials in very fast reddish yellow shades.

EXAMPLE 325

A solution of 37 parts of 1-amino-4-$\beta$-($\beta'$-chloroethylsulfonyl)-ethylaminocarbonylbenzene-2-sulfonic acid in 400 parts of ice-water is reacted at 0°–7° C. and pH 6.5–7.0 with 19 parts of cyanuric chloride. As soon as free amino groups are no longer detectable, 48 parts of the dye of the formula

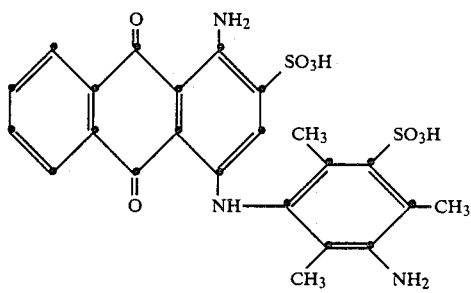

are added in the form of a neutral solution in 280 parts of water, and condensed at 20°–45° C./pH 7–7.5 until starting dye is no longer detectable by chromatography or by HPCC [sic].

The resulting dye of the formula

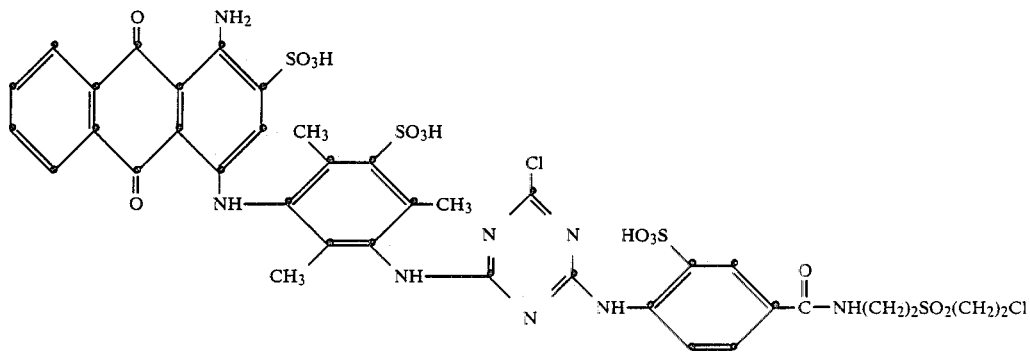

is salted out with sodium chloride, washed and dried in vacuo. It dyes cellulose materials in very fast blue shades.

EXAMPLE 326

48 parts of the secondary condensation product of 1,3-phenylenediamine-4-sulfonic acid, cyanuric chloride and 4-amino-1-$\beta$-($\beta'$-chloroethylsulfonyl)-ethylcarbamoylbenzene hydrochloride are diazotized in the presence of hydrochloric acid and coupled in acetic acid solution onto a suspension of 30.8 parts of 1-amino-8-hydroxynaphthalene-3,6-disulfonic acid in 300 parts of water. To the red monoazo dye are subsequently added a further 48 parts of the secondary condensation product mentioned and these are coupled under neutral conditions to give the disazo dye. The dye is separated out by adding sodium chloride and dried in vacuo. It has the formula

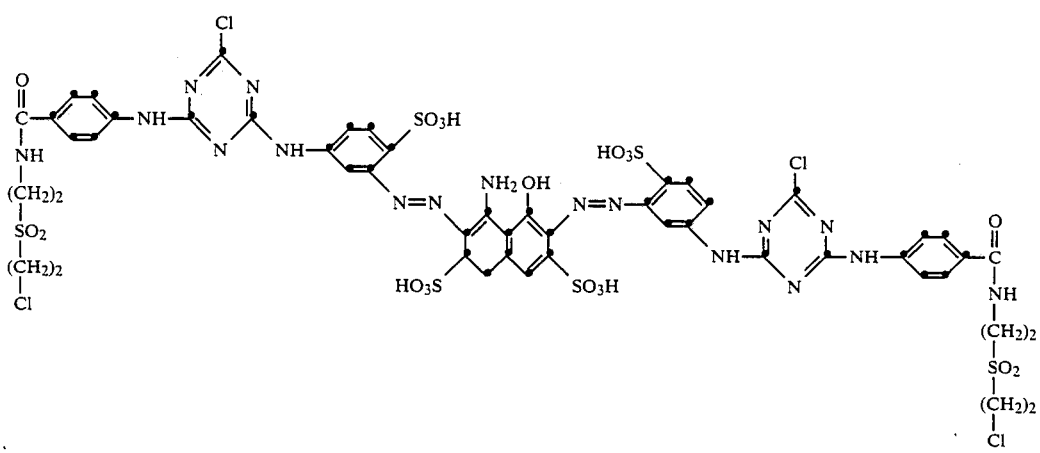
and dyes cellulose materials in navy shades having very good fastness properties.
Further dyes which can be prepared by the methods given in the previous examples are the reactive dyes of the following formulae.

| 327 | 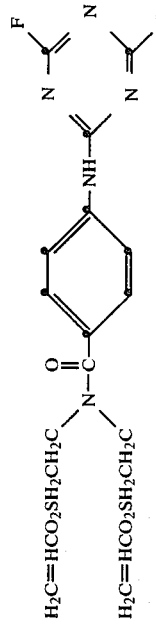 | yellow |
| --- | --- | --- |
| 328 | 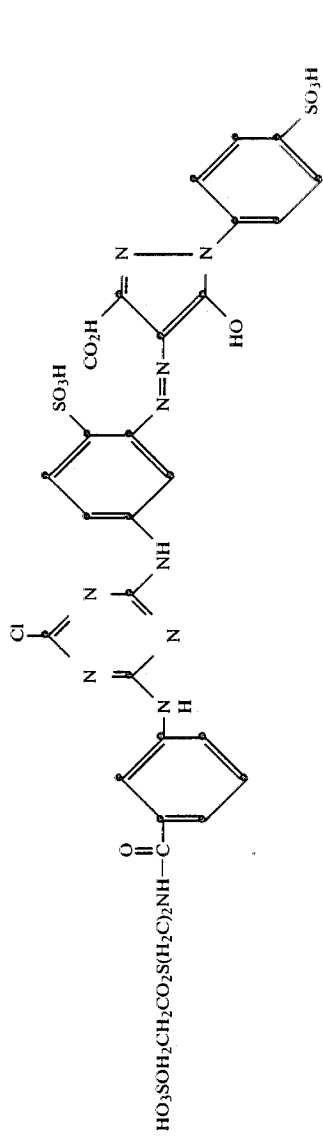 | greenish yellow |
| 329 | 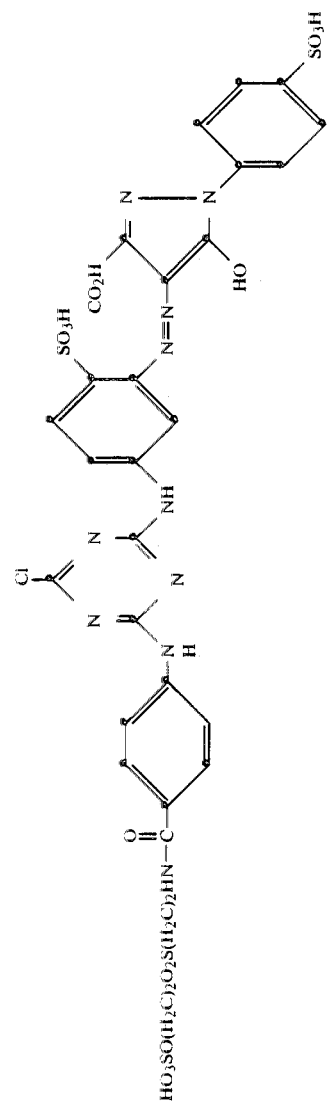 | greenish yellow |

| | | | | |
|---|---|---|---|---|
| 330 | 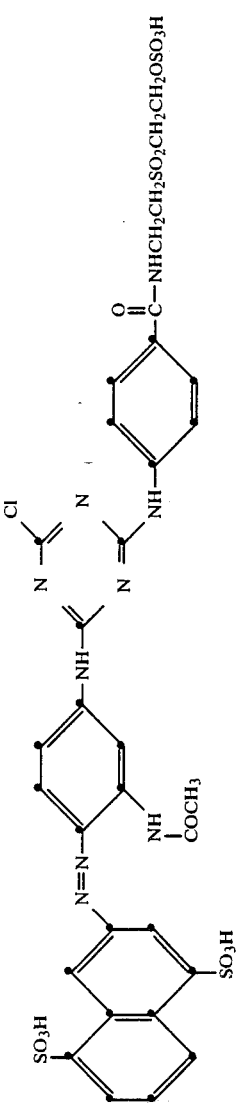 yellow | | | |
| 331 | | 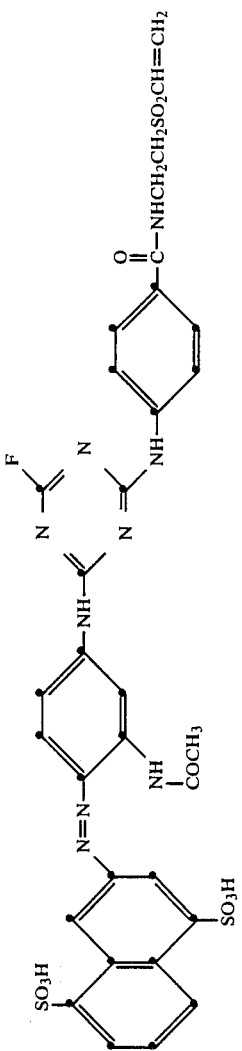 yellow | | |
| 332 | | | 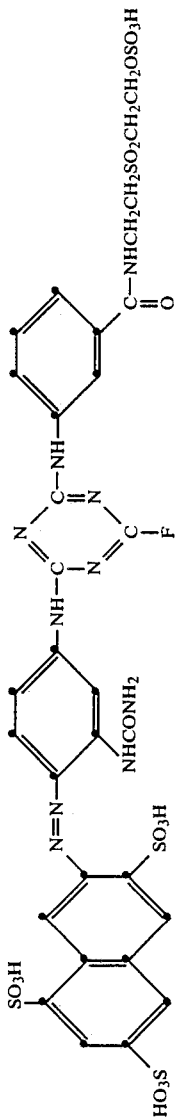 yellow | |
| 333 | | | | 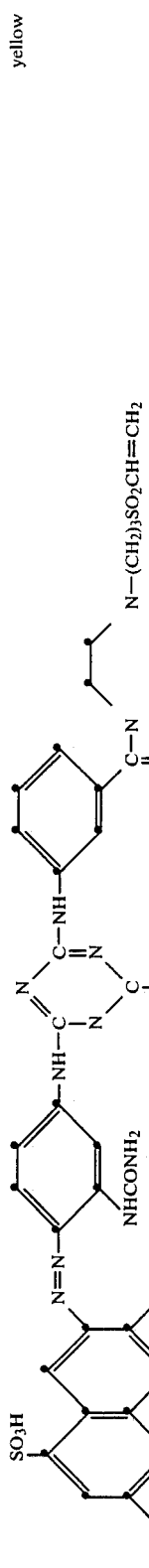 yellow |
| 334 | | | | | 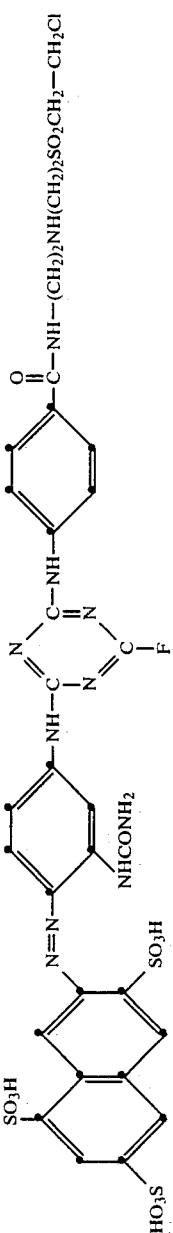 yellow |

-continued
| | | | |
|---|---|---|---|
| 335 | 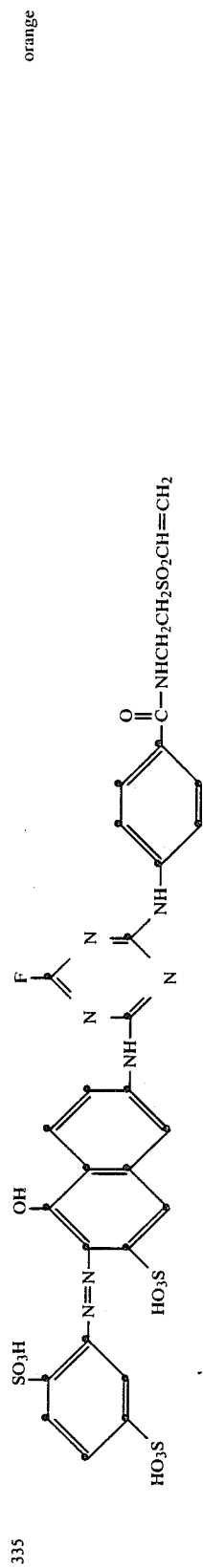 | | orange |
| 336 | 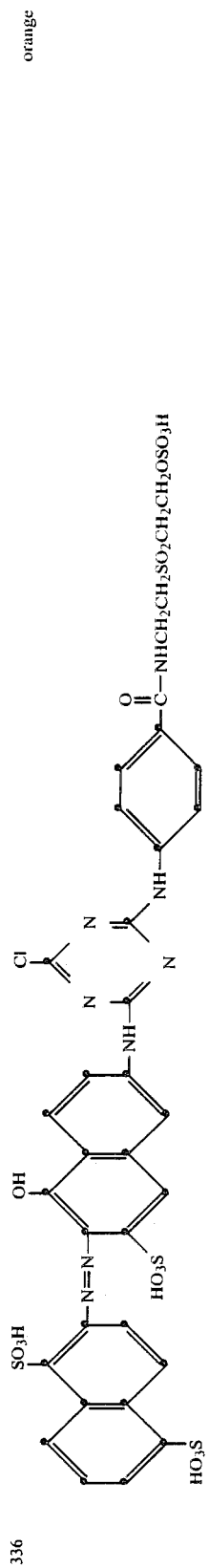 | | orange |
| 337 | 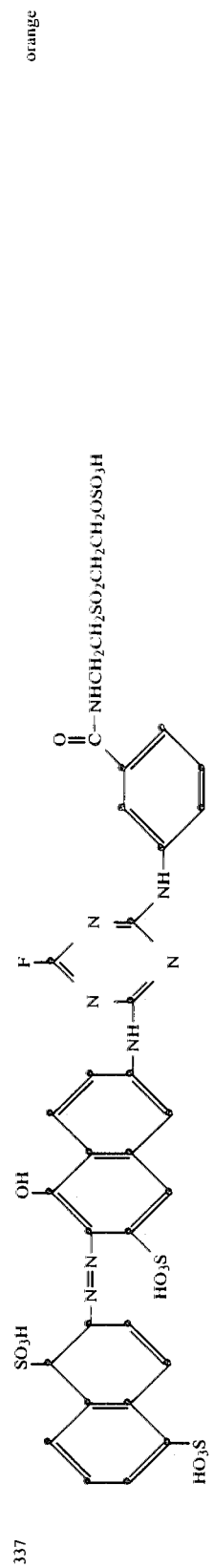 | | orange |
| 338 | 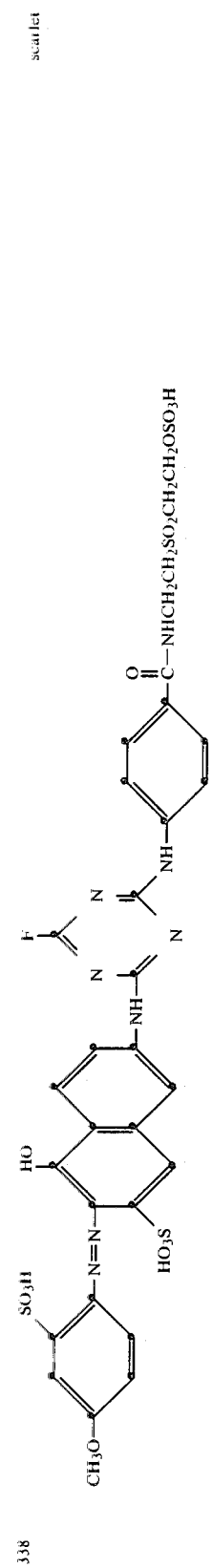 | | scarlet |

-continued
| | | |
|---|---|---|
| 339 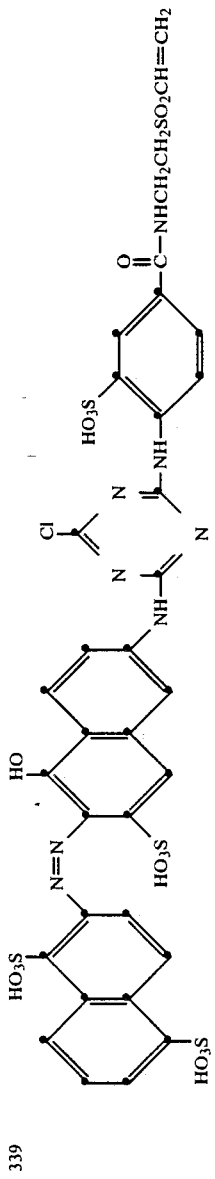 orange | 340 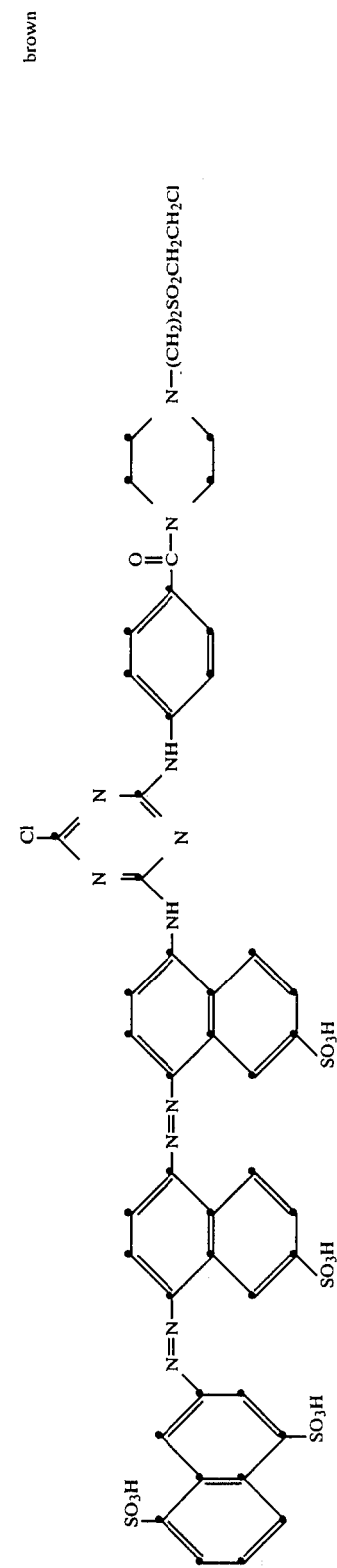 brown | 341 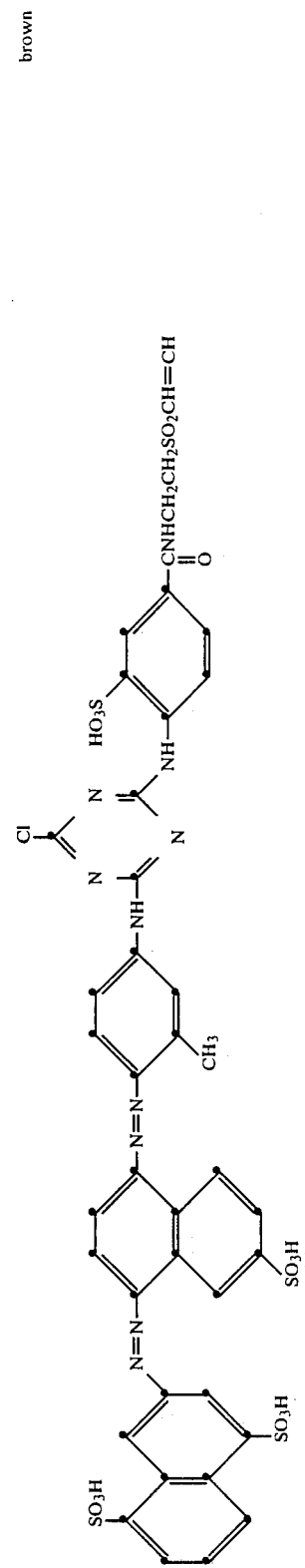 brown |

-continued
| | | |
|---|---|---|
| 342 | 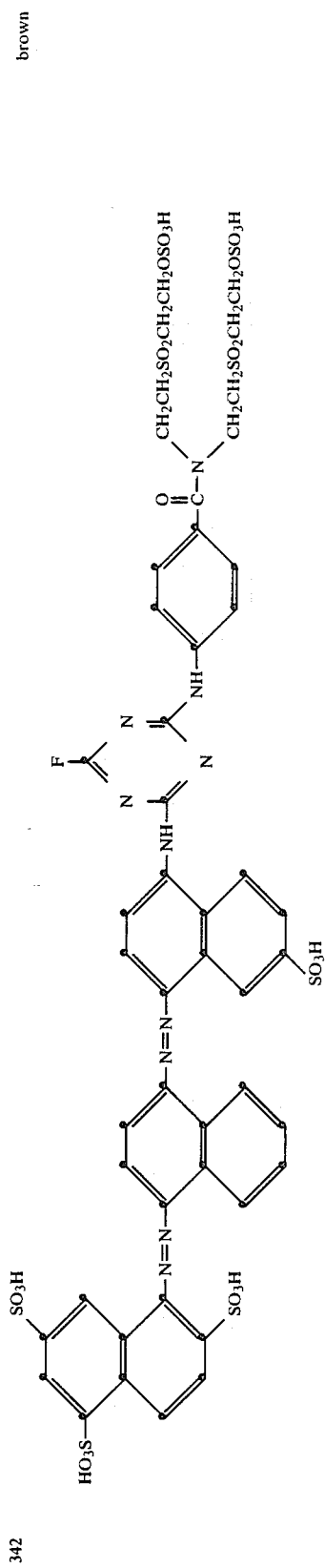 brown | |
| 343 | 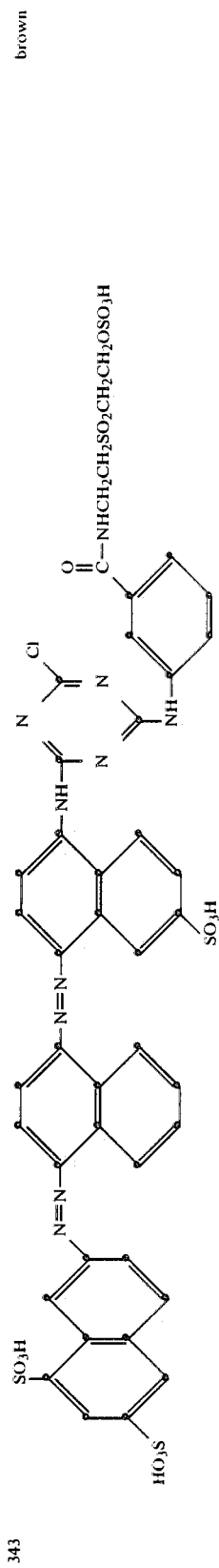 brown | |
| 344 | 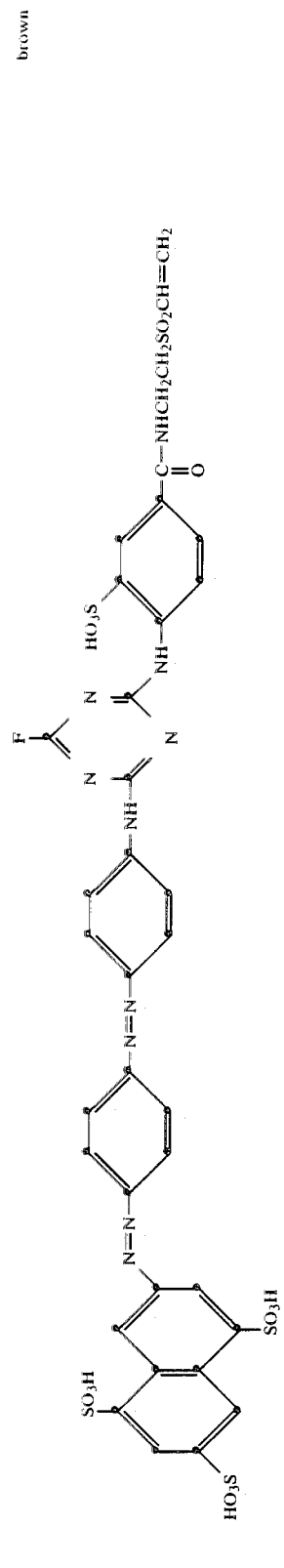 brown | |

-continued
| | | |
|---|---|---|
| 345 | 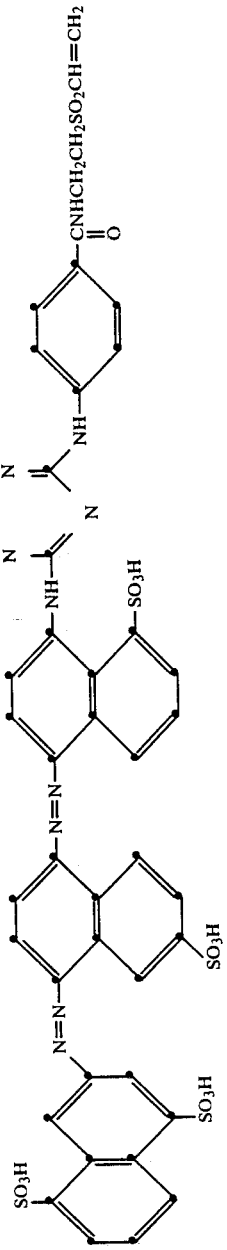 | brown |
| 346 | 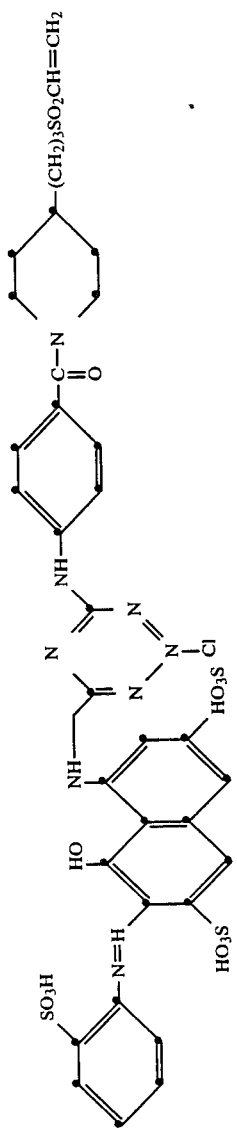 | yellowish red |
| 347 | 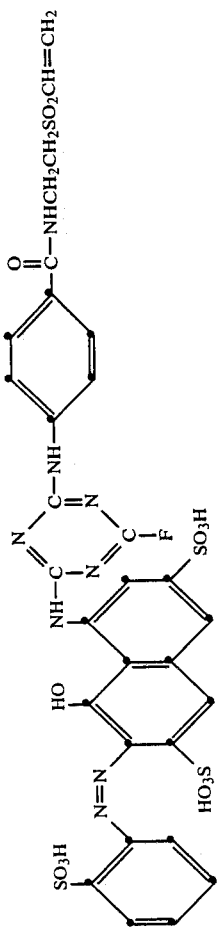 | yellowish red |
| 348 | 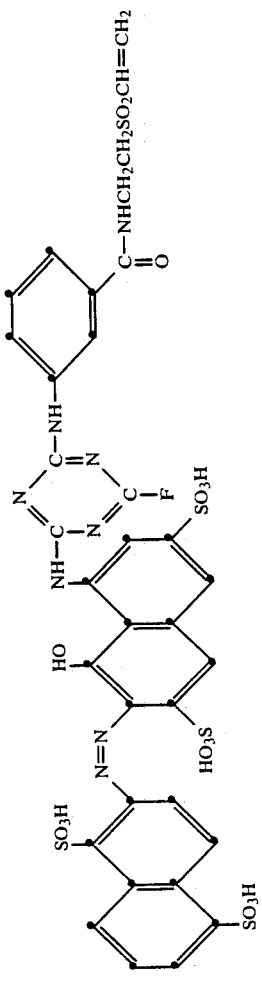 | red |

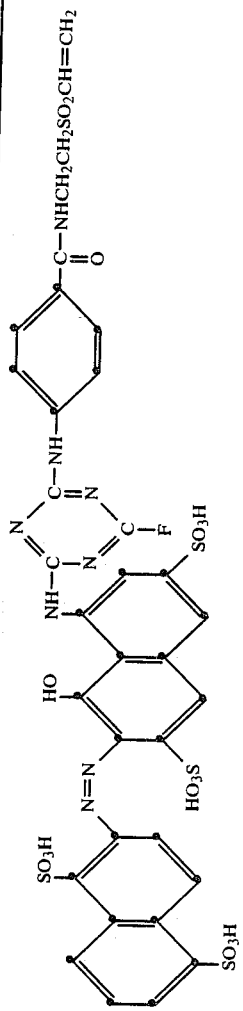
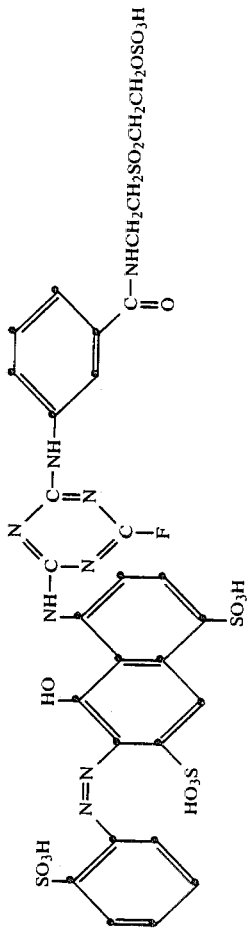
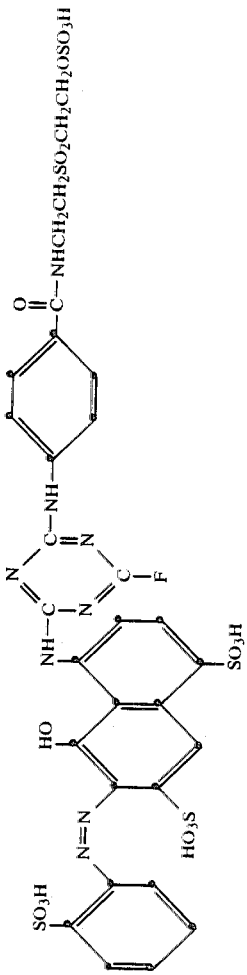
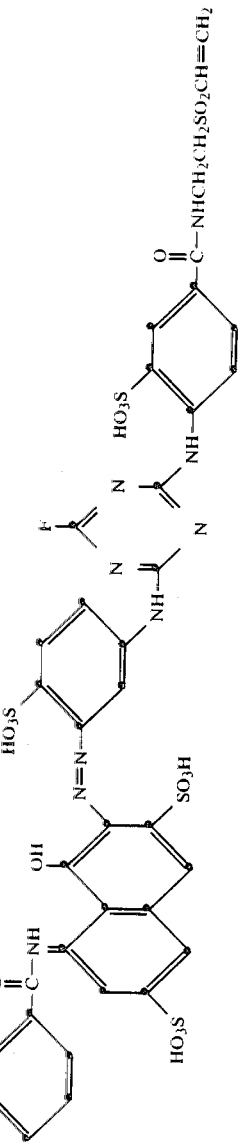

-continued
| | | | |
|---|---|---|---|
| 353 | 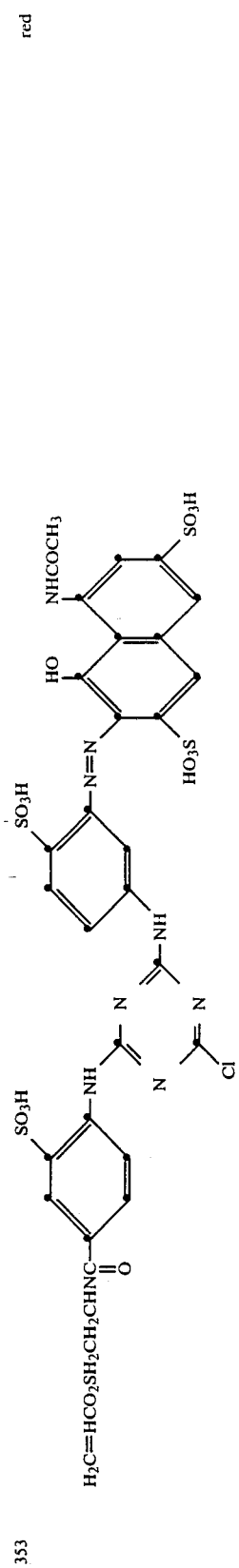 | red | |
| 354 | 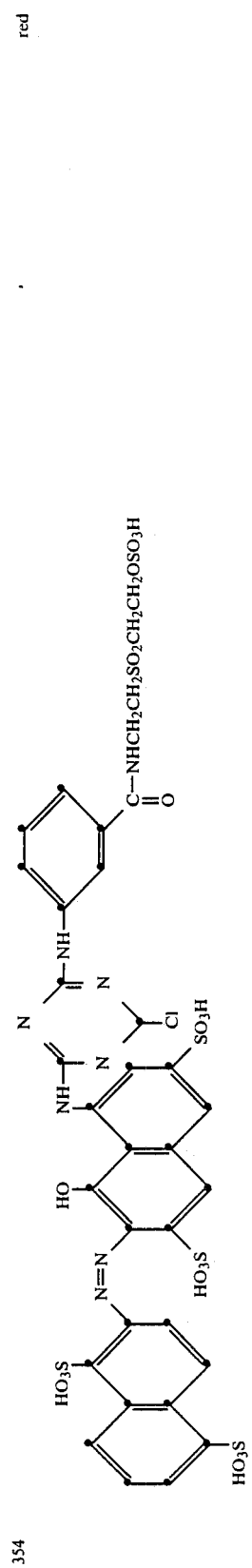 | red | |
| 355 | 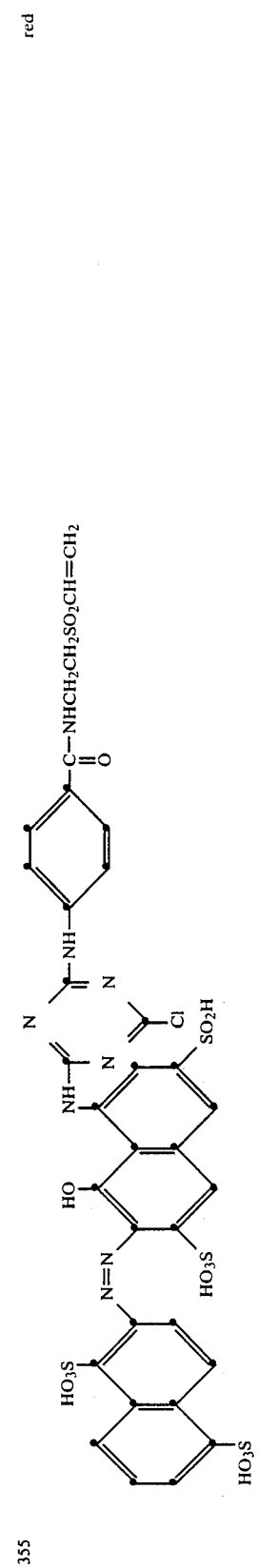 | red | |

-continued
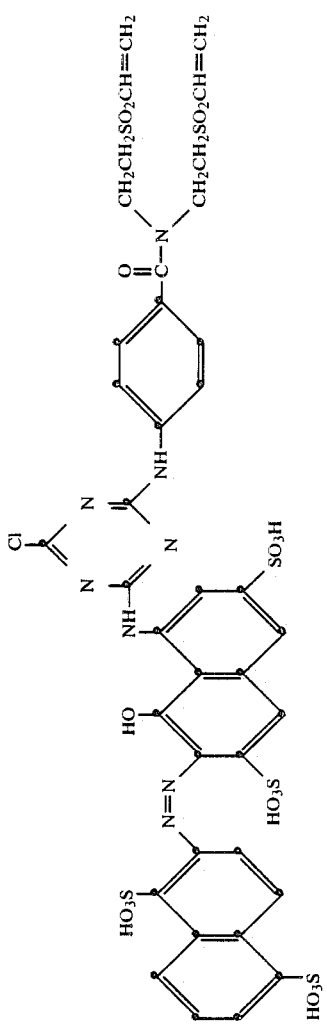
356 red
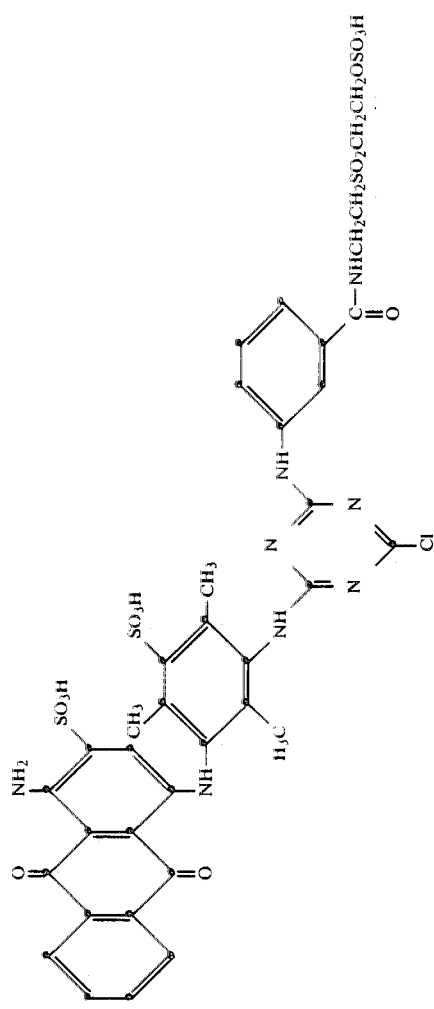
357 blue

-continued
| | | | |
|---|---|---|---|
| 358 | 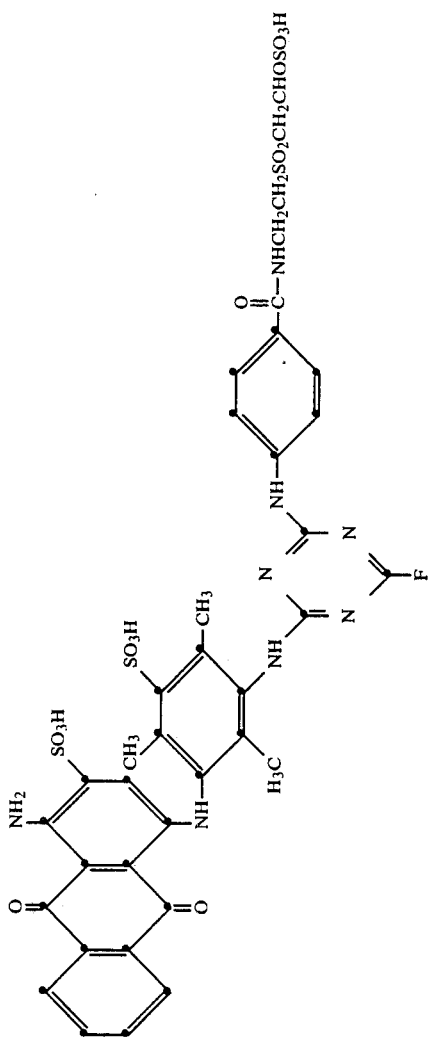 | blue | |
| 359 | 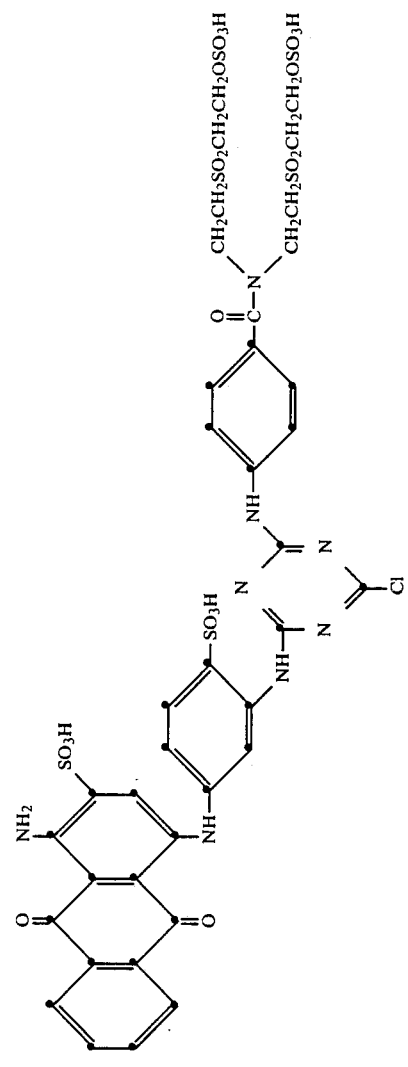 | blue | |

-continued
| 360 | 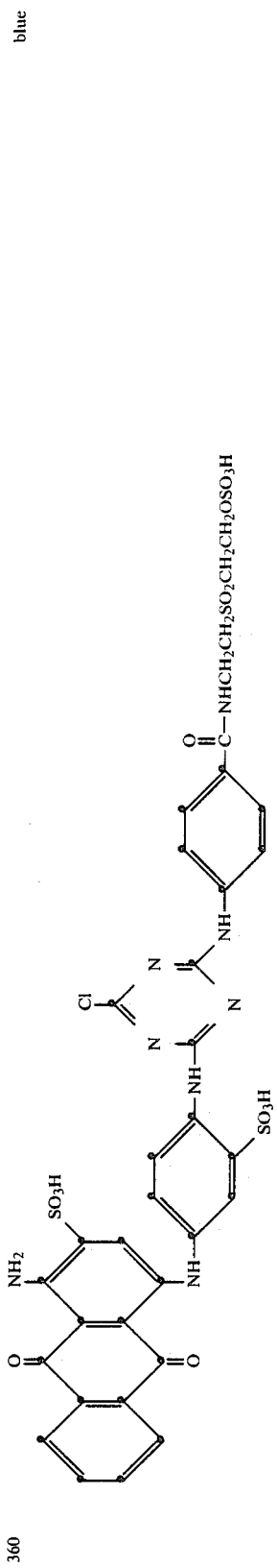 | blue |
| 361 | 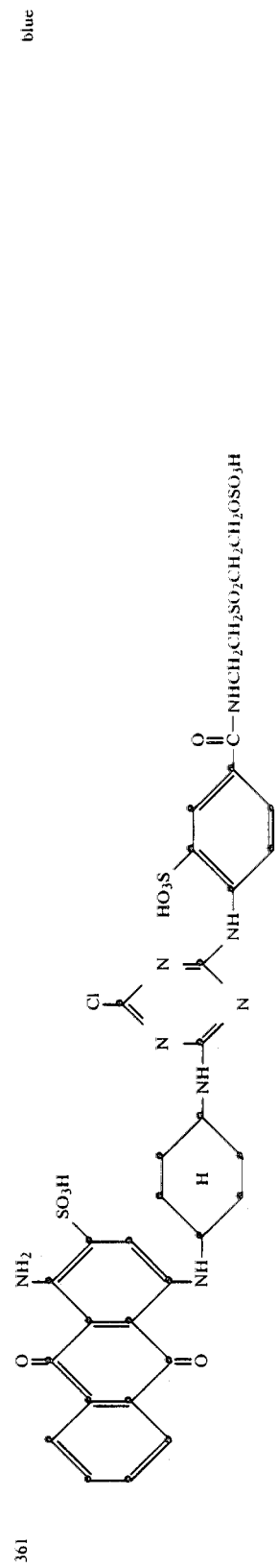 | blue |
| 362 | 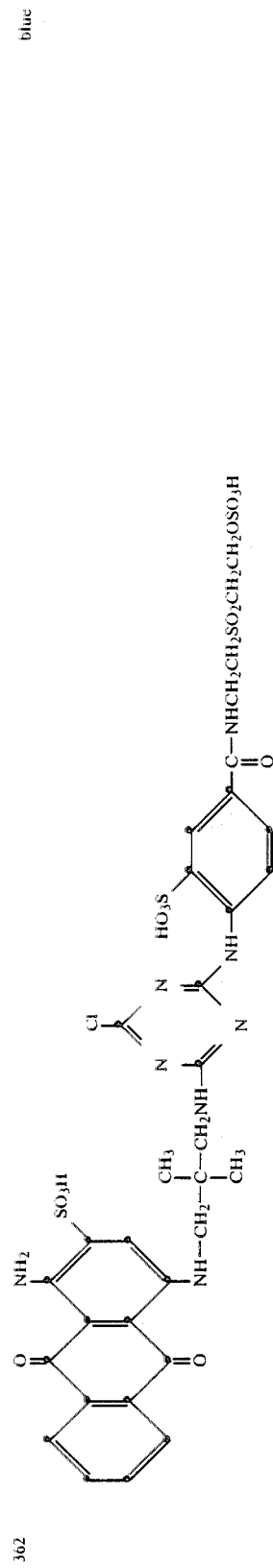 | blue |

-continued
| | | |
|---|---|---|
| 363 | 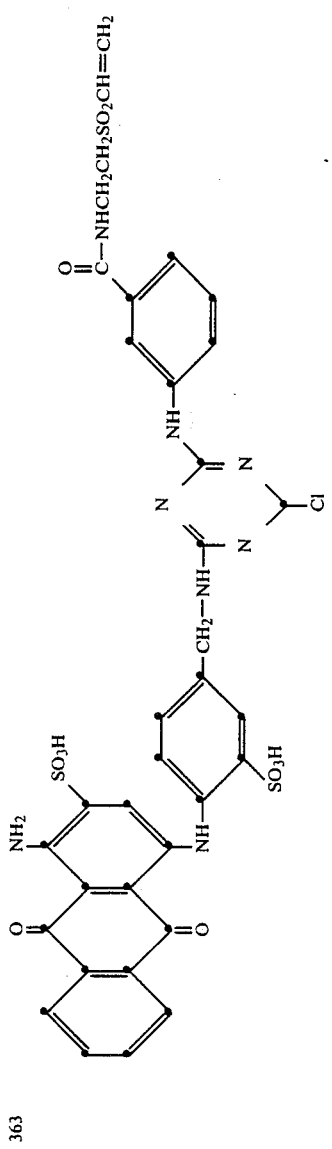 | blue |
| 364 | 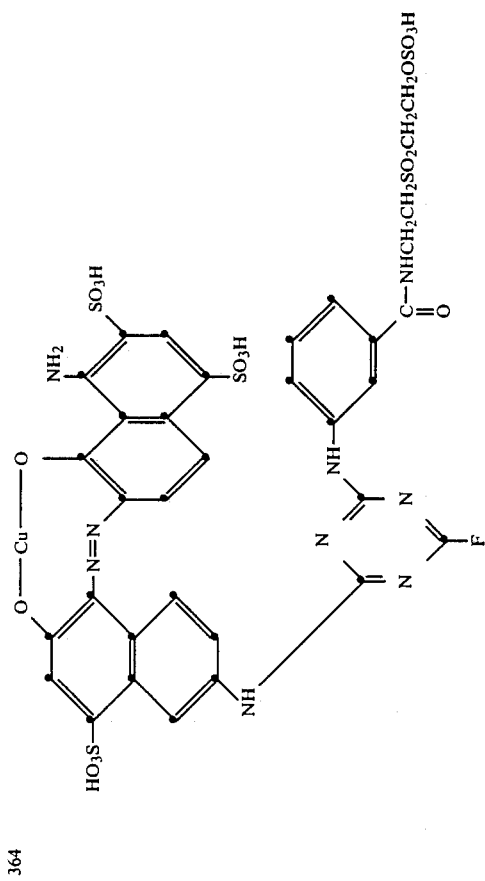 | blue |

| 365 | 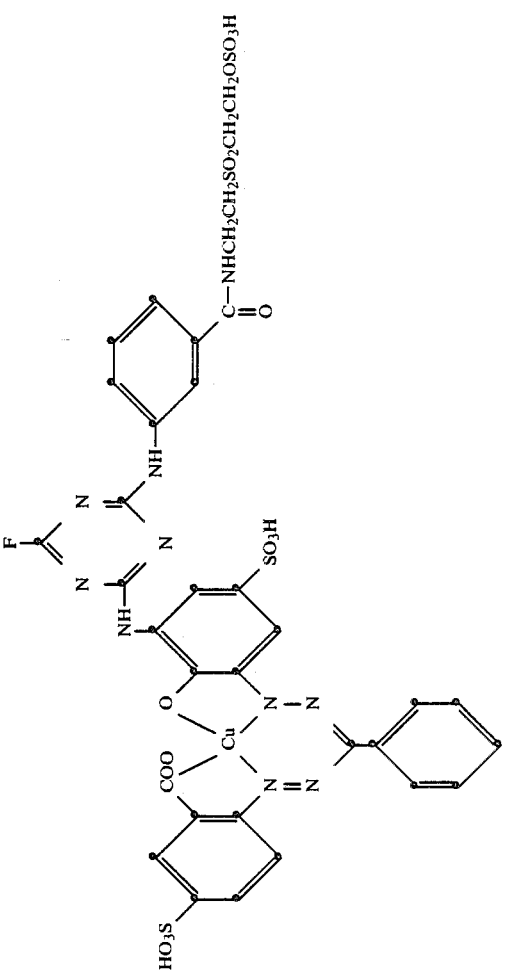 | blue |
| 366 | 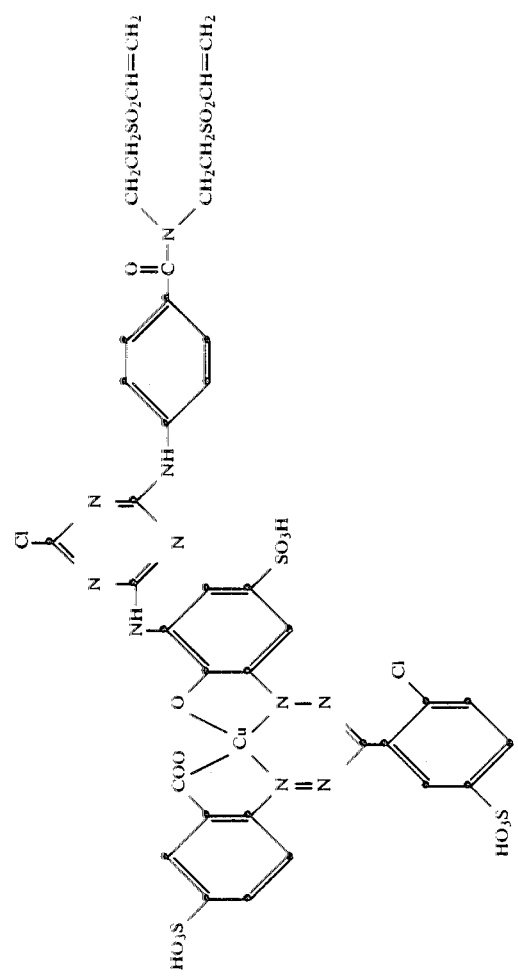 | blue |

| | | |
|---|---|---|
| 367 | 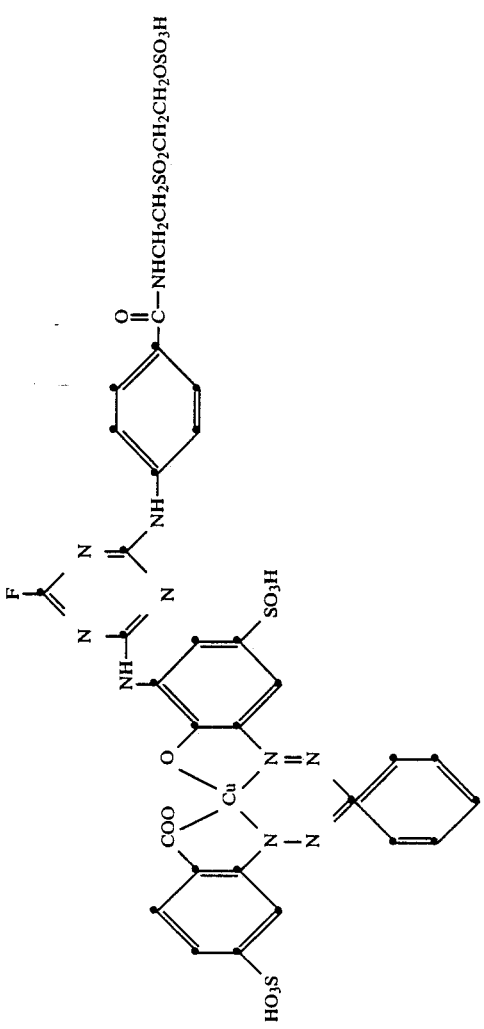 | blue |
| 368 | 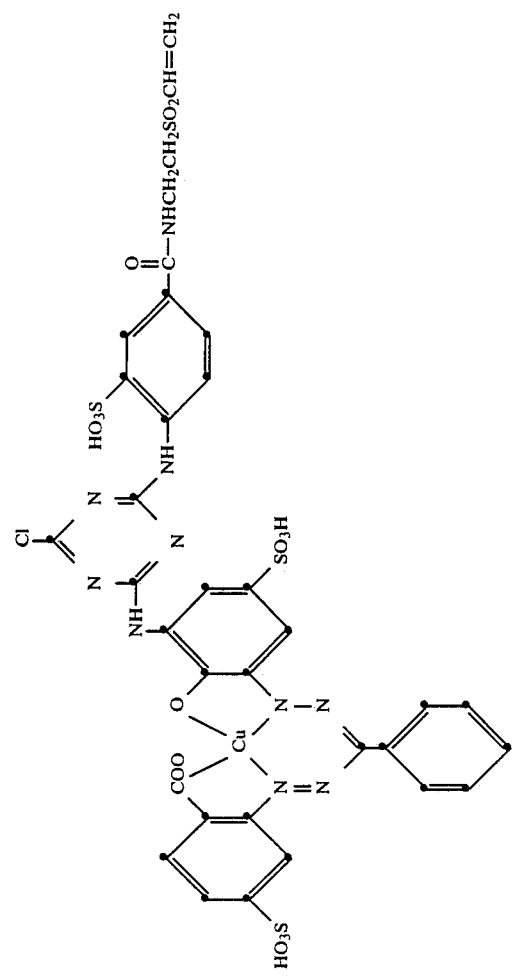 | blue |

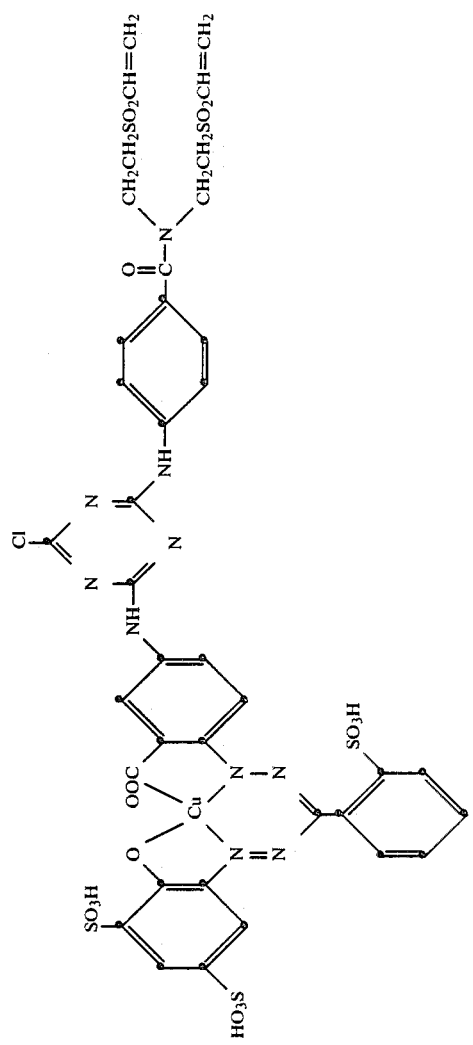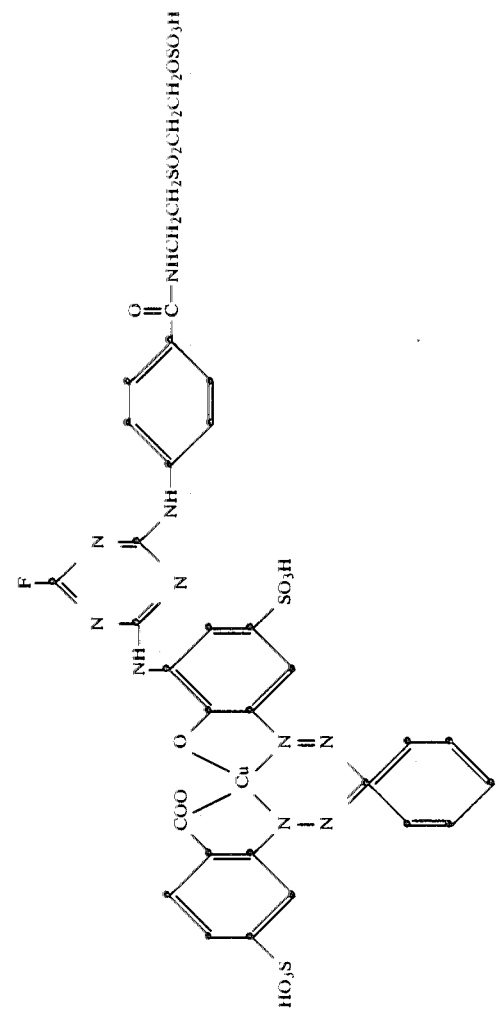

| | |
|---|---|
| 371 | blue |
| 372 | navy |
| 373 | navy |
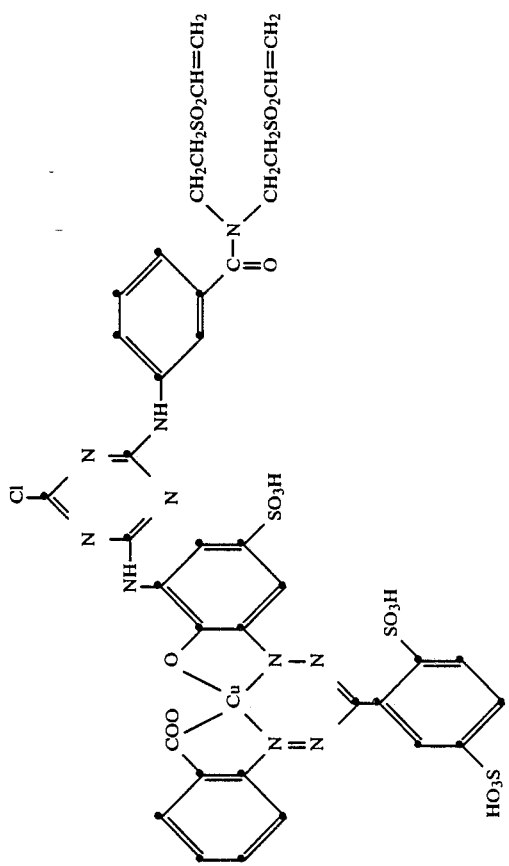
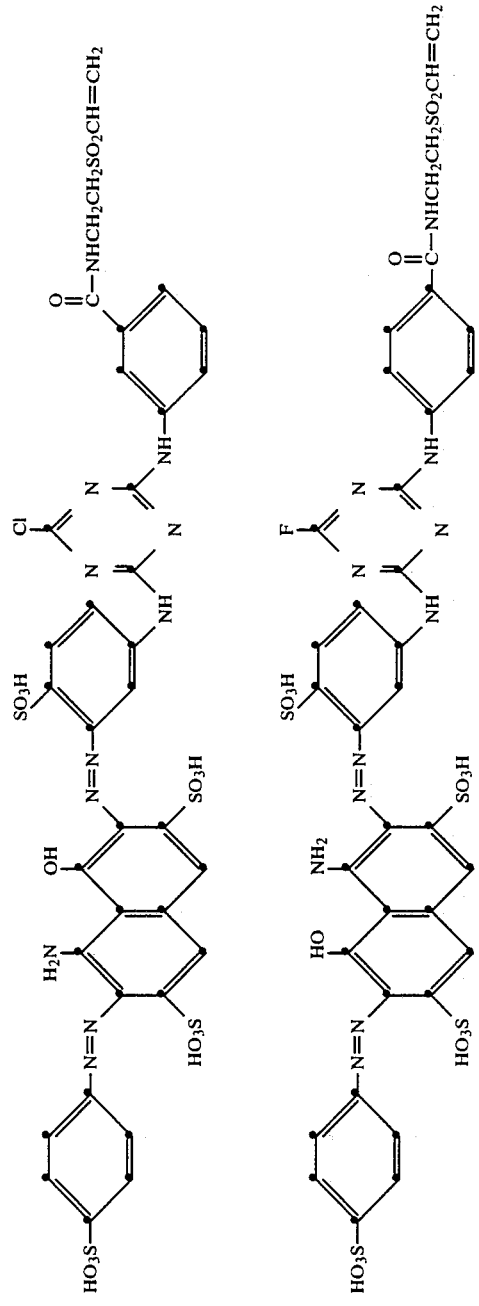

| | | |
|---|---|---|
| 374 | 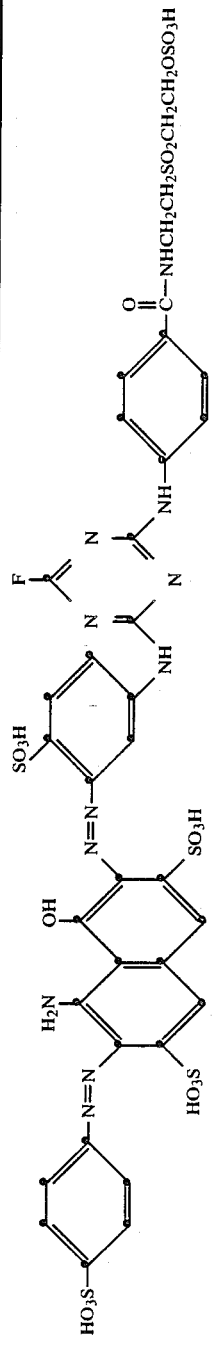 | navy |
| 375 | 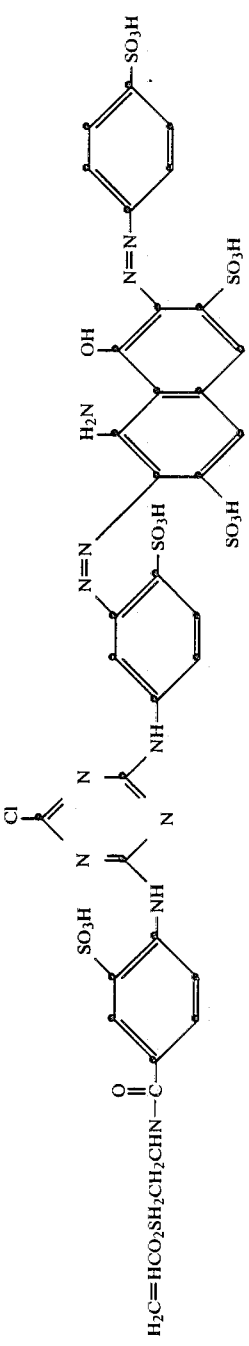 | navy |
| 376 | 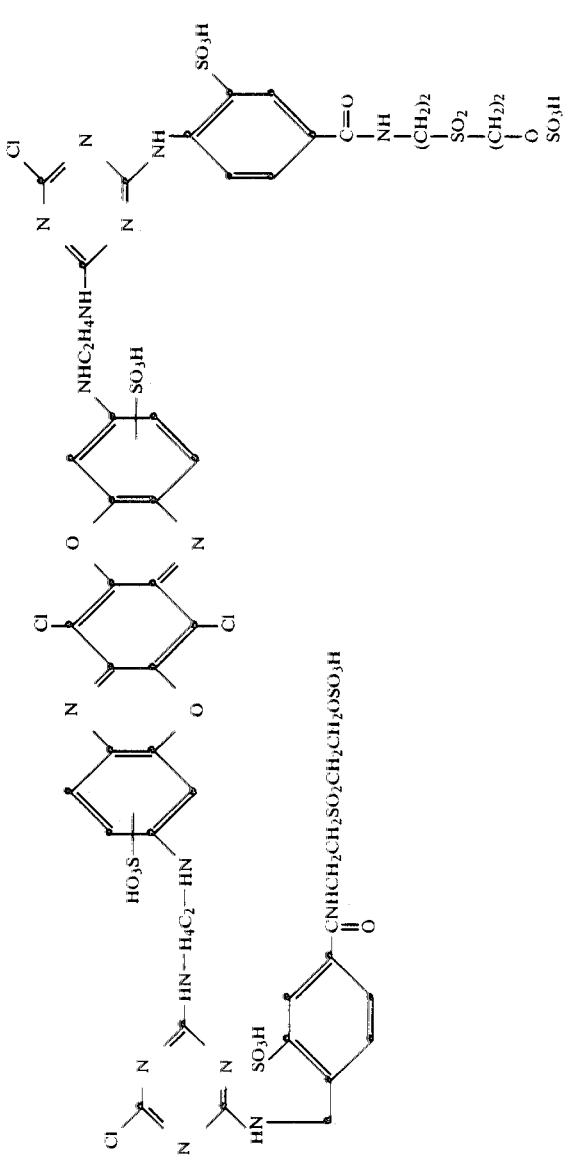 | blue |

-continued
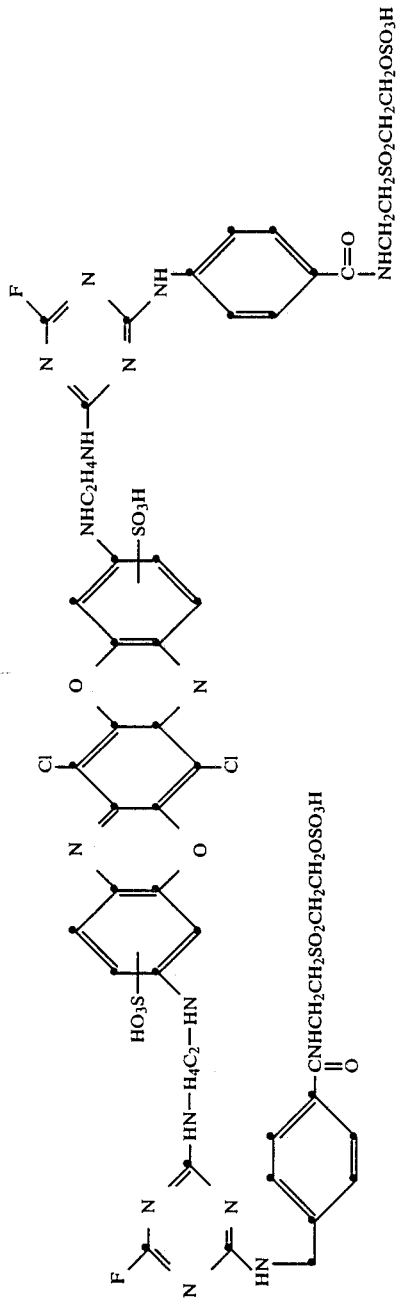
377 blue
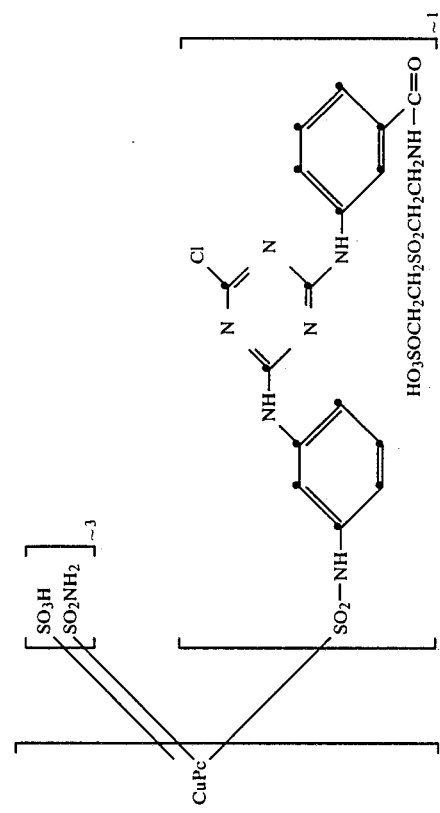
378 turquoise

-continued
| 379 | 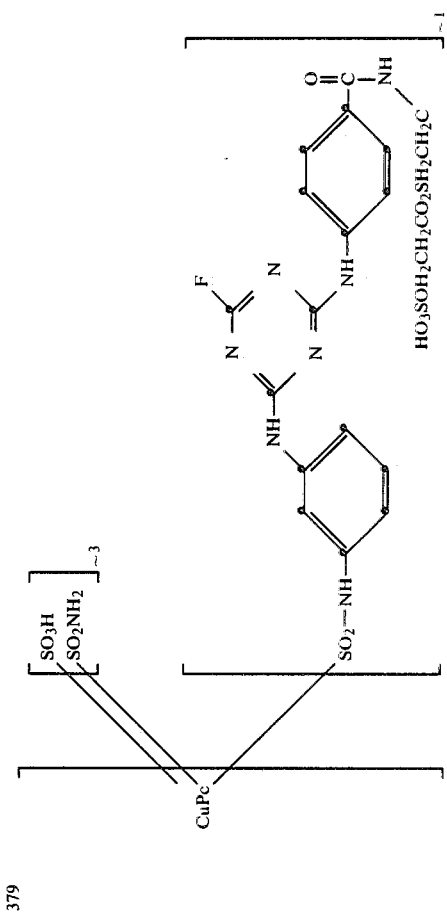 | turquoise |
| 380 | 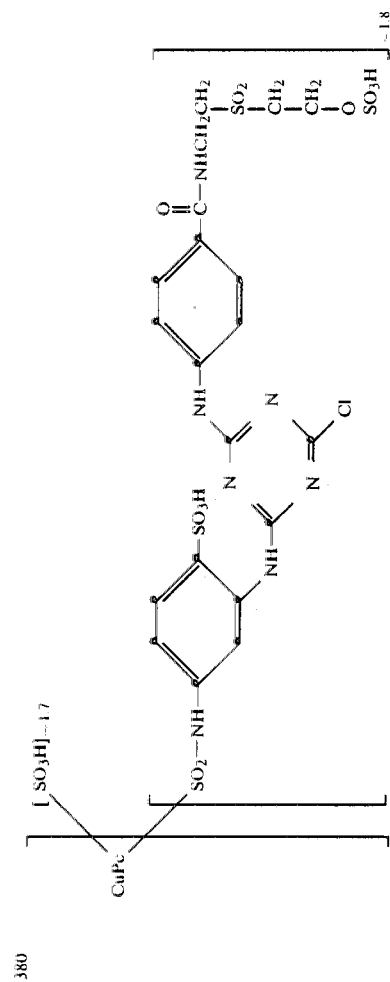 | turquoise |

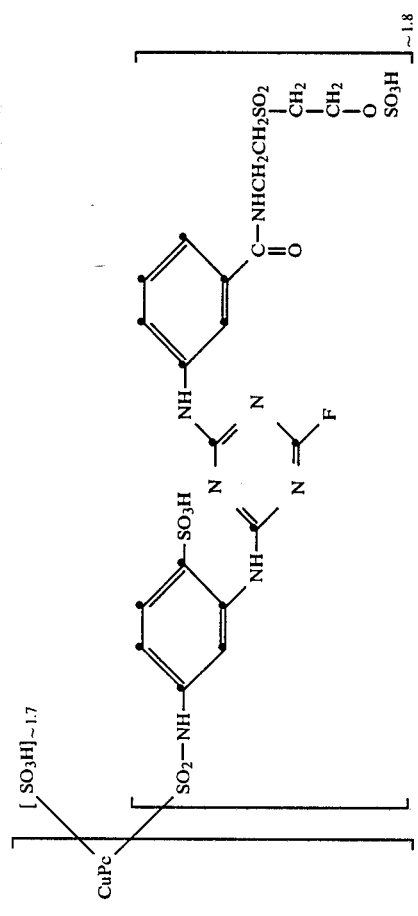
381 turquoise

Dyeing method I 2 parts of the dye obtained in Example 1 are dissolved in 400 parts of water; to this solution are added 1,500 parts of a solution which contains per liter 53 g of sodium chloride. This dyebath is entered at 40° C. with 100 parts of a cotton fabric. After 45 minutes, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 g of sodium chloride. This dyebath is entered at 35° C. with 100 parts of a cotton fabric. After 20 minutes, 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per liter 100 g of sodium sulfate. This dyebath is then entered at 25° C. with 100 parts of a cotton fabric. After 10 minutes, 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is applied to a cotton fabric on a padmangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

Dyeing method V 6 parts of the reactive dye obtained in Example 1 are dissolved in 50 parts of water. To this solution are added 50 parts of a solution which contains per liter 16 g of sodium hydroxide and 0.04 liter of 38° Bé sodium silicate. The resulting solution is applied to a cotton fabric on a padmangle in such a way that its weight increases by 70%, and the fabric is then wound onto a beam. In this state the cotton fabric is left to stand at room temperature for 10 hours. The dyed fabric is then rinsed, is soaped off at the boil with a nonionic detergent for a quarter of an hour, is rinsed once more and is dried.

Dyeing method VI 2 parts of the reactive dye obtained in Example 1 are dissolved in 100 parts of water in the presence of 0.5 part of sodium-m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% solution of a nonionic detergent for a quarter of an hour, is rinsed and is dried.

Printing method I 3 parts of the reactive dye obtained in Example 1 are sprinkled with high-speed stirring into 100 parts of a stock thickening containing 50 parts of 5% sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

Printing method II 5 parts of the reactive dye obtained in Example 1 are sprinkled with high-speed stirring into 100 parts of a stock thickening containing 50 parts of 5% sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

We claim:

1. A reactive dye of the formula

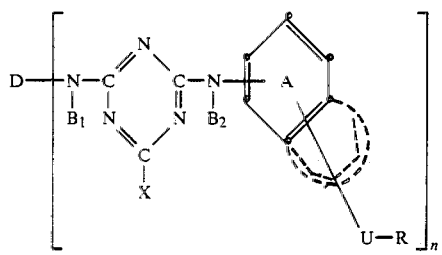

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye; $B_1$ and $B_2$ independently of each other are hydrogen or alkyl having 1 to 4 carbon atoms, which is unsubstituted or substituted by carboxyl, sulfo, cyano or hydroxyl; X is fluorine, chlorine, bromine, sulfo, alkylsulfonyl having 1 to 4 C atoms or phenylsulfonyl; U is —CO— or —SO$_2$—; R is a radical of the formula

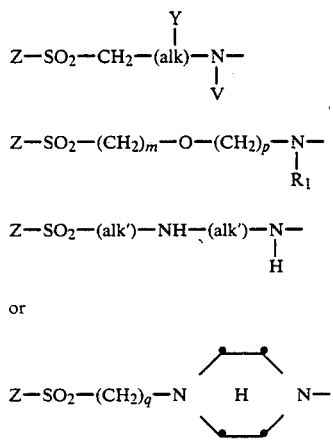

Z is sulfatoethyl, β-thiosulfatoethyl, β-phosphatoethyl, β-acetoxyethyl, β-halogenoethyl or vinyl; alk is a polymethylene radical having 1 to 6 C atoms or its branched isomers; Y is hydrogen, chlorine, bromine, fluorine, hydroxyl, sulfato, $C_1$-$C_4$-alkanoyloxy, cyano, carboxyl, alkoxycarbonyl having 1 to 5 C atoms, carbamoyl or a radical —SO$_2$—Z in which Z is defined as above; V is hydrogen or an alkyl radical having 1 to 4 C atoms which is unsubstituted or substituted by carboxyl, sulfo, $C_1$-$C_2$-alkoxy, halogen or hydroxyl; or a radical

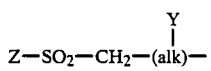

in which Z, alk and Y are as defined above; $R_1$ is hydrogen or $C_{1-6}$-alkyl; alk', independently of each other, are polymethylene radicals having 2 to 6 C atoms or their branched isomers; n is 1 or 2, m is 1 to 6, p is 1 to 6 and q is 1 to 6; where, when U is —SO$_2$—, V must not be hydrogen; and the benzene or naphthalene radical A is further unsubstituted or substituted by $C_1$-$C_4$-alkyl, $C_1$-$C_4$-alkoxy, acetylamino, propionylamino, benzoylamino, amino, N-$C_1$-$C_4$-alkylamino, phenylamino, N,N-di-β-hydroxyethylamino, N,N-di-β-sulfatoethylamino, sulfobenzylamino, N,N-disulfobenzylamino, $C_1$-$C_4$-alkoxycarbonyl, $C_1$-$C_4$-alkylsulfonyl, trifluoromethyl, nitro, cyano, halogen, carbamoyl, N-$C_1$-$C_4$-alkylcarbamoyl, sulfamoyl, N-$C_1$-$C_4$-alkylsulfamoyl, N-(β-hydroxyethyl)-sulfamoyl, N,N-di-(β-hydroxyethyl)sulfamoyl, N-phenylsulfamoyl, ureido, hydroxyl, carboxyl, sulfomethyl or sulfo.

2. A reactive dye according to claim 1, of the formula

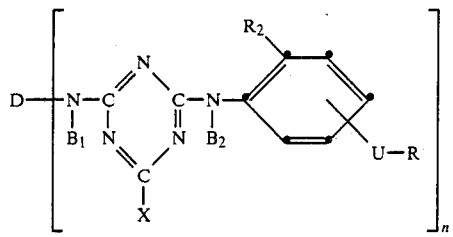

in which $R_2$ is hydrogen, $C_{1-4}$-alkyl, $C_{1-4}$-alkoxy, halogen, hydroxyl, carboxyl or sulfo.

3. A reactive dye according to claim 1, wherein D is the radical of a monoazo or disazo dye.

4. A reactive dye according to claim 1, wherein D is the radical of a metal complex azo or formazan dye.

5. A reactive dye according to claim 1, wherein D is the radical of an anthraquinone dye.

6. A reactive dye according to claim 1, wherein D is the radical of a phthalocyanine dye.

7. A reactive dye according to claim 4, wherein D is the radical of a 1:1 copper complex azo dye and the copper atom is bonded on each side to a metallizable group in the ortho-position relative to the azo bridge.

8. A reactive dye according to claim 3, wherein D is a monoazo or disazo dye radical of the formula

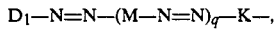

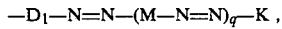

or

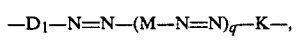

or of a metal complex derived therefrom; $D_1$ is the benzene or naphthalene radical of a diazo component, M is a benzene or naphthalene radical, and K is a benzene, naphthalene, pyrazolone, 6-hydroxy-pyrid-2-one or acetoacetarylamide radical of a coupling component, where $D_1$, M and K are each unsubstituted or substituted by hydroxyl, amino, methyl, ethyl, methoxy, ethoxy, $C_2$-$C_4$-alkanoylamino, benzoylamino or halogen; q is 1 or 0; and $D_1$, M and K together contain at least two sulfo groups.

9. A reactive dye according to claim 3, wherein D is a disazo dye radical of the formula

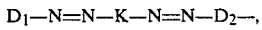

or

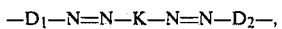

$D_1$ and $D_2$ are independently of each other a benzene or naphthalene radical of a diazo component, K is the naphthalene radical of a coupling component, where $D_1$, $D_2$ and K are each unsubstituted or substituted by hydroxyl, amino, methyl, ethyl, methoxy, ethoxy, $C_2$-$C_4$-alkanoylamino, benzoylamino or halogen; and $D_1$, $D_2$ and K together contain at least two sulfo groups.

10. A reactive dye according to claim 5, wherein D is the radical of an anthraquinone dye of the formula

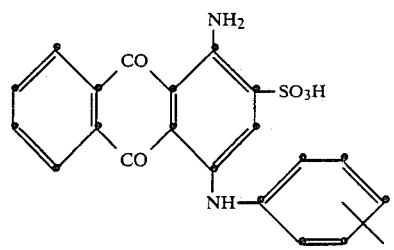

where the anthraquinone nucleus is further unsubstituted or substituted by sulfo, and the phenylene radical is further unsubstituted or substituted by alkyl having 1 to 4 C atoms, alkoxy having 1 to 4 C atoms, halogen, carboxyl or sulfo.

11. A reactive dye according to claim 6, wherein D is the radical of a phthalocyanine dye of the formula

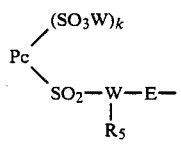

Pc is the radical of a copper or nickel phthalocyanine; W is —OH and/or —NR$_3$R$_4$; R$_3$ and R$_4$ are independently of one another hydrogen or alkyl having 1 to 4 carbon atoms, which is unsubstituted or substituted by hydroxyl or sulfo; R$_5$ is hydrogen or alkyl having 1 to 4 carbon atoms; E is phenylene which is unsubstituted or substituted by alkyl having 1 to 4 carbon atoms, halogen, carboxyl or sulfo; or is C$_2$–C$_6$-alkylene; and k is 1 to 3.

12. A reactive dye according to claim 8, of the formula

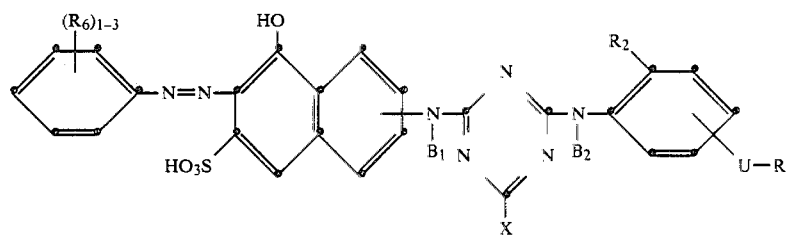

in which R$_6$ is 1 to 3 substituents from the group C$_{1-4}$-alkyl, C$_{1-4}$-alkoxy, halogen, carboxyl and sulfo.

13. A reactive dye according to claim 8, of the formula

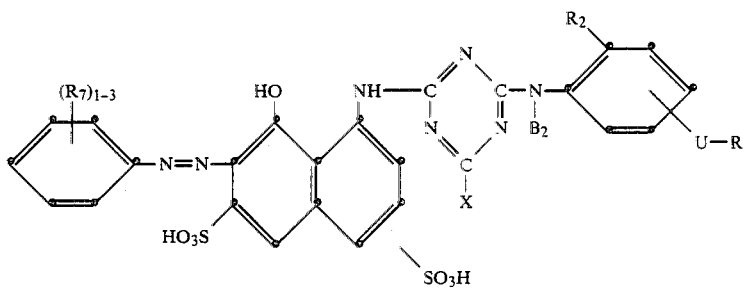

in which R$_7$ is 1 to 3 substituents from the group C$_{1-4}$-alkyl, C$_{1-4}$-alkoxy, halogen, carboxyl and sulfo.

14. A reactive dye according to claim 8, of the formula

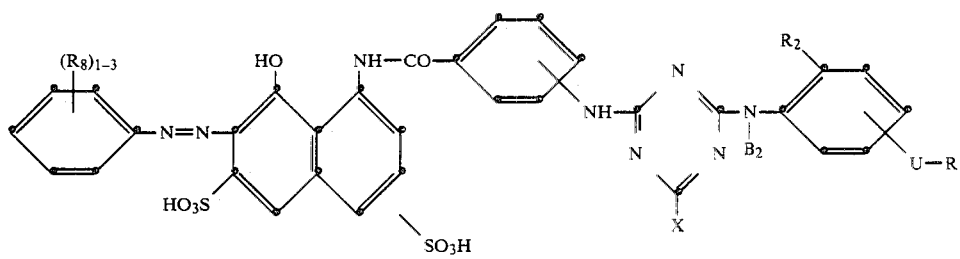

in which R$_8$ is 1 to 3 substituents of the group C$_{1-4}$-alkyl, C$_{1-4}$-alkoxy, halogen, carboxyl and sulfo.

15. A reactive dye according to claim 8, of the formula

16. A reactive dye according to claim 8, of the formula

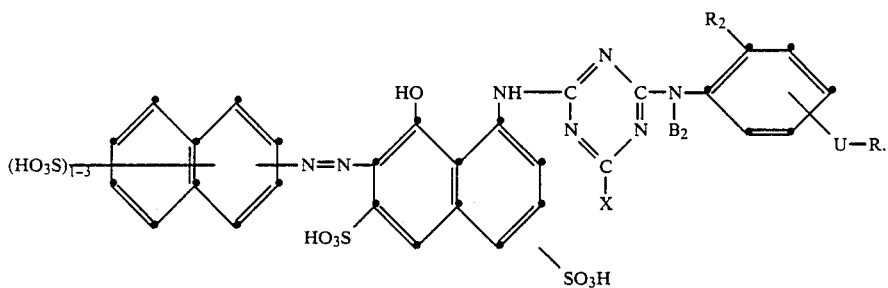

17. A reactive dye according to claim 8, of the formula

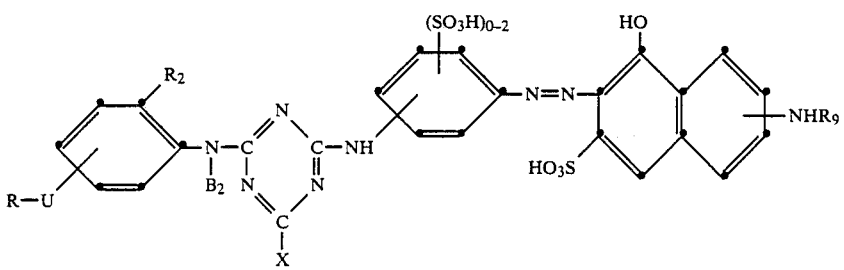

in which $R_9$ is hydrogen or $C_1$-$C_4$-alkanoyl.

18. A reactive dye according to claim 8 of the formula

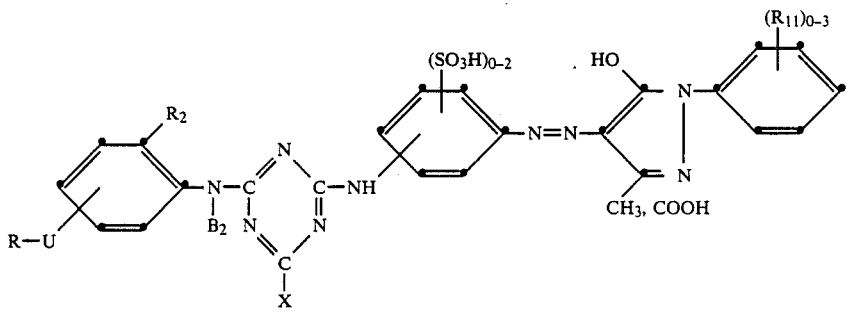

in which $R_{11}$ is 0 to 3 substituents from the group $C_{1-4}$-alkyl, $C_{1-4}$-alkoxy, halogen, carboxyl and sulfo.

19. A reactive dye according to claim 8, of the formula

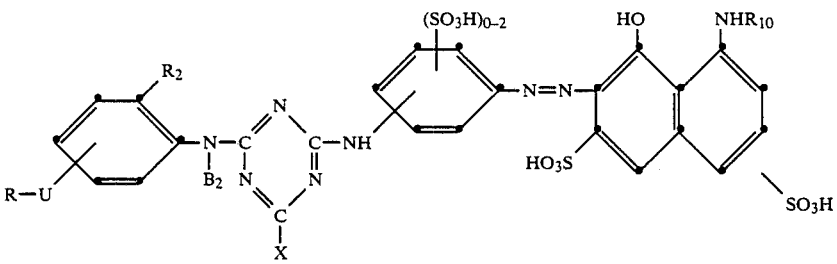

in which $R_{10}$ is hydrogen, $C_{1-4}$-alkanoyl or benzoyl.

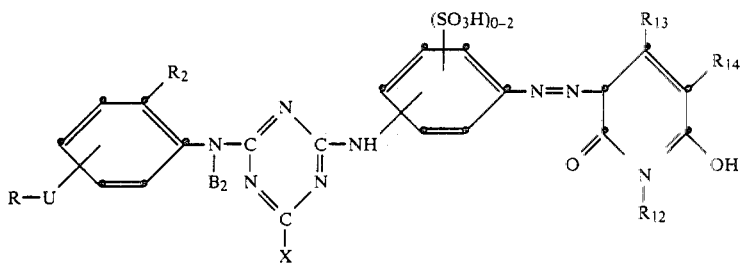

in which $R_{12}$ and $R_{13}$ are independently of each other hydrogen, $C_{1-4}$-alkyl or phenyl, and $R_{14}$ is hydrogen, cyano, carbamoyl or sulfomethyl.

20. A reactive dye according to claim 8, of the formula

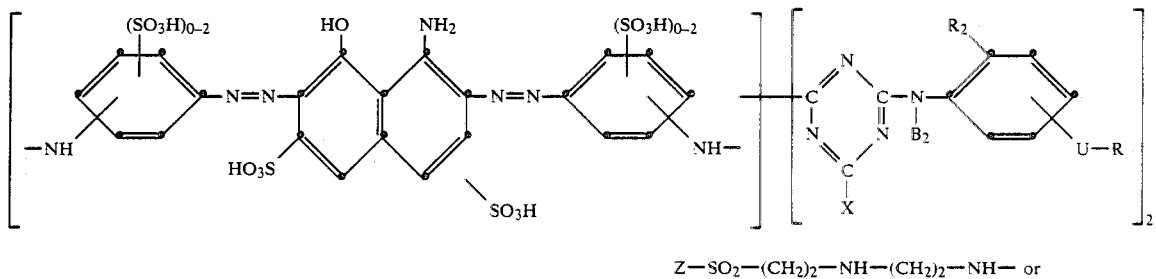

21. A heavy metal complex of a reactive dye according to claim 1.

22. A reactive dye according to claim 1, wherein Z is the β-sulfatoethyl, β-chloroethyl or vinyl group.

23. A reactive dye according to claim 11, wherein E is sulfophenylene or ethylene.

24. A reactive dye according to claim 2 wherein D is a monoazo, disazo, metal complex azo, anthraquinone, phthalocyanine, formazane or dioxazine dye material, $B_1$ and $B_2$ independently of each other are hydrogen, methyl or ethyl, X is fluorine or chlorine, U is —CO—; R is a radical of the formula

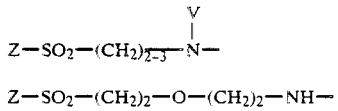

Z—SO$_2$—(CH$_2$)$_2$—O—(CH$_2$)$_2$—NH—

Z—SO$_2$—(CH$_2$)$_2$—NH—(CH$_2$)$_2$—NH— or

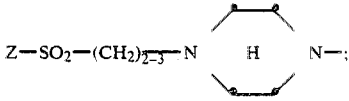

V is hydrogen, $C_1$–$C_4$-alkyl or a radical

Z—SO$_2$—(CH$_2$)$_{2-3}$;

Z is β-sulfatoethyl, β-halogenoethyl or vinyl; n is 1 or 2; and $R_2$ is hydrogen, methyl, methoxy or sulfo.

25. A reactive dye according to claim 24 wherein $B_1$, $B_2$ and V are hydrogen.